(12) United States Patent  
Ohno et al.

(10) Patent No.: US 9,329,957 B2  
(45) Date of Patent: *May 3, 2016

(54) METHOD FOR MANAGING STORAGE SYSTEM USING FLASH MEMORY, AND COMPUTER

(71) Applicant: Hitachi, Ltd., Tokyo (JP)

(72) Inventors: Shotaro Ohno, Fujisawa (JP); Manabu Obana, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/739,253

(22) Filed: Jun. 15, 2015

(65) Prior Publication Data

US 2015/0278054 A1    Oct. 1, 2015

Related U.S. Application Data

(63) Continuation of application No. 14/539,184, filed on Nov. 12, 2014, now Pat. No. 9,069,476, which is a continuation of application No. 12/546,395, filed on Aug. 24, 2009, now Pat. No. 8,909,848.

(30) Foreign Application Priority Data

Jun. 22, 2009    (JP) .................................. 2009-147182

(51) Int. Cl.
*G06F 13/00* (2006.01)
*G06F 13/28* (2006.01)
*G06F 11/20* (2006.01)
(Continued)

(52) U.S. Cl.
CPC .......... *G06F 11/2094* (2013.01); *G06F 3/0605* (2013.01); *G06F 3/0608* (2013.01); *G06F 3/0616* (2013.01); *G06F 3/0619* (2013.01); *G06F 3/0634* (2013.01); *G06F 3/0644* (2013.01); *G06F 3/0647* (2013.01); *G06F 3/0653* (2013.01); *G06F 3/0683* (2013.01); *G06F 3/0685* (2013.01); *G06F 3/0688* (2013.01); *G06F 11/108* (2013.01);
(Continued)

(58) Field of Classification Search
None
See application file for complete search history.

(56) References Cited

U.S. PATENT DOCUMENTS 5,737,742 A    4/1998 Achiwa et al.
5,920,884 A    7/1999 Jennings et al.
(Continued)

FOREIGN PATENT DOCUMENTS

JP    2000-181805 A    6/2000
JP    2003-046931    2/2003
(Continued)

OTHER PUBLICATIONS

Japan Patent Office action on application 2011-254575 dated Jul. 10, 2012; pp. 1-3.

*Primary Examiner* — Eric S Cardwell
(74) *Attorney, Agent, or Firm* — Foley & Lardner LLP

(57) ABSTRACT

To facilitate the management of a storage system that uses a flash memory as a storage area. A controller of the storage system provided with a flash memory chip manages a surplus capacity value of the flash memory chip, and transmits a value based on the surplus capacity value to a management server, on the basis of at least one of a definition of a parity group, a definition of an internal LU, and a definition of a logical unit. The management server displays a state of the storage system by using the received value based on the surplus capacity value.

19 Claims, 37 Drawing Sheets

(51) Int. Cl.
*G06F 3/06* (2006.01)
*G06F 11/10* (2006.01)

(52) U.S. Cl.
CPC . *G06F2206/1008* (2013.01); *G06F 2211/1059* (2013.01)

(56) References Cited

U.S. PATENT DOCUMENTS

| | | |
|---|---|---|
| 6,519,185 B2 | 2/2003 | Harari et al. |
| 6,993,690 B1 | 1/2006 | Okamoto |
| 7,096,338 B2 | 8/2006 | Takahashi et al. |
| 7,640,390 B2 | 12/2009 | Iwamura et al. |
| 8,103,820 B2 | 1/2012 | Yeh et al. |
| 2005/0081087 A1 | 4/2005 | Yagisawa et al. |
| 2005/0162930 A1 | 7/2005 | Mukaida |
| 2007/0283079 A1 | 12/2007 | Iwamura et al. |
| 2007/0283085 A1 | 12/2007 | Lin |
| 2008/0065815 A1 | 3/2008 | Nasu et al. |
| 2009/0106484 A1 | 4/2009 | Yeh et al. |
| 2010/0017560 A1 | 1/2010 | Ono et al. |
| 2010/0174852 A1 | 7/2010 | Chien et al. |

FOREIGN PATENT DOCUMENTS

| | | |
|---|---|---|
| JP | 2003-223342 A | 8/2003 |
| JP | 03-507132 | 12/2003 |
| JP | 2007-323224 A | 12/2007 |
| JP | 2008-070935 | 3/2008 |
| WO | WO-2008/032711 A1 | 3/2008 |

FIG. 5

| FMD-ID | BLOCKAGE INFORMATION | WWN | LUN | MODEL NUMBER | PROVIDING CAPACITY VALUE | NUMBER OF FMC PAGES | BLOCK SIZE | SURPLUS CAPACITY |
|---|---|---|---|---|---|---|---|---|
| 1 | NORMAL | AA.. | 0 | A-Type1 | 200GB | 16 | 8KB | 150GB |
| 2 | NORMAL | BB.. | 0 | A-Type1 | 200GB | 16 | 8KB | 50GB |
| 3 | NORMAL | CC.. | 0 | B-Type2 | 200GB | 32 | 8KB | 150GB |
| 4 | NORMAL | DD.. | 0 | B-Type2 | 200GB | 32 | 8KB | 350GB |
| 5 | NORMAL | EE.. | 0 | B-Type2 | 200GB | 16 | 16KB | 100GB |
| 6 | NORMAL | FF.. | 0 | A-Type2 | 1000GB | 128 | 8KB | 250GB |
| : | | : | : | : | : | : | : | : |

4050

| PG-ID | BLOCKAGE INFORMATION | RAID LEVEL | NUMBER OF FMD | PARTICIPATING FMD-ID |
|---|---|---|---|---|
| 1 | NORMAL | 1 | 2 | 1, 2 |
| 2 | NORMAL | 1 | 2 | 3, 4 |
| 3 | NORMAL | 0 | 1 | 6 |
| 4 | BLOCKED | 5 | 4 | : |
| : | : | | | : |

| INTERNAL LUID | BLOCKAGE INFORMATION | PG-ID | START ADDRESS | END ADDRESS | BLOCK SIZE | COMPARE INFORMATION |
|---|---|---|---|---|---|---|
| 1 | NORMAL | 1 | 0 | 19999999999 | 512B | No |
| 2 | NORMAL | 2 | 0 | 9999999999 | 512B | No |
| 3 | NORMAL | 2 | 10000000000 | 39999999999 | 512B | Yes |
| 4 | NORMAL | 3 | 0 | 19999999999 | 16KB | No |
| 5 | BLOCKED | 4 | 0 | 19999999999 | 16KB | No |
| : | | | | | | : |

4070

FIG. 8
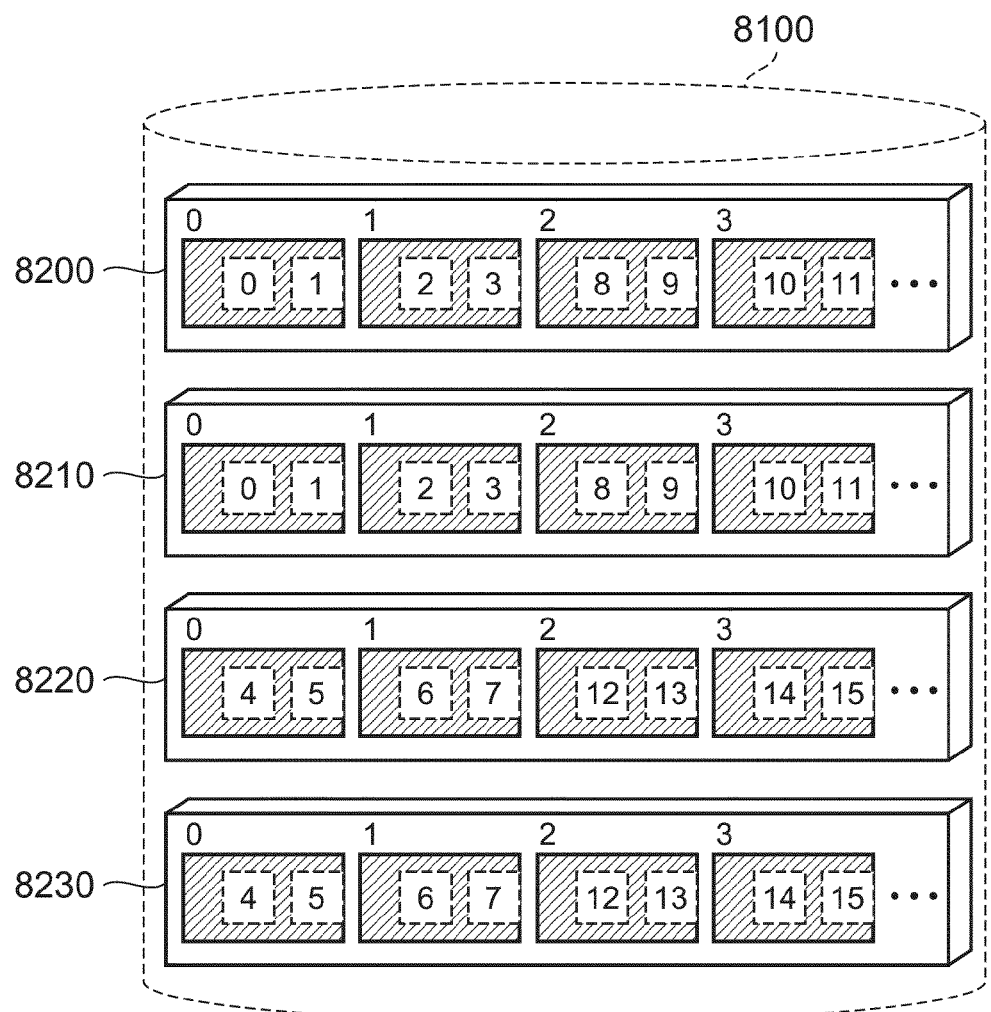
EXAMPLE:
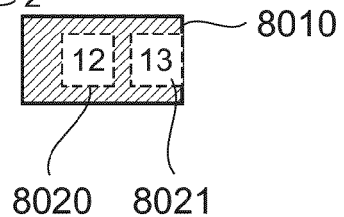

FIG. 9
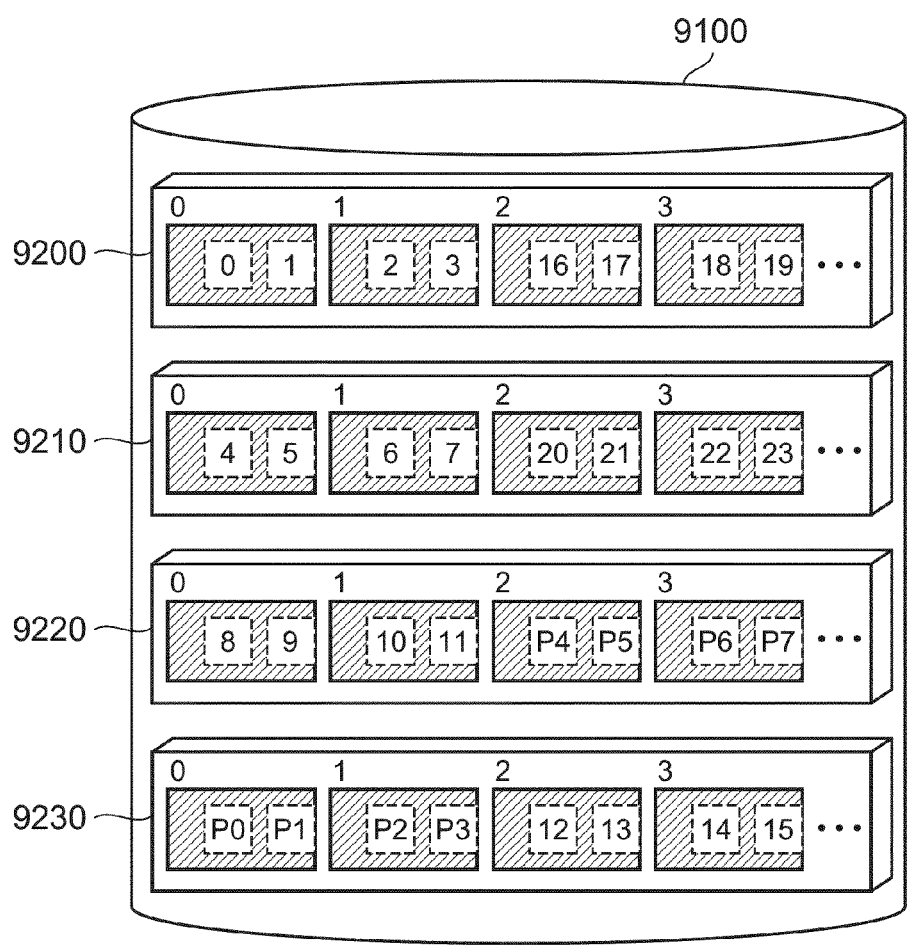
EXAMPLE: 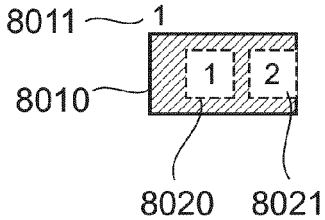

FIG. 10
(0) INITIAL STATE (BLOCK 0, 1 STAGING COMPLETED BY READ)
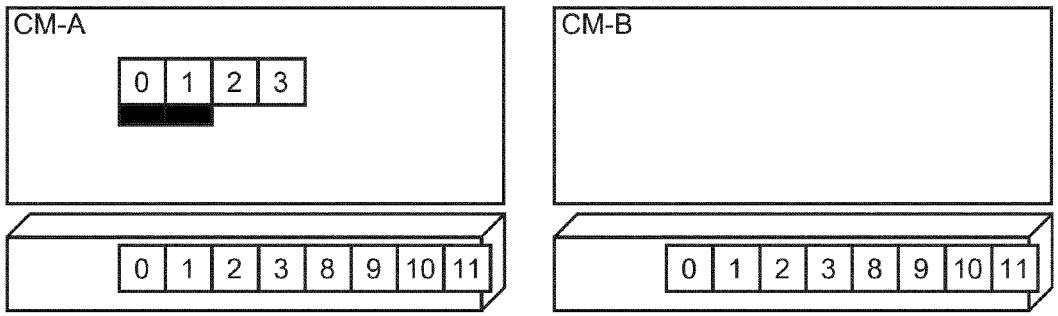
(1) AFTER Write REQUEST ARRIVED TO BLOCK 2 AND Ack IS RETURNED
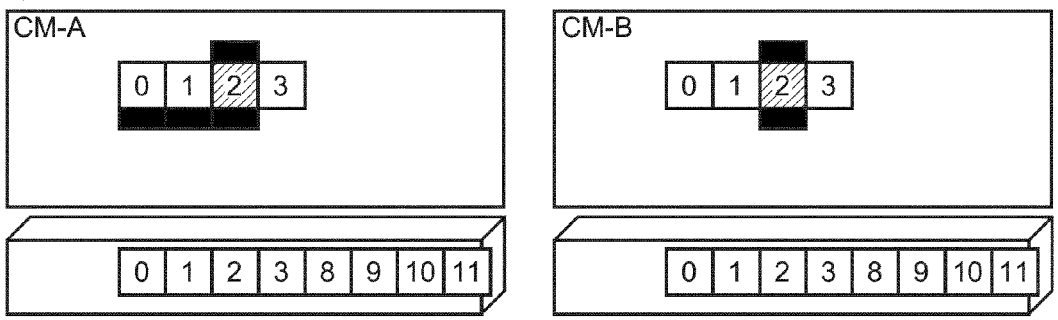
(2) TRANSITION TO FMD UNIT BLOCK
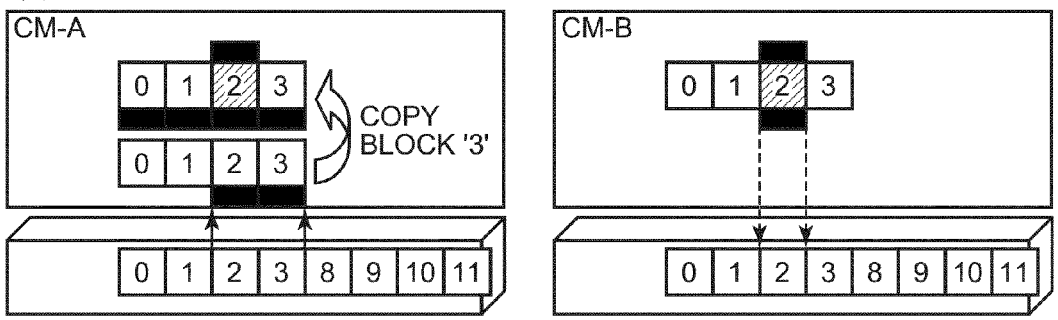
(3) DESTAGING
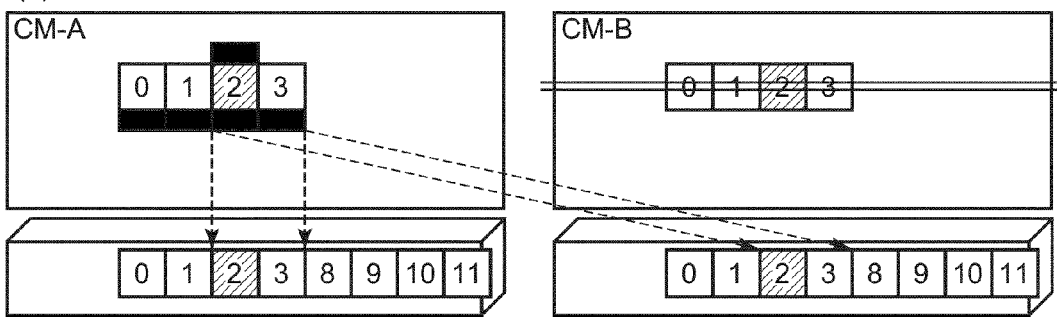

FIG. 11
(0) INITIAL STATE (BLOCK 0, 1 STAGING COMPLETED BY READ)
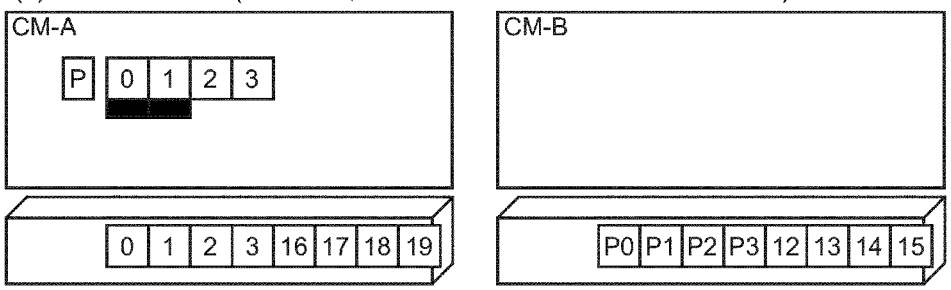
(1) AFTER Write REQUEST ARRIVED TO BLOCK 2 AND Ack IS RETURNED
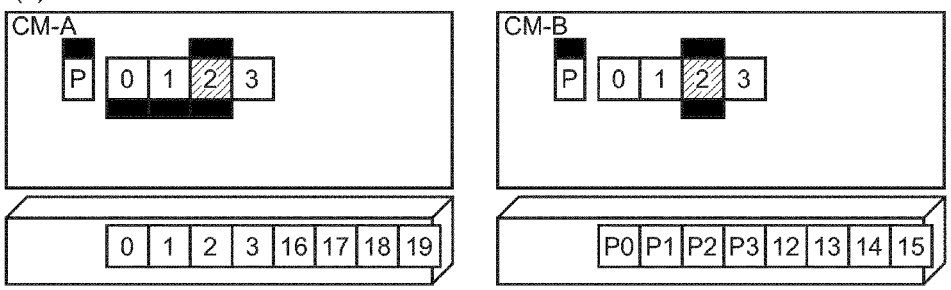
(2) OLD DATA AND OLD PARITY ARE READ OUT AND
TRANSITION IS MADE TO FMD UNIT BLOCK
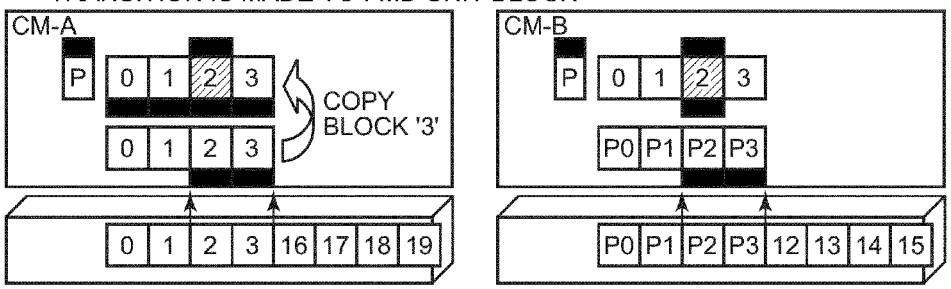
(3) AFTER PARITY IS CREATED ON CACHE
(NEW PARITY = XOR (NEW DATA, OLD DATA, OLD PARITY))
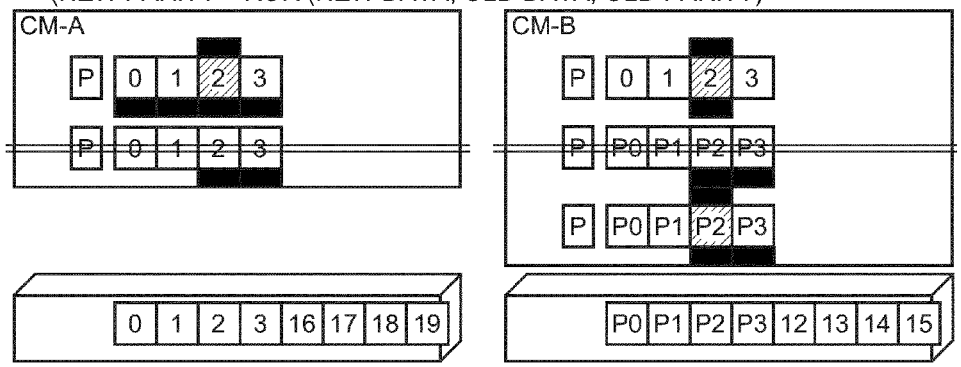

FIG. 12
(4) PARITY DESTAGING
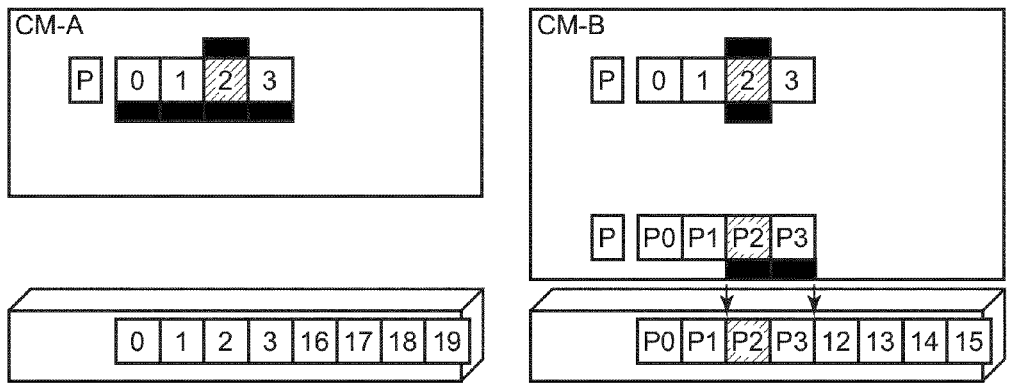
(5) DATA DESTAGING
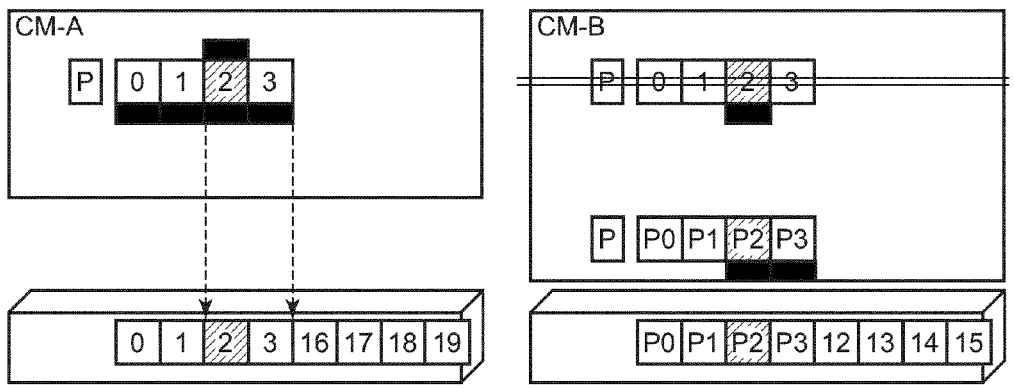

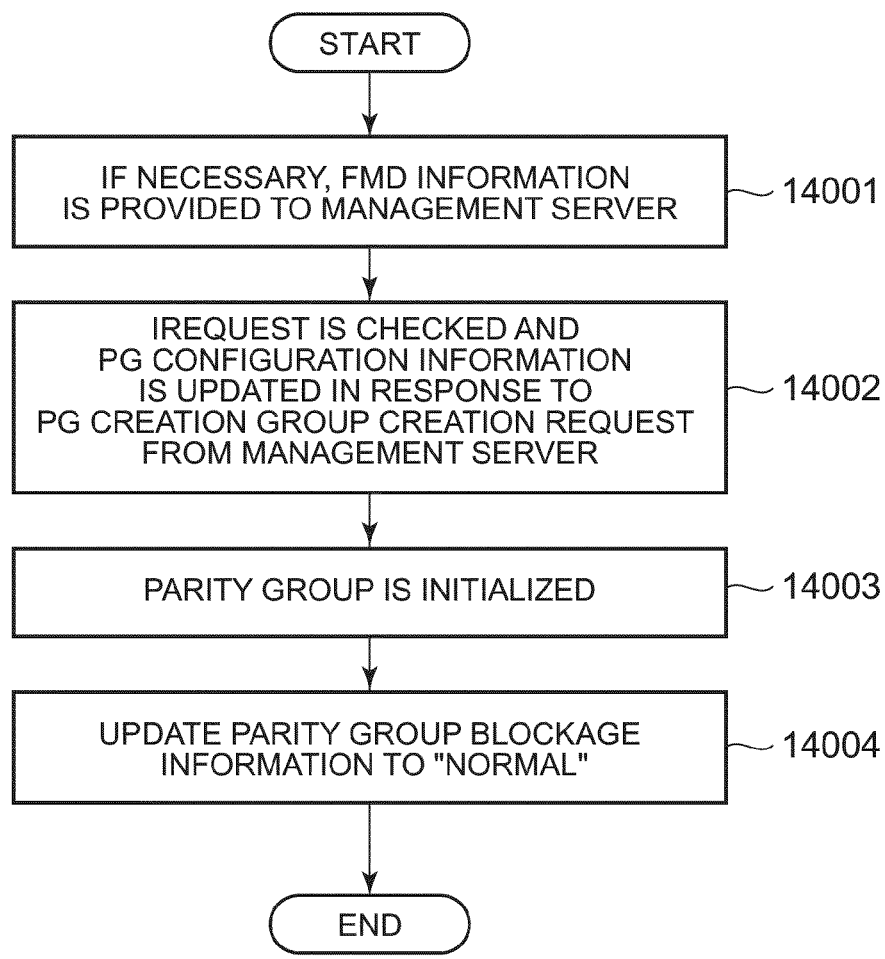

FIG. 25

| STORAGE -ID | FMD -ID | BLOCKAGE INFORMATION | MODEL NUMBER | PROVIDING CAPACITY | NUMBER OF FMC PAGES | BLOCK SIZE | SURPLUS CAPACITY VALUE |
|---|---|---|---|---|---|---|---|
| STG1 | 1 | NORMAL | A-Type1 | 200GB | 16 | 8KB | 150GB |
| STG1 | 2 | NORMAL | A-Type1 | 200GB | 16 | 8KB | 50GB |
| STG1 | 3 | NORMAL | B-Type2 | 200GB | 32 | 8KB | 150GB |
| STG1 | 4 | NORMAL | B-Type2 | 200GB | 32 | 8KB | 350GB |
| STG1 | 5 | NORMAL | B-Type2 | 200GB | 16 | 16KB | 100GB |
| STG1 | 6 | NORMAL | A-Type2 | 1000GB | 128 | 8KB | 250GB |
| STG2 | ⋮ | | ⋮ | ⋮ | ⋮ | ⋮ | ⋮ |

| STORAGE-ID | PG-ID | BLOCKAGE INFORMATION | RAID LEVEL | NUMBER OF FMD | SURPLUS CAPACITY PERCENTAGE | PARTICIPATING FMD-ID |
|---|---|---|---|---|---|---|
| STG1 | 1 | NORMAL | 1 | 2 | 25% | 1, 2 |
| STG1 | 2 | NORMAL | 1 | 2 | 75% | 3, 4 |
| STG1 | 3 | NORMAL | 0 | 1 | 25% | 6 |
| STG1 | 4 | BLOCKED | 5 | 4 | ... | ... |
| STG2 | ... | | | | | |

| STORAGE-ID | INTERNAL LU-ID | BLOCKAGE INFORMATION | PG-ID | PROVIDING CAPACITY | SURPLUS CAPACITY PERCENTAGE | BLOCK SIZE | COMPARE INFORMATION |
|---|---|---|---|---|---|---|---|
| STG1 | 1 | NORMAL | 1 | 100GB | 25% | 512KB | NO |
| STG1 | 2 | NORMAL | 2 | 50GB | 75% | 512KB | NO |
| STG1 | 3 | NORMAL | 2 | 150GB | 75% | 512KB | YES |
| STG1 | 4 | NORMAL | 3 | 400GB | 50% | 16KB | NO |
| STG1 | 5 | BLOCKED | 4 | 1000GB | 25% | 16KB | NO |
| STG2 | 1 | NORMAL | 1 | 300GB | 50% | 4KB | NO |
| : | : | : | : | : | : | : | : |

| STORAGE-ID | WWN (I/O-Port) | LUN | INTERNAL LU-ID |
|---|---|---|---|
| STG1 | zz | 0 | 1 |
| STG1 | zz | 1 | 2 |
| STG1 | yy | 0 | 3 |
| STG1 | yy | 1 | 4 |
| STG2 | .. |  | .. |

| STORAGE-ID | NUMBER OF FMD | SURPLUS CAPACITY PERCENTAGE | PARTICIPATING FMD-ID |
|---|---|---|---|
| STG1 | 1 | 50% | 5 |
| STG2 | 4 | 75% | 1,2,3,4. |

FIG. 38

| POLICY IDENTIFIER | THRESHOLD | ACTION NAME | ACTION INSTRUCTION |
|---|---|---|---|
| 1 | 40% OR LOWER | SEND A WARNING MAIL | mail –T 'WARNING MAIL' |
| 2 | 30% OR LOWER | ARCHIVE | webchglogvol...& stat 'ARCHIVED' |
| 3 | 50% OR LOWER | SEND SNMP TRAP | sendsnmptrap.... |
| 4 | 40% OR LOWER | PASS ON TO ARCHIVE 1 | delvol....& arcinclvol ... |
| 5 | 60% OR HIGHER | NORMAL STATE | stat 'NORMAL' |
| 6 | 20% OR LOWER | HIGH-SPEED ARCHIVE Tier | volmigration.... |

| HOST IDENTIFIER | HOST LU IDENTIFIER | PORT IDENTIFIER | LUN | STATE | APPLICATION POLICY IDENTIFIER | USE APPLICATION EXECUTION INSTANCE IDENTIFIER |
|---|---|---|---|---|---|---|
| HOST1 | sda1 | yy | 0 | NORMAL | 1,2 | WEB SERVER 1 |
| HOST1 | sad2 | zz | 0 | ARCHIVED | 1,2 | WEB SERVER 1 |
| HOST1 | ... | ... | ... | NORMAL | 3,4,5 | MAIL SERVER |
| HOST2 | ... | ... | ... | ... | ... | ... |

METHOD FOR MANAGING STORAGE SYSTEM USING FLASH MEMORY, AND COMPUTER

CROSS-REFERENCE TO RELATED PATENT APPLICATIONS

Japan Priority Application 2009-147182, filed Jun. 22, 2009 including the specification, drawings, claims and abstract, is incorporated herein by reference in its entirety. This application is a Continuation of U.S. application Ser. No. 14/539,184, filed Nov. 12, 2014, incorporated herein by reference in its entirety, which is a Continuation of U.S. application Ser. No. 12/546,395, filed Aug. 24, 2009, now U.S. Pat. No. 8,909,848 issued Dec. 9, 2014, incorporated herein by reference in its entirety.

BACKGROUND

The present invention generally relates to a storage system comprising a plurality of storage devices.

The storage systems using a HDD (hard disk drive) as a storage medium have been commonly used in an information system.

On the other hand, since the bit cost of flash memories has been decreasing in recent years, flash memories have become effective storage devices. The technology disclosed in U.S. Patent Application Publication No. 2007/0283079 describes the configuration in which a storage system has a plurality of flash memory device having a plurality of flash memories, and a controller having an I/O processing control unit for accessing a flash memory device specified by a designated access destination in an I/O request received from an external device from among the plurality of flash memory devices, and in which a parity group contains by the flash memory devices having the same internal configuration.

SUMMARY

Although the technology disclosed in U.S. Patent Application Publication No. 2007/0283079 provides the storage system that uses highly reliable or high-performance flash memories, it is difficult for a manager of the storage system to manage it in consideration of that the flash memories are the storage media.

An object of the present invention is to facilitate management of a storage system that uses a flash memory as a storage area.

A controller of the present invention, in the storage system that has a flash memory chip, manages a surplus capacity value of the flash memory chip and transmits a value based on the surplus capacity value to a management server on the basis of at least one of the definition of a parity group, the definition of an internal LU, and the definition of a logical unit. The management server uses the received value based on the surplus capacity value, to display the state of the storage system.

According to the present invention, management of the storage system that uses the flash memory as a storage area can be facilitated.

BRIEF DESCRIPTION OF THE INVENTION

FIG. 5 shows an example of FMD information saved with the storage controller;

FIG. 7 shows an example of the internal LU configuration information;

FIG. 8 shows an address space of a parity group of RAID 1+0;

FIG. 9 shows an address space of a parity group of RAID 5;

FIG. 10 shows an example of using a cache in the address space shown in FIG. 8;

FIG. 11 shows part of an example of using a cache in the address space shown in FIG. 9;

FIG. 12 shows remaining part of an example of using a cache in the address space shown in FIG. 9;

FIG. 13 shows an example of the LU path information;

FIG. 14 is a flowchart illustrating the definition processing of a parity group executed in the configuration control program;

FIG. 25 is a diagram showing an example of management-side FMD information;

FIG. 26 is a diagram showing an example of management-side PG configuration information;

FIG. 27 is a diagram showing an example of management-side internal LU configuration information;

FIG. 28 is a diagram showing an example of management-side LU path information;

FIG. 29 is a diagram showing an example of management-side candidate FMD information about substitution;

FIG. 38 is a diagram showing an example of surplus capacity policy information; and FIG. 39 is a diagram showing an example of logical unit operation information.

DETAILED DESCRIPTION OF THE EMBODIMENTS

Embodiments of the present invention will be explained below with reference to the appended drawings. Note that in the following description, the information items in the present invention are described by "xxx table," "xxx list," "xxx DB," "xxx queue" and the like, but these information items may be expressed by data structures other than "table," "list," "DB," "queue" and the like. Therefore, in order to explain that the information items are not dependent on the data structure, "xxx table," "xxx list," "xxx DB," "xxx queue" and the like are often called "xxx information." Furthermore, the content of each information item is described by "identification information," "identifier," "title," "name," and "ID," and these terms can be mutually replaced. In addition, a data content is described by "information" but may be described in another way.

In the following description, "program" is mainly described, but "processor" may be mainly described, because a program is executed by a processor and thereby performs predetermined processing by using a memory and a communication port (communication control device). The processing that is described to be performed by the program may be carried out by a computer of a management server or a storage system, or an information processing device. Furthermore, some or all of the programs may be realized by a dedicated hardware. Various programs may be installed on each computer by a program distribution server or a storage media.

<1. Configuration of Information System>

Figure 1:
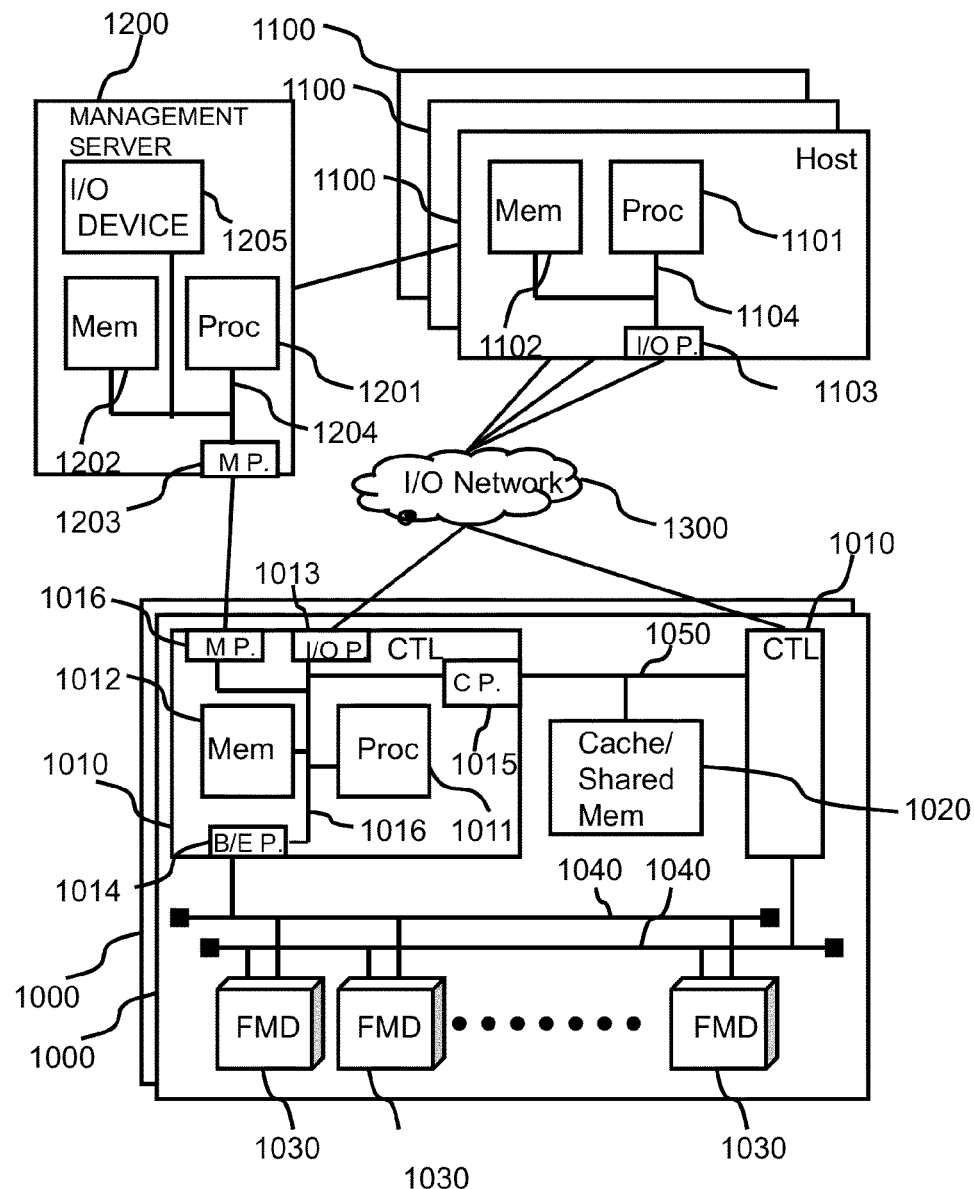
FIG. 1 shows an example of a hardware configuration of the information system of one embodiment of the present invention.

FIG. 1 illustrates an example of hardware configuration of an information system of one embodiment of the present invention.

The information system comprises, for example, a storage system 1000, a host computer (abbreviated hereinbelow as "host") 1100, and a management server 1200. The number of storage systems 1000, hosts 1100, and management servers 1200 can be more than one each. The storage system 1000 and host 1100 are connected to each other via an I/O network 1300. The storage system 1000, the management server 1200, and the host 1100 are connected to each other via a management network (not shown in the figure) or the I/O network 1300.

The host 1100 has an internal network 1104, and a processor (abbreviated in the figure as "Proc") 1101, a memory (abbreviated in the figure as "Mem") 1102, and an I/O port (abbreviated in the figure as "I/OP") 1103 are connected to the network 1104.

The management server 1200 has a management server internal network 1204, to which a processor (abbreviated as "Proc" in the diagram) 1201, a memory (abbreviated as "Mem" in the diagram) 1202, a management port (abbreviated as "MP" in the diagram) 1203, and an input/output device (abbreviate as "I/O device" in the diagram) 1205 are coupled. Examples of the input/output device include a display, a keyboard and a pointer device, but a device other than these devices may be used. Further, a serial interface or an Ethernet interface may be substituted with the input/output device. A display computer having a display, a keyboard or a pointer device may be connected to the interface, and display information or input information may be transmitted to or received from the display computer to display or receive the inputs on the display computer. Furthermore, the management server 1200 can receive a management operation request from a user (for example, an operator of the management server 1200 is often simply called "manager") and send the received management operation request to the storage system 1000. The management operation request is a request for operating the storage system 1000 and can be, for example, a parity group creation request, an internal LU creation request, and a path definition request. Each of those request is described below.

Hereinafter, a collection of one or more computers for managing the information system and displaying the display information of the invention of the present application is often called "management system." When the management server 1200 displays the display information, the management server 1200 is the management system. A combination of the management server 1200 and the display computer is also the management system. Moreover, the processing equivalent to the processing performed by a management computer may be realized by a plurality of computers in order to increase the speed and reliability of management processing, in which case the plurality of computers (including the display computer when it performs display) serve as the management system.

Connection via a fiber channel is a primary candidate for the I/O network 1300, but a combination of FICON (FIber CONnection: trade name), Ethernet (trade name), TCP/IP, and iSCSI or a combination of network file systems such as Ethernet, NFS (Network File System), and CIFS (Common Internet File System) can be also considered. Furthermore, the I/O network 1300 may be of any type, provided that it is a communication device capable of transferring I/O requests. In addition, the I/O network 1300 and the management network may be the same network.

The storage system 1000 comprises a controller (represented by CTL in the FIG. 1010, a cache memory (represented by Cache/Shared Mem in the FIG. 1020, and a plurality of flash memory devices (sometimes abbreviated hereinbelow as "FMD") 1030. Note that the FMD is typically considered as, but not limited to, a device that can be extracted from or inserted into the storage system as a maintenance replacement part. In the preferred embodiment, the controller 1010 and cache memory 1020 are composed of a plurality of components. This is because even when failure has occurred in a unit component and the component is blocked (i.e., becomes unavailable), the I/O requests represented by read or write request still can be continuously received by using the remaining components.

The controller 1010 is a device (for example, a circuit board) for controlling the operation of the storage system 1000. The controller 1010 has an internal network 1016. An I/O port 1013, a cache port (represented by CP in the FIG. 1015, a management port (represented by MP in the FIG. 1016, a backend port (represented by B/EP in the FIG. 1014, a processor (for example, a CPU) 1011, and a memory 1012 are connected to the network 1016. The controller 1010 and cache memory 1020 are connected to each other with a storage internal network 1050. Furthermore, the controller 1010 and each FMD 1030 are connected to each other with a plurality of backend networks 1040. Note that a connection medium and a protocol introduced in the I/O network 1300 may be adopted as the backend network, but other medium, such as SAS, SATA, or PCI-Express, and another protocol may be adopted.

The networks located inside the host 1100 and storage system 1000 preferably have bands wider than the transfer band of the I/O port 1013 and may be partially or entirely replaced with a bus or switch-type network. Furthermore, in the configuration shown in FIG. 1, one I/O port 1013 is present in the controller 1010, but actually a plurality of I/O ports 1013 may be present in the controller 1010.

The above-described hardware configuration enables the host 1100 to read or write some or all data saved in FMD 1030 of the storage system 1000, and the management server 1200 to manage the information system.

Figure 4:
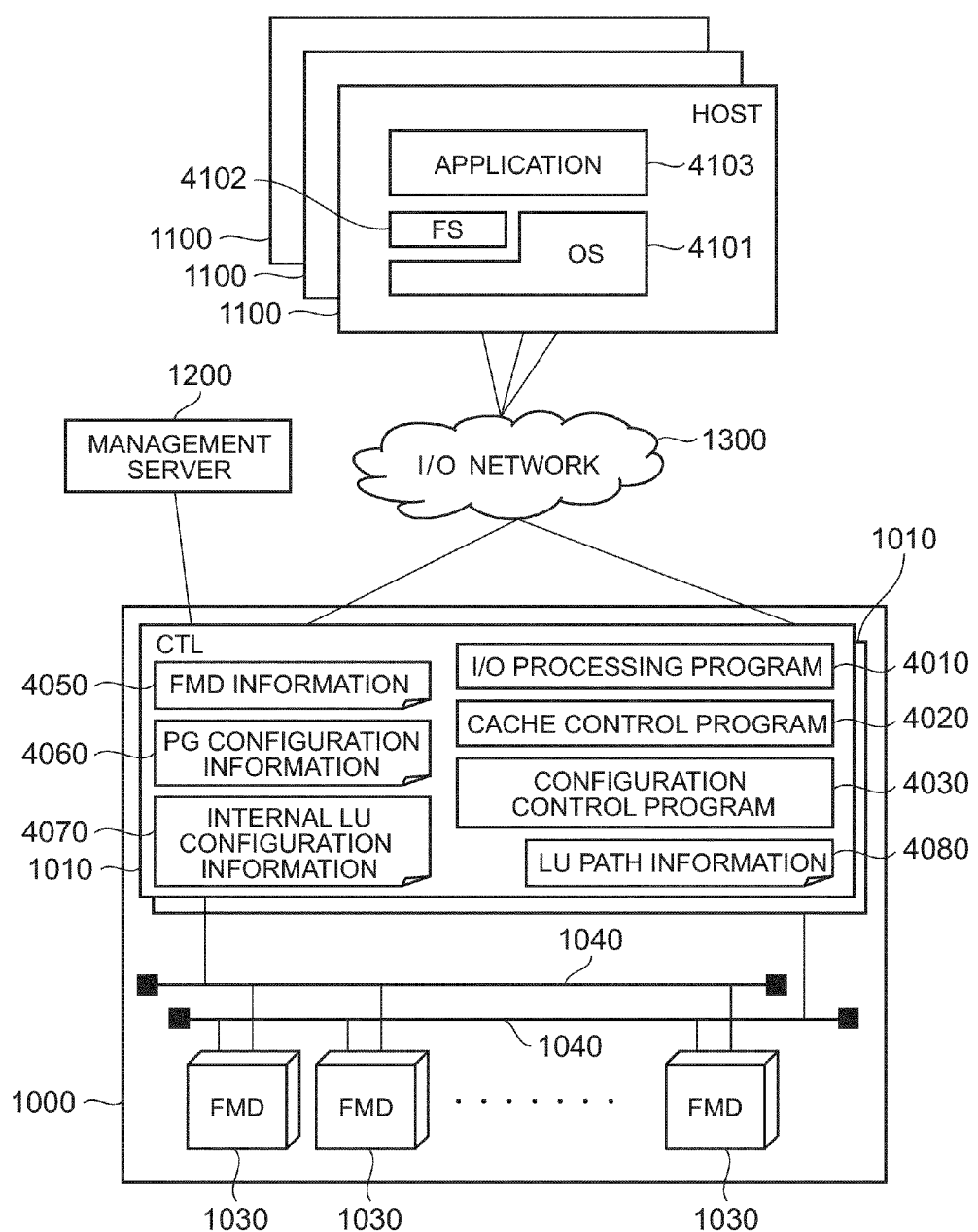
FIG. 4 shows computer programs and information present in the host and storage system.

FIG. 4 shows computer program and information present in the host 1100 and storage system 1000. Note that the computer programs and information included in the management server 1200 are described hereinafter.

In the controller 1010, FMD information 4050, PG configuration information 4060, internal LU configuration information 4070, and LU path information 4080 are held by at least one of the processor 1011, memory 1012, I/O port 1013, backend port 1014, and cache port 1015 in the controller 1010, and the controller executes an I/O processing program 4010, a cache control program 4020, and a configuration control program 4030. The entire information held in the controller 1010 or part thereof may be held in an area (for example, part of FMD 1030 or cache memory 1020) outside the controller 1010 inside the storage system 1000.

When a program is the subject in the following description, the program of subject will be executed by a processor.

The I/O processing program 4010 receives an I/O request (for example, a read request or a write request) from the host 1100 and executes processing according to this I/O request. More specifically, for example, the I/O processing program 4010 transfers the data saved in the cache memory 1020 (read object data corresponding to the read request) to the host 1100 and saves the data received from the host 1100 (write object data corresponding to the write request) in the cache memory 1020. When the I/O request from the host 1100 is in a block access format, the I/O processing program 4010 also can perform processing for providing a logical volume (for example, a logical unit (abbreviated as "LU") in SCSI) that will be the access object. Furthermore, when the I/O request from the host 1100 is in a file format, the I/O processing program 4010 can perform processing for providing a file or directory that will be the access object. The I/O processing program 4010 may also perform processing for providing access for other I/O requests (for example, database query or I/O request in a CKD format).

The cache control memory 4020 can, autonomously or together with the I/O processing program 4010 or independently therefrom, copy (including moving) the data saved by the FMD 1030 to the cache memory 1020 and copy the data saved by the cache memory 1020 to the FMD 1030. The cache control program 4020 may further perform the processing of producing and/or updating the redundancy data represented by RAID from the data saved in the cache memory 1020, as a processing for improving reliability.

The configuration information program 4030 can perform the processing of referring and/or updating at least one information of the FMD information 4050, PG configuration information 4060, internal LU configuration information 4070, and LU path information 4080 in response to a configuration change and/or configuration reference request. The configuration change and/or configuration reference request can be issued, for example, from at least one from among the management server 1200, host 1100, and other computers. Note that the configuration control program 4030 receives other requests from the management server 1200 described hereinafter, and responses to the request.

The FMD information 4050 includes information relating to FMD 1030. The PG configuration information 4060 includes parity group (sometimes abbreviated as PG hereinbelow) configuration information. The internal LU configuration information 4060 includes information for configuring some or all the areas of the FMD contained in the parity group as an internal logical unit (abbreviated hereinbelow as "internal logical unit" or "internal LU"). The LU path information includes information representing the correspondence relationship between the internal LU and the LU provided by the I/O port 1013 to the host 1100. In the explanation below, the case will be mainly described in which the internal LU does not extend through an area of a plurality of parity groups, but the present invention is not limited to this case. The internal LU may extend through the area having the plurality of parity groups and contain Concatenate or striping.

The internal LU is a logical entity that is present in case when a plurality of ports are associated with one storage area or when none of the ports are associated temporarily. Further, when a request inquiring the capacity or block size of the logical unit is received from the host 1000 or the management server 1200, the controller 1010 may transmit the capacity or block size of the internal LU in relation to the logical unit that is designated by the inquiring request. Similarly, when a request inquiring the identifier for the logical unit is received from the host 1000 or the management server 1200, the controller 1010 may transmit the value based on the LUNs allocated to the logical units or transmit the value based on the identifier of the internal logical unit corresponding to the logical unit.

Note that one or more, or all of the FMD information 4050, internal LU configuration information 4060, internal LU configuration information 4070, and LU path information 4080 may be called "storage configuration information." The storage configuration information may include other information.

In the host 1100, at least one of an OS 4101, a file system 4102, and application program (abbreviated hereinbelow as "application") 4103 is executed by at least one of the processor 1101, memory 1102, and I/O port 1103.

The application 4103 is a program (for example, a Web server program or database management program) for performing business processing in response to a request from a user or another computer, while reading and writing data such as files, by relying upon the OS 4101 or file system 4102.

The OS 4101 sends an I/O request issued by the application 4103 or file system 4102 to the I/O port 1013 of the storage system 1000 or receives data from the storage system 1000. The file system 4102 can convert the I/O request in the file format from the application to an I/O request in a block format or an I/O request in an network file system protocol format and request the transfer of the I/O request to the OS 4101. Note that the OS 4101 and the file system 4102 may include other processes.

The host 1100 may also execute other programs. Furthermore, the host 1100 may also send and receive a request other than the block I/O request or file I/O request, for example, a database query or CKD-type request. Moreover, the entire processing of the program including a file system or OS executable by the host 1100 or controller 1010, or part of the processing, may be implemented by the hardware.

Figure 24:
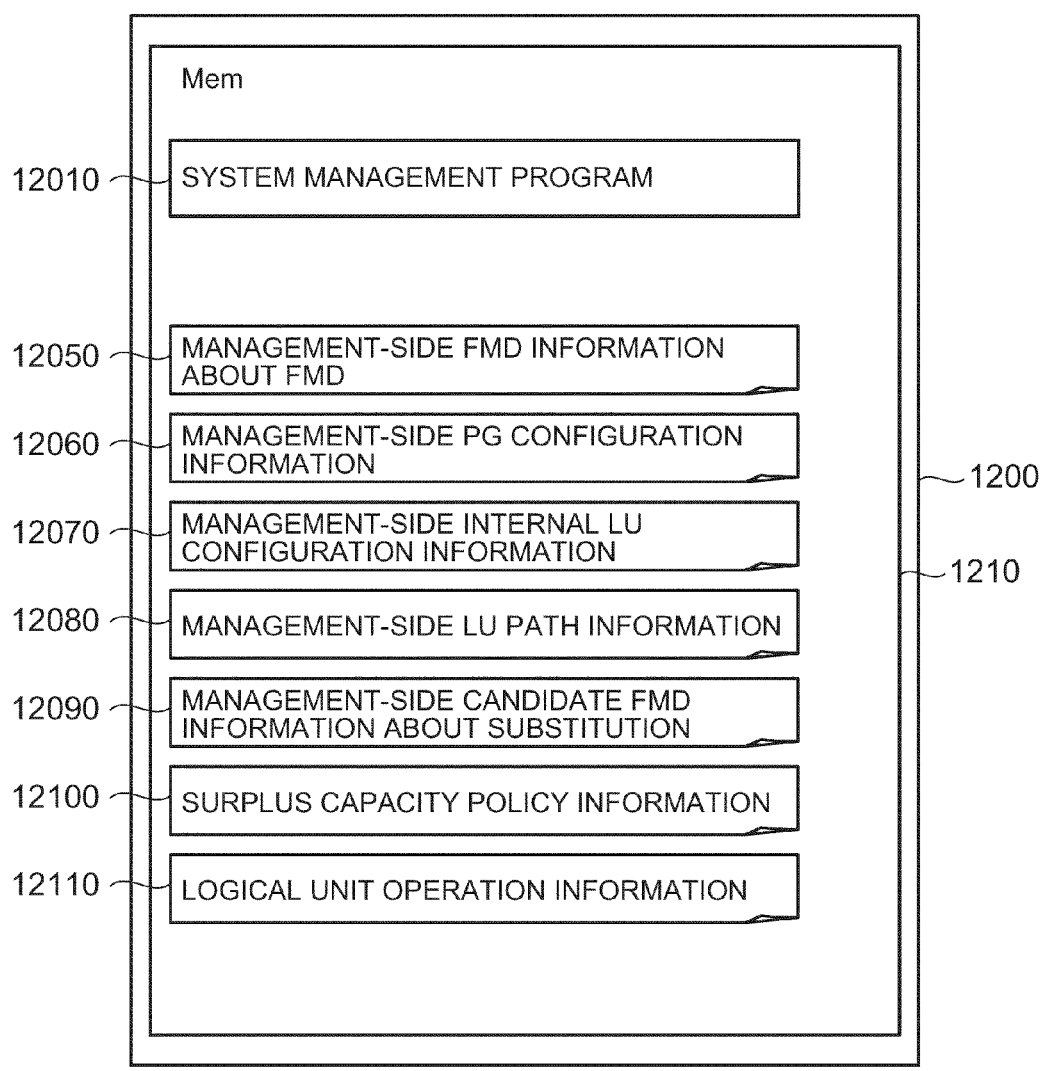
FIG. 24 is a diagram showing an example of a software configuration of a management server.

FIG. 24 is a diagram showing the computer programs and information present in the management server 1200. The memory 1210 stores a system management program 12010, management-side FMD information about FMD 12050, management-side PG configuration information 12060, management-side internal LU configuration information 12070, management-side LU path information 12080, management-side candidate FMD information about substitution 12090, surplus capacity policy information 12100, and logical unit operation information 12110. Note that the memory 1210 may store other data or omit some of the information items described above.

The system management program 12010 is a program that manages the storage system 1000 or the host 1100.

The management-side FMD information about FMD 12050 stores information on the FMD 1030 installed in the storage system 1000.

The management-side PG configuration information 12060 stores information on a parity group defined by the storage system 1000.

The management-side internal LU configuration information 12070 stores information on the internal LU defined by the storage system 1000.

The management-side LU path information 12080 stores information on the logical unit defined by the storage system 1000.

The management-side candidate FMD information about substitution 12090 stores the candidate FMD information about substation of the storage system 1000.

The surplus capacity policy information 12100 stores an operation policy based on the surplus capacity value of the FMD 1030. The logical unit operation information 12110 stores information on the operation of the logical unit.

Note that the management server 1200 may use a CD-ROM or other medium to store the system management program 12010 into the memory 1210. Furthermore, the management server 1200 may store the system management program 12010 distributed from a distribution computer into the memory 1210, or execute the installed program distributed from the distribution computer to store the system management program 12010 into the memory 1210 into the memory 1210.

Note that one or more, or all of the management-side FMD information about FMD 12050, management-side internal LU configuration information 12060, management-side internal LU configuration information 12070, and management-side LU path information 12080 may be called "management-side storage configuration information." The management-side storage configuration information may include other information.

<2. Overview of the Present Embodiment>

A flash memory (often abbreviated as "FM" hereinafter), which is a block-type storage device, performs data management in a unit called "page" or "erase block" (or "block"). Specifically, reading/writing of data from/to the flash memory is realized by the following three operations:

(Operation 1) Data reading operation targeting a designated page (Operation 2) Data writing operation targeting a designated page (Operation 3) Data deletion operation targeting a designated block Note that "block" is a unit of a collection of a plurality of pages.

The flash memory is suitable for random access because it does not involve a head seek or a rotation wait, by contrast with a HDD. However, the flash memory sometimes affects the data storing in association with how frequently the data are written or deleted (However, there are other causes that affect the data storing). For example, it is pointed out that when writing or erasing is performed on a certain page over a predetermined number of times, the probability of failure of data storage on this page increases.

As a countermeasure technique for resolving this problem, there is a rewriting technology called "wear leveling" described in U.S. Patent Application Publication No. 2007/0283079. In the wear leveling technology, when an access with write locality to the FMD functioning as a storage device using the flash memory is continuously received, the controller controlling the flash memory converts the address designated by the access made from the outside the host, to a page address or a block address of a flash memory chip by using address conversion information possessed by the FMD, and reads from or writes to a page of the flash memory chip, or deletes the block. The controller controlling the flash memory then performs control such that a specific address of the address space provided to the outside by the FMD does not always correspond to a specific page or block of a flash memory.

The FMD, on the other hand, is provided with not only a storage capacity provided to the controller 1010 as a device (to be referred to as "providing capacity" or "providing storage capacity" hereinafter) and a storage area having a capacity required for storing management information or redundancy code required for realizing the abovementioned storage capacity, but also a surplus storage area (to be referred to as "surplus area" hereinafter) just in case when a problem occurs in a certain amount of pages or blocks. By ensuring this surplus area, even in the case of a failure in some pages or blocks, the FMD can store the amount of data equivalent to the providing capacity by allocating pages or blocks obtained as the surplus area at the time of the occurrence of the failure. Note that until the occurrence of a failure, the surplus area may be used for allocation or wear leveling, or may be used for wear leveling before the occurrence of a failure (in other words, the surplus area is managed as it is).

Because the blocks of the storage device indicates the unit of access made minimally by the host, a page of the flash memory chip is called "block," and a block is called "segment" hereinafter, in order to avoid any confusion.

As described above, the storage system using the FMD processes an access request issued by the host, but it is difficult for the manager managing the storage system to conduct the management in consideration of the characteristics of the flash memory. Examples of the reasons are described below.

(Reason 1) Even when wear leveling is used, an FMD failure is caused by a block or segment failure in the flash memory, and at the same time this failure is hidden by the wear leveling processing. Therefore, it is not easy for the manager to analyze the condition of the FMD failure. In addition, outside the FMD, the storage system carries out integration and division of the data storage areas and/or divides one data storage areas to provided it as a logical unit, as typified by RAID processing. The storage system performs therein other processing such as complicated address conversion for providing the host with a plurality of storage areas by using a plurality of FMDs. Furthermore, the detail obtained from the address conversion changes depending on sparing, data migration or other method for realizing the storage system, and in some cases the storage system changes autonomously. Therefore, it is even more difficult for the manager to analyze the condition of the FMD failure.

(Reason 2) Even if an FMD having little surplus area left, such the FMD can be effectively utilized as long as writing is not performed thereon. However, at present, the FMD is not used in accordance with the situation and the capacity of the surplus area (i.e., the surplus capacity).

Figure 3:
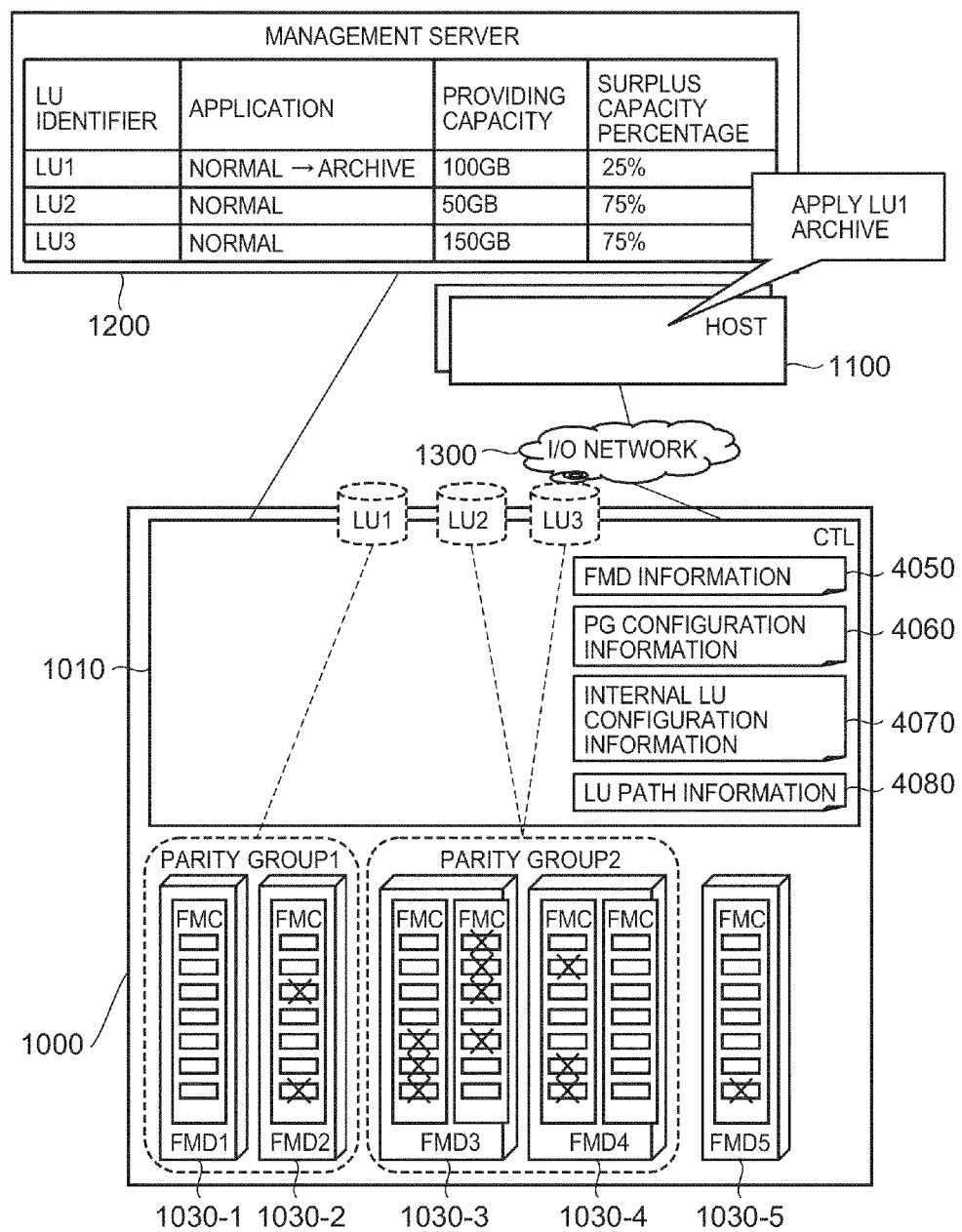
FIG. 3 illustrates an overview of the present embodiment.

FIG. 3 is a diagram showing the overview of the present invention.

FIG. 3 is used to describe an example in which the storage system 1000 is provided with five FMDs 1030-1 through 1030-5. Here, the FMDs 13030-1, 1030-2 and 1030-5 have one flash memory chip therein (to be referred to as "FMC" hereinafter), and the FMDs 1030-3 and 1030-4 have two FMCs therein. The FMD 1030-1 and the FMD 1030-2 configure a parity group 1, and the FMD 1030-3 and the FMD 1030-4 configure a parity group 2. The FMD 1030-5 is a substitution candidate FMD that is used as a substitution FMD when a failure occurs in the FMDs 1030-1 through 1030-4. The LU1 through LU3 are LUs to be accessed by the host, LU1 corresponding to the parity group 1, LU2 and LU3 to the parity group 2.

The FMD 1030-1, FMD 1030-2, and FMD 1030-5 have one FMC, and the FMD 1030-3 and FMD 1030-4 have two FMCs. The seven squares illustrated in each FMC in FIG. 4 represents segments, wherein the squares with an "x" mark represent the segments that are not appropriate for data storage due to the occurrence of a failure therein. Note that when the unit of failure management is indicated by a block, each square of the FMC may be replaced with a block.

The conditions of the FMDs 1030-1 through 1030-5 in the present embodiment are as follows.

Size of 1 segment: 50 GB
FMD 1030-1: Providing capacity=200 GB, Surplus capacity=150 GB, Failure capacity=0 GB
FMD 1030-2: Providing capacity=200 GB, Surplus capacity=50 GB, Failure capacity=100 GB
FMD 1030-3: Providing capacity=200 GB, Surplus capacity=150 GB, Failure capacity=350 GB
FMD 1030-4: Providing capacity=200 GB, Surplus capacity=350 GB, Failure capacity=150 GB
FMD 1030-5: Providing capacity=200 GB, Surplus capacity=100 GB, Failure capacity=50 GB
LU1: Host providing capacity=100 GB
LU2: Host providing capacity=50 GB
LU3: Host providing capacity=150 GB Note that the above example sets the segment size at a large value, but of course other value may be set. For example, in the present invention, 1 segment consists of several kilo bytes to several tens of kilo bytes (or bits), but typically it is set at a value larger than 512 bytes, which is the minimum size of the specification of the blocks that can be designated by a SCSI or other communication protocol through which the host accesses the storage. Similarly, the relationship between the numbers of parity groups, FMDs, LUs and FMCs may be one-to-one, many-to-one, one-to-many, or many-to-many, or the relationships may vary depending on the presence thereof. Considering the capacity efficiency and capacity performance, it is preferred that the FMDs 1030 configuring the parity groups have the same providing capacity, the same number of FMCs, the same block size and segment size, and the same FMD controller characteristics, but they are not necessarily the same. Further, at least one of the number of FMDs 1030 corresponding to the parity groups, the providing capacity, and the FMD internal configuration may vary between the parity group 1 and the parity group 2. Of course, the block size, the segment size and the capacity of the FMC incorporated in each FMD 1030 may also vary, and the number of FMCs may vary as well.

The controller 1010 has the following information, as described above.

FMD information 4050: Having the providing capacity and surplus capacity value of at least each FMD.

PG configuration information 4060: Having a correspondence relationship between at least each FMD and each parity group.

Information including internal LU configuration information and LU path information: Having a correspondence relationship between at least each parity group and a logical unit.

Based on the configuration information of the storage system, the management server 1200 obtains the surplus capacity value of the flash memory in relation to the logical unit (for example, the value of the surplus capacity represented with bytes or bits, the number of blocks or segments, the surplus capacity percentage (proportion of the surplus capacity to the providing capacity), or the value obtained by performing mathematical processing on these values). The management server 1200 then displays the obtained value to the operator, or uses each logical unit differently by means of one or more hosts 1100. In the example shown in FIG. 4, because the surplus capacity percentage of the logical unit functioning as the LU1 is the lowest, the information system changes the application of the logical unit functioning as the LU1 to archive application, when it is determined that the value of 25% is sufficiently low.

Note that when this surplus capacity value becomes close to a defined value (zero, for example), the surplus area of the FMD becomes insufficient. Therefore, the surplus capacity value may be applied to other specific examples as long as it indicates a high risk of a decrease in the reliability of data storage that is caused by failing in storing newly received write data or by generation of a degenerate state described hereinafter.

Note that the management server is considered to display the surplus capacity value to the following, in addition to the logical unit.

(Value 1) Display of the surplus capacity value to the FMD. Taking the surplus capacity percentage as an example, the management server displays the proportion of the providing capacity of the FMD to the surplus capacity of the FMD. In the operation performed by the manager referring to this information, the manager, for example, checks whether or not there is FMD that needs to be replaced due to shortage of surplus area, and takes FMD with low surplus capacity percentage as a replacement target. Addition of FMDs by referring to this information can also be considered.

(Value 2) Display of the surplus capacity value to a parity group. Taking the surplus capacity percentage as an example, the management server displays the minimum value of the surplus capacity percentage of one or more FMDs belonging to the parity group, the second small value following the minimum value, the average value, or the variance value. In the storage system adopting the data redundancy technology typified by RAID technology, the manager can easily understand the possibility of the degenerate state or blocked state by displaying the surplus capacity value in the parity group state. On the display screen having a limited display space, displaying the information of a parity group unit is excellent in compendium.

(Value 3) Display of the surplus capacity value to the logical unit. Taking the surplus capacity percentage as an example, the management server displays the surplus capacity percentage of one or more relevant parity group. Note that the same display may be performed for the internal LU described hereinafter. Because the host uses the storage area of the storage system by designating the logical unit, the manager displays the surplus capacity percentage to the logical unit or internal logical unit so as to be able to easily understand the condition in case of a host management.

(Value 4) Display of a value relating to the surplus of the flash memory, to the substation candidate FMD. The substitution candidate FMD that is used when defining a new parity group or performing dynamic sparing can be checked by using the value itself or comparing it with the value 1 or value 2. Further, when the storage system manages a FMD that is newly removed by dynamic sparing, as the substitution candidate FMD, the manager can be promoted to not use, in sparing, the new FMD that is removed from the parity group due to shortage of surplus area.

Note that these display information items may be used for a reason other than the reasons described above.

Incidentally, the surplus capacity of the FMD which is the original surplus capacity value decreases as the number of times writing is performed on the FMD or the amount of write data increases. For this reason, the host or the storage system may measure the number of times writing is performed on the FMD, parity group, logical unit, or internal LU, and the amount of write data, and estimate the surplus capacity value based on these values. However, it is preferred in terms of accuracy that the surplus capacity value be a value that is based on the number of faulty blocks (or faulty segments) managed by a section realizing wear leveling (the FM controller of the FMD 1030, or the controller 1010, for example), or the number of blocks on the actual flash memory chip. Examples of the reasons are described below.

(Reason A) Before the FMD is attached to the storage system, sometimes test writing is carried by the manufacturer or distributor of the flash memory chip. Further, sometimes there is a block that already has a problem from the beginning of the process of producing the flash memory chip.

(Reason B) Due to the function of the cache memory of the storage system 1000, it is not necessarily true that data attached to the write request from the host is transferred and written to the FMD every time.

(Reason C) The number of times writing or erasing performed on the actual flash memory depends on the wearing leveling processing. However, the wearing leveling technology often adopts a system that varies depending on the vendor of the FMD 1030 or the storage system 1000, in which case it is difficult to estimate the surplus capacity value in the section that is not actually subjected to wear leveling.

(Reason D) There is a case where the FMD has the cache memory therein.

Note that some or all of the reasons described above may not have to be taken into consideration, depending on the situation. For example, Reason A may be ignored as long as a high-quality chip can be produced.

Furthermore, when the surplus capacity value of the flash memory of at least one of a physical component typified by the FMD and a logical component, such as a parity group, logical unit and internal LU, is below a threshold set by the manager, the management server may notify the manager of the fact that the surplus capacity values is below the threshold value and information (identifier or the like) specifying a component (regardless of the logical or physical component) corresponding to the value below the threshold.

Moreover, when the surplus capacity value of the flash memory corresponding to the logical unit is below the threshold value set by the manager, it is considered that the management server sends an application switch request for specifying the logical unit corresponding to the value below the threshold (often referred to as "surplus area shortage logical unit"), to the outside, such as the host 1100 or a host user, such that the logical unit is used for storing data with low update frequency, such as WORM or archive.

Note that the following can be considered as embodiments in which the abovementioned surplus area shortage logical unit is used "for storing data with low update frequency" (it goes without saying that the following processing is carried out by each execution subject in response to the application switch request).

Embodiment 1

When a first host (or the application on the host or the host user) that performs only writing into the surplus area shortage logical unit receives the application switch request, data writing is performed other logical unit, instead of performing writing on the above logical unit (if updating a part of the data stored in the logical unit, data movement or copy may be carried out on the other logical unit before the update).

Embodiment 2

The settings of a host (second host) that updates the data with low update frequency, such as an archive program, are changed so that the second host can use the surplus area shortage logical unit for the purpose of low frequency, the second host being different from the first host that carries out writing on the surplus area shortage logical unit. Specifically, the first host moves the data of the surplus area shortage logical unit to another logical unit that can be accessed by the first host, and thereafter the first host performs setting so as to inhibit the use of the surplus area shortage unit. The second host then recognizes the abovementioned surplus area shortage logical unit, and performs setting of the format or the like used by an archive server. As an example of the archive program, a file server program or a database server program that inhibits deletion and update from an external request during a period defined for the stored data can be considered, but this is merely an example. In addition, a computer that executes the archive program is often called "archive computer" or "archive server."

Embodiment 3

The storage system performs data migration of the surplus area shortage logical unit (i.e., the data of the surplus area shortage logical unit is migrated from the FMD belonging to the parity group corresponding initially to the surplus area shortage logical unit (movement source parity group) to the FMD belonging to another parity group (movement destination parity group)). Then, the storage system performs either one or both of the following:

(A) Data migration to move the logical unit "for storing data with low update frequency" defined in another parity group to the movement source parity group; and (B) Defining the logical unit "for storing data with low update frequency" (internal LU described hereinafter) in the movement source parity group, and providing it to the second host described in Embodiment 2.

However, as long as the processing of the host, management server and storage system is performed so as to reduce the update frequency of the data stored in the parity group corresponding to the surplus area shortage logical unit, a different embodiment other than those described above may be adopted.

Note that when calculating the surplus capacity value of the flash memory corresponding to the abovementioned component (regardless of the logical or physical component), it is preferred that the storage system calculate promptly to acquire an accurate value, because the storage system manages the information which is the source of calculation. However, the surplus capacity value may be calculated on the management server side by using required information. Of course, the storage system and the management server may share the calculation work. Note that in some cases the concept of parity groups does not exist, depending on the mounting pattern of the storage system. The present invention is applicable in this case well. Specifically, the processing associated with the parity groups may be read as the processing associated with the FMD. Similarly, in some cases the concept of internal LU does not exist, depending on the embodiment of the storage system. The present invention applicable in this case as well. Specifically, the description of the internal LU may be replaced with that of the logical unit.

The above has described an overview of the present invention, and the present invention indicates that the problems, effects, processes and configurations that are not described in the overview should be subjected to execution of right. Of course, when displaying the surplus capacity value of the flash memory, at least one or all of the items described above are always displayed, but the processing for realizing the logical unit "for storing data with low update frequency" may not be performed. On the other hand, only the processing for realizing the logical unit "for storing data with low update frequency" may be performed without displaying the surplus capacity value of the flash memory, or both of them may be performed.

The storage system 1000 may also have a configuration in which FMD 1030 and HDD are mixed (not shown in the figure). In this case, because I/O characteristics (for example, random access of sequential access, a large number of write requests or a large number of read requests) differ between the HDD and FMD 1030, a parity group can be configured of HDDs and a parity group explained in the present embodiment can be configured with respect to FMD. In other words, a parity group of HDD and a parity group of FMD may be co-present in one storage system 1000.

<3. Detailed Description>
<3.0. Block Size>

Figure 20:
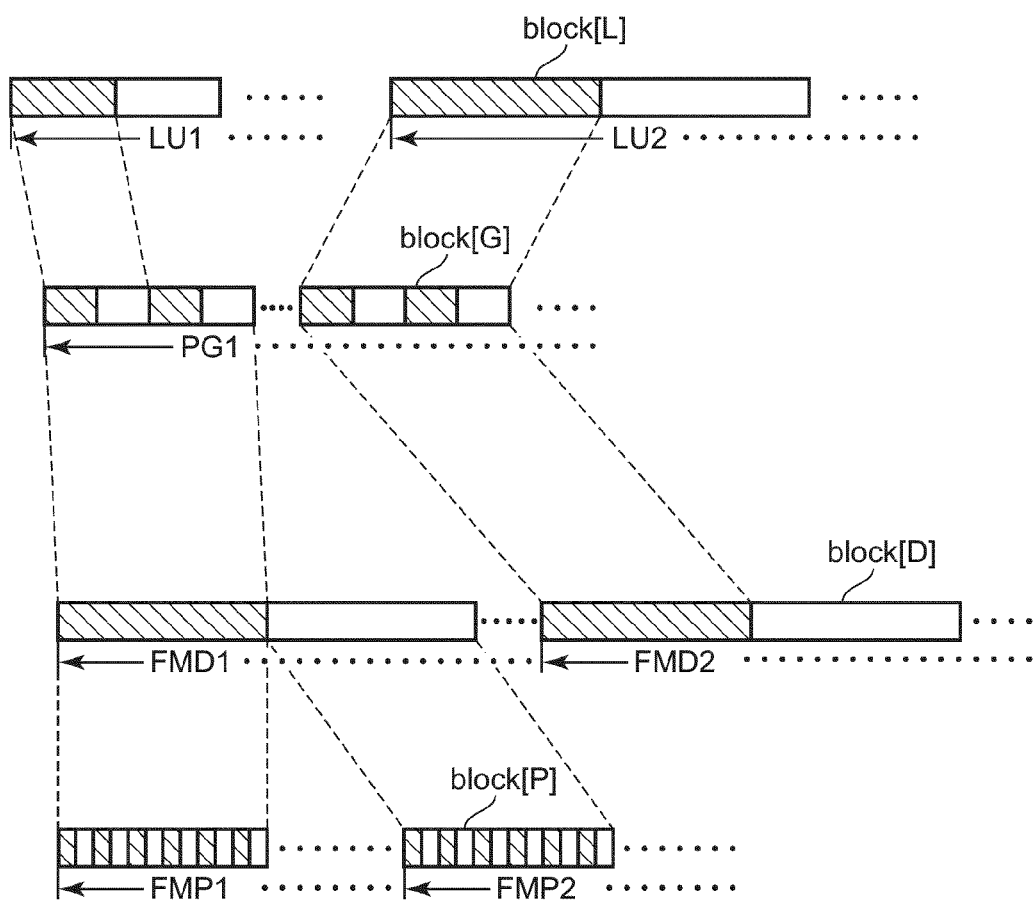
FIG. 20 shows an example of the hierarchical structure of the address space.

A block size in the present embodiment will be described by referring to FIG. 20 prior to a more detailed explanation. In the present embodiment, an address space (more accurately, indicates a device identifier and an address space inside the device) is divided into the below-described four layers and a different block size can be employed in each layer.

(Layer 1) An address space used when FMC is accessed. When this layer is described in the explanation below, a symbol '[C]' is attached to the end of a word.

(Layer 2) An address space used when the FMD 1030 is accessed. The FMD 1030 sometimes employs a block size different form that of the FMC. This is done so because the FMD 1030 comprises a plurality of FMC and in order to avoid the below-described specific feature of flash memory. When this layer is described in the explanation below, a symbol '[D]' is attached to the end of a word.

(Layer 3) An address space allocated to a parity group so that the controller 1010 can manage data on the cache memory 1020. In the present embodiment, the FMD 1030 having various block sizes is assumed to be connected to the controller 1010. Accordingly, in the I/O processing or cache control processing, the controller 1010 can allocate the address space to the parity group with the predetermined block size (for example, 512 byte, which is the minimum block size that is most typical for SCSI) so that such different block sizes may be ignored as completely as possible. For this purpose, block size conversion is performed at the point of time of staging or destaging processing of copying data between the cache memory 1020 and FMD 1030. When this layer is described in the explanation below, a symbol '[G]' is attached to the end of a word.

(Layer 4) An address space used when a LU (or the below-described internal LU) is accessed. Because LU with a block size other than 512 byte is sometimes provided to the host 1100, a block size different from the cache level is employed. When this layer is described in the explanation below, a symbol '[L]' is attached to the end of a word. Each block from layer 1 to layer 4 sometimes includes a redundancy code or data for control (for example, the controller 1010 issues an I/O request so as to save data together with a redundancy code in block [D] of the FMD 1030).

<3.1. FMD>
<3.1.1. Overview>

Figure 2:
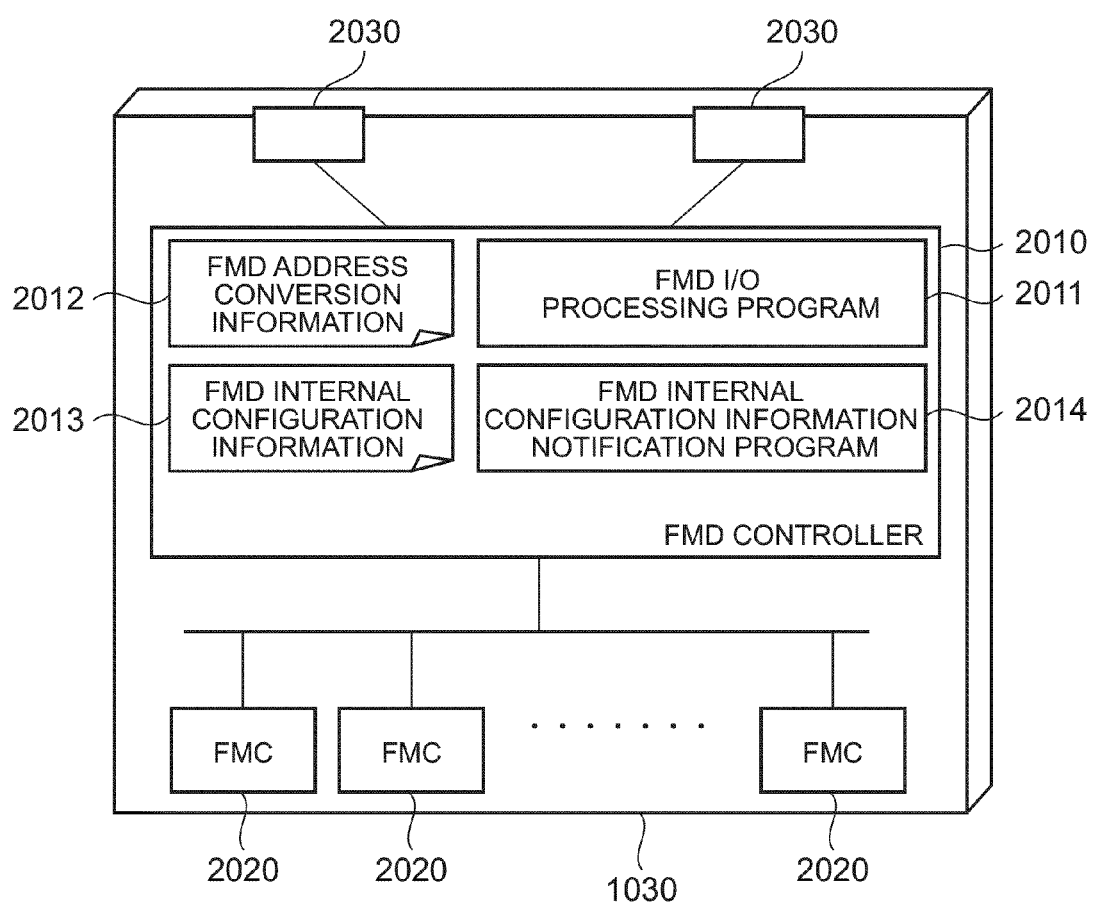
FIG. 2 shows an example of hardware configuration and an example of software configuration of an FMD.

FIG. 2 illustrates an example of hardware configuration and software configuration of an FMD.

The FMD 1030 comprises an I/O port 2030, an FMD controller 2010, and a plurality of FMC 2020. The I/O port 2030 is connected to a backend network 1040 and the FMD controller 2010. The FMD controller 2010 is connected a the plurality of FMC 2020.

Preferably, the FMD 1030 comprises a plurality of I/O ports 2030. This is because due to redundancy of the backend network 1040, connecting each redundantized backend network 1040 with FMD 1030 by independent components is desirable for sustaining the redundancy. However, the FMD 1030 may be one I/O port.

Here, in addition to the above-described specific features, the FMC 2020 has the below-described specific features (A1) through (A4) that are absent in HDD or DRAM (Dynamic Random Access memory).

(A1) An access unit is a block.

(A2) When block data are updated, an erase command for erasing in segment units assembling a plurality of blocks has to be used.

(A3) If update is repeated for the same block, the update processing can fail.

(A4) When the updating some blocks, Data corruption in another blocks sometimes occurs.

In order to perform I/O processing (data updating or reading in response to an I/O request from the controller 1010) that takes those specific features into account, the FMD controller 2010 is equipped, for example, with an FMD I/O processing program 2011, an FMD internal configuration information notification program 2014, an FMD address conversion information 2012, or an FMD internal configuration information 2013. Furthermore, with consideration for the above-described specific features, the FMD 1030 can ensure a surplus area by reporting, to the controller 1010, a storage capacity that is less than the total storage capacity of a plurality of FMC 2020, as the providing capacity.

The FMD address conversion information 2012 includes a correspondence relationship of a block address contained in the I/O request received by the FMD controller 2010 and a block of the FMC 2020. For example, the FMD address conversion information 2012 can hold the information of the below described types (B1) and (B2) in each logical block address unit (but B2 is not necessary).

(B1) Identifier and block address [C] of the FMC that has actually saved the data of address [D].

(B2) Number of time the address [D] has been referred to.

The FMD internal configuration information 2013 is information for monitoring the failure state of each flash memory chip and preferably holds the information of the following types (C1) and (C2) in area units where at least one segment located in each FMC 2020 is collected.

(C1) Failure state.

(C2) Erase completed information.

This information 2013 also holds information for managing a surplus block and attributes (for example, block size [D], number of blocks [D]) of a storage area (in other words, an address space) provided as FMD to the controller 1010.

The FMD I/O processing program 2011 analyzes the I/O request receives by the FMD controller 2010 via the I/O port 2030 and performs the update of data saved by the FMC 2020 and data transfer to the controller 1010 after the data have been read out from the FMC.

<3.1.2. I/O Processing of FMD>

The processing contents of the FMD I/O processing program 2011 will be described below.

(Step 1) The FMD I/O processing program 2011 receives an I/O request.

(Step 2) When the request is a read request, the FMD I/O processing program 2011 specifies at least one flash memory chip 2020 where data have been saved and a block [C] in this chip from the start logical block address [D], block length [D] and FMD address conversion information contained in the request, reads data from the specified block [C], returns the data that were read out to the a request transmission source (controller 1010), and returns to Step 1. When the request is a write request, the FMD I/O processing program 2011 executes Step 3 and subsequent steps for each received block data.

(Step 3) The FMD I/O processing program 2011 retrieves a block [C] satisfying all of the following conditions (D1) through (D3) from the FMC next to the FMC 2020 that was used for storing data recently.

(D1) Failure has not occurred.

(D2) Unused area.

(D3) Contained in a segment where implementation of erase command has been competed.

The FMC 2020 that was used for storing data recently can be specified, for example, by providing an information area corresponding to each FMC 2020 installed on the FMD 1030 in the FMD internal configuration information 2013, set information (for example, writes "1") in the information area corresponding to the FMC that was used for storing data recently, and unset the information (for example, changing "1" to "0") of the information area corresponding to the FMC that was used for storing data recently before the setting. As another method, specification can be also conducted by saving an identifier of FMC in the controller when the FMD controller 2010 saves data to the FMC. Furthermore, the next FMC can be considered as a FMC with a number by 1 larger than the number of the FMC 2020 where data were saved in the previous cycle.

When the block [C] meeting the above-described conditions cannot be found from this FMC, the FMD I/O processing program 2011 repeats the search from further next FMC.

(Step 4) The FMD I/O processing program 2011 saves all the write data (data of a write object according to the write request) or part thereof with respect to the found block [C]. The program 2011 may also involve processing of one or all types from (E1) and (E2) in combination with the saving processing.

(E1) Prior to saving, a redundancy code such as a LRC (Longitudinal Redundancy Check) or CRC (Cyclic Redundancy Check) is calculated from the write data, and write data are stored together with the redundancy code. This redundancy code is used to check the presence of data corruption when a read request is received. When data corruption has occurred, an error is returned by the read request and the occurrence of block failure is recorded in the FMD internal configuration information 2013.

(E2) After saving, the block data are read from the FMC 2020 and compared. When the comparison fails, the occurrence of a failure in the block is recorded in the FMD internal configuration information 2013 and the processing is restarted again from Step 3.

(Step 5) The FMD I/O processing program 2011 updates the block address [C] and FMC 2020 corresponding to the block address [D] of the address conversion information 2012 so as to indicate a block [C] of the FMC that saved data anew, and the block [C] prior to updating is taken as an unused area.

Furthermore, as a separate processing, the FMD I/O processing program 2011 can execute the processing of enabling writing into the block that became an unused space anew by an erase command (erase processing). However, because the erase command can be executed only in segment units where a plurality of blocks are collected, a procedure can be considered by which the erase command is executed after the entire segment has been made an unused area by block data movement, and after the command execution is completed, erase completed information is set in the FMD internal configuration information 2013 (that is, a record is made that the segment has been erased). Such processing can be performed repeatedly in response to the request processing or at an asynchronous timing.

Where some or all the below-described conditions (F1) through (F4) are provided with respect to the above-described erase processing or read or write processing method with consideration for the specific features (A1) through (A4), it maybe replaced with another processing.

(F1) Update concentration to the same block in a flash memory chip is avoided.

(F2) Erase processing is executed prior to block overwriting in a flash memory chip.

(F3) Data transformation accompanied by a redundancy code is detected and repaired.

(F4) Wear leveling processing to enable the distribution of access to a plurality of flash memory chips is conducted (for example, a method described in Japanese Patent No. 3507132).

<3.1.3. FMD Internal Configuration Information Notification Program>

The FMD internal configuration information notification program 2014 is a program for notifying the controller 1010 or the like of the internal information of the FMD. An example of information provided by the program 2014 is shown in (G1) through (G8) below.

(G1) Block size [D] of the FMD 1030 (the controller 1010 performs access in block size units).

(G2) The number of provided blocks [D] of FMD (the controller 1010 sometimes knows the providing storage capacity from the number of blocks and block size [D]).

(G3) A surplus capacity value (also expressed by the number of blocks) inside the FMD. As a processing for providing such surplus capacity value, the number of segments (or the number of blocks) where failure has occurred in the FMD internal configuration information 2013 may be found and the following calculation may be conducted:

> Number of surplus blocks=(number of blocks in the entire flash memory chip)−(number of blocks where failure has occurred)−(number of blocks described in (G2)) or number of unused blocks (when the number of provided blocks [D] is always allocated in accordance with the providing capacity, from when use of the FMD is started).

When part of the flash memory chip is used for management or internal redundantization, the calculation may be conducted by taking the number of blocks into account (for example, deducting). Furthermore, in the calculation formula presented above, because the block size of the FMC is taken as a reference, it can be recalculated into the block size of the FMD when information is provided. Note that the above has described the calculation formula in which the number of blocks is used, but it goes without saying that other surplus capacity values can be obtained by multiplying the number of blocks by a predetermined value.

(G4) Threshold value.

(G5) An alarm when a value obtained by dividing the number of surplus blocks [D] of (G3) by the number of usable blocks [D] of (G2) is equal to or less than the threshold value of (G4). This alarm may emulate HDD by providing a value identical to that provided when a failure occurred in HDD.

(G6) The number of FMC implemented in the FMD 1030. Furthermore, the number obtained by deducting the number of FMC that were found to be impossible to use due to a failure from the number of FMC carried by the FMD 1030. In addition, the FMD internal configuration information notification program 2014 may send an error message of the I/O request to the controller 1010 in the following cases.

(G7) A voltage or electric power provided to the FMD 1030 is in shortage, or the internal bus of the FMD 1030 or the FMD controller 2010 is damaged.

(G8) Corruption of data saved in the FMC is detected by the FMD controller 2010.

Note that the connection medium and the communication protocol between the FMD 1030 and the controller 1010 may be anything. Further, the write request to the FMD 1030 may be a request for updating the data stored by the FMD 1030, and the read request to the FMD 1030 may be a request for referring to the data stored by the FMD 1030.

<3.2. Information Managed by Storage System>

FIG. 5 shows a example of FMD information 4050 saved by the controller 1010.

The FMD information 4050 has the following information (H1) through (H6) for each identifier of the FMD 1030 corresponding to each FMD 1030.

(H1) Blockage information. The blockage information is in a blocked state in the case of an unusable state for the FMD, and a normal state in other cases. Note that examples of an unavailable condition include a case in which a failure occurs in the hardware or the FMD 1030 is extracted, and a case in which the surplus area of the FMD 1030 shown in FIG. 2 becomes insufficient or depleted.

(H2) WWN (World Wide Name). A communication identifier of a Fiber Channel necessary to access the FMD 1030. In an actual Fiber Channel, a Port number (also called "port ID") is created from the WWN and communication is carried out by using the value thereof. Therefore, the Port number may be registered. In addition, it may be replaced with another identifier (for example, IP address, TCP/IP port number, iSCSI Name, etc.) for communication from the controller 1010 to the FMD 1030.

(H3) LUN (Logical Unit Number). In the present embodiment, because the FMD is provided with only one logical unit, the LU number provided by the FMD may be saved. Of course, this entry may be omitted when it is obvious that the FMD 1030 response with a fixed LUN only.

(H4) Model number of FMD. Because when the storage system 1000 is used for a long time, a plurality of model numbers are used due to maintenance.

(H5) The providing capacity of the FMD, block size [D], and number of flash memory packages. Of those types of information, at least one type is provided to the controller 1010 by the FMD internal configuration information notification program 2014 of the FMD 1030.

(H6) The surplus capacity value of the FMD. The surplus capacity is repeatedly updated by repeatedly acquiring the information from the FMD 1030.

Information representing a physical position installed in the storage system for each FMD 1030 may be also included in the FMD information 4050 (such information is not shown in the figure).

Figure 6:
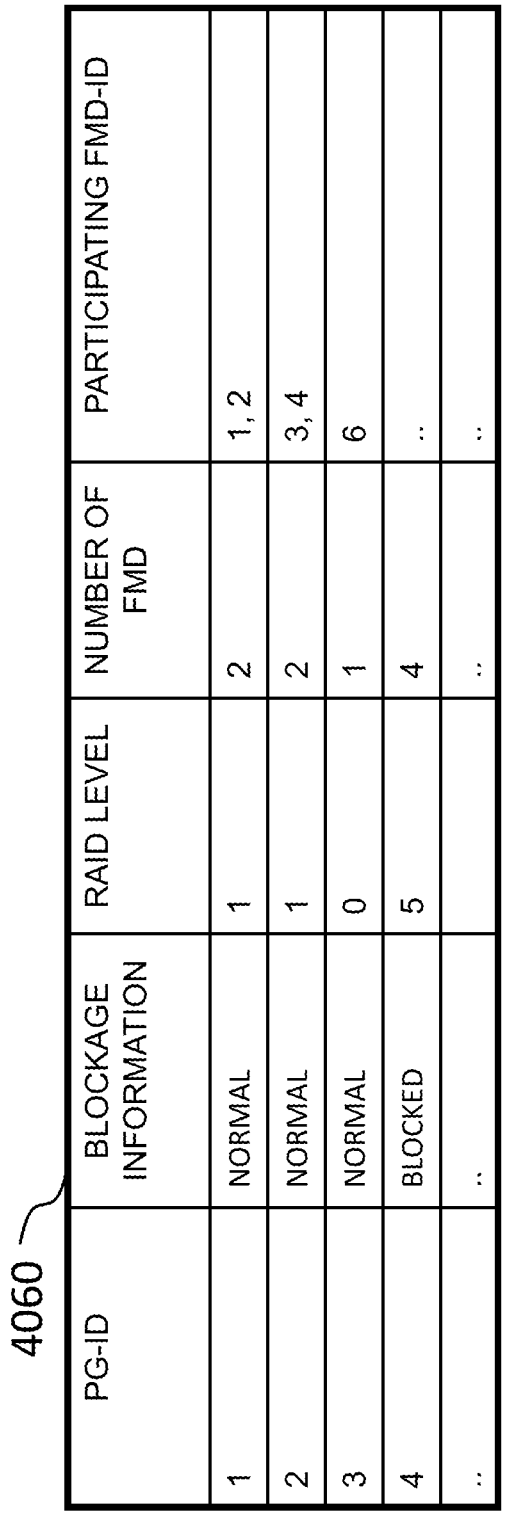
FIG. 6 shows an example of the PG configuration information.

FIG. 6 shows an example of PG configuration information 4060.

The PG configuration information 4060 has the following information (I1) through (I3) for each identifier of respective parity group (PG).

(I1) Blockage information. The blockage information is in the blocked state in the case of an unusable state of PG and the normal state in other cases. The unusable state can be represented by the case where a multiplicity of the following events have occurred.

(Event 1) Hardware failure.

(Event 2) FMD 1030 has been pulled out.

(Event 3) The controller 1010 received a report that a surplus area is small or insufficient in the case of the FMD 1030 shown in FIG. 2.

(I2) RAID level.

(I3) The number of FMD 1030 belonging to a parity group and an identifier of the FMD.

As described hereinabove, the controller 1010 can allocate the address spaces to parity groups. FIG. 8 shows a relationship between an address space [D] of the FMD 1030 and an address group [G] of a parity group for RAID 1+0 taken as an example, FIG. 9 shows a similar relationship for the case where RAID 5 is taken as an example.

Explanation of Examples

FIG. 8 and FIG. 9 illustrate a case where a parity group 8100 is configured by using four FMD 8200, 8210, 8222, 8230. The hatched box 8010 shows a block [D] of the FMD, and the block address [D] thereof is shown in 8011. A box 8020 having a dot line frame inside the box 8010 represents a block [G] allocated by the controller 1010 to the parity group 8100, and block address [G] allocated by the controller 1010 is shown in 8021. A block size [G] of the block 8020 can be 512 byte, which is the minimum block size provided by the SCSI standard, but other sizes may be also used.

RAID 1+0:

In the case of RAID 1+0, the controller 1010 allocates identical address spaces to two FMD for mirroring and then conducts striping (for example, FMD 8200 and 8210, FMD 8220 and 8230). In the case of striping, the controller 1010 switches the next address space [G] to an another FMD for each determined number of blocks (termed hereinbelow as number of consecutive blocks for striping) (in this example, 4 in block [G] and 2 in block [D]). The stripe size (the I/O size relating to reading and writing data from all the FMD in the parity group) can be calculated by the following formula.

Stripe size=(number of consecutive blocks [G] for striping)×(number of FMD divided by 2)×(block size [G]).

In the case of RAID 1, striping of RAID 1+0 is omitted and the explanation is, therefore, also omitted. RAID 5:

In the case of RAID 5, the controller 1010 also conducts striping processing and allocates the parity saving areas by using the number of consecutive blocks for striping as a unit (in this example, P3 from the address P0 is an area for saving the parity from address 0 to 11). In the case of RAID 5, the stripe size can be calculated by the following formula.

Stripe size=(number of consecutive blocks [G] for striping)×(number of FMD minus 1)×(block size [G]).

FIG. 7 shows an example of the internal LU configuration information 4070.

The internal LU configuration information 4070 holds the following information (J1) through (J4) for each respective identifier of internal LU. The LU provided as a storage area to the host 1100 is provided to an external unit by defining a path based on the internal LU. The term "external unit" used herein may mean a device of other type, for example, a virtualizing switch or another storage system used instead of or in addition to the host 1100. In other words, the device of other type can issue an I/O request to the storage system, instead of or in addition to the host 1100.

(J1) Blockage information. The blockage information is in the blocked state in the case of an unusable state for the internal LU (for example, when the parity groups is blocked or when no area is allocated to the internal LU), and in the normal state in other cases.

(J2) PG identifier, start address [G], and end address [G]. They indicate a parity group used as the storage area of the internal LU, a start block address [G] in the parity group, and an end block address [G] in the parity group. The present entry is managed by the controller 1010. Therefore, the block address is managed based on the blocks for the controller. But in this case, it is also possible to prevent a plurality of internal LU from using the same striping or FMD block [D] by employing the values of the start address [G] and end address [G] that take the stripe size or block size of the FMD 1030 into account. When storage areas of a plurality of parity groups are allocated to the internal LU, in the entry of the internal LU configuration information 4070, a plurality of entries will be made for the (J2) information and information for joining the space defined by (J2) will be added.

(J3) Block size [L]. The controller 1010 takes, for example, 512 byte as a block size, but because a larger block size is sometimes desired by the host 1100, the block size based on the assumption of a request from the host 1100 is held.

(J4) Compare information. The option for designating whether to compare with parity or mirror information when the controller 1010 conducts staging to the cache memory 1020. Reliability can be improved when such comparison is performed.

FIG. 13 shows an example of the LU path information 4080.

For example, the following information (K1) through (K3) is held in the LU path information 4080.

(K1) Identifier of the internal LU provided to the host 1100.

(K2) WWN (or identifier of the I/O port 1013). This information indicates the port 1013 from which the internal LU is provided to the host 1100. As described hereinabove, the WWN may be replaced with an identifier of another type such as a port number. Note that, hereinafter, "port identifier" indicates any of these values.

(K3) LUN

This information indicates as which LUN of the WWN described in (K2) the internal LU to be provided to the host is provided.

Because only limited number of LUN can be defined, it is not necessary to allocate WWN and LUN to all the internal LU defined in the storage system 1000, and the LUN may be used effectively by allocating certain WWN and LUN to the certain internal LU in the some period, and allocating the same WWN and LUN to the another internal LU in another period.

<3.3. Parity Group Definition>

FIG. 14 is a flowchart illustrating the definition processing of a parity group executed by a configuration control program 4030. Each step of the processing will be described below.

(Step 14001) The configuration control program 4030 provides the entire FMD information 4050 or part thereof to the management server 1200, if necessary. The management server 1200 may implement any of the below-described (Method 1) and (Method 2) or both methods.

(Method 1) A group configured based on at least one of the model, providing capacity, block size, and surplus capacity value is displayed on a display device.

(Method 2) A group configured based on the number of flash memory chips (FMC) is displayed on the display device.

The expression "if necessary", for example, refers to the case where the management server 1200 sends an information request because it is necessary to display the information located inside the controller in response to the user's request, and the configuration control program 4030 receives the request from the management server.

(Step 14002) The configuration control program 4030 receives from the management controller 1200 a parity group definition request comprising identifiers of a plurality of FMD 1030 (the identifier can be also replaced by the installation position on a physical storage system or logical identification information) and a RAID level and creates and/or updates the PG configuration information 4060 based on the information (each FMD identifier and RAID level) attached to the request. Defining undesirable parity group configurations may be avoided by adding at least one check processing (or processing displaying the check results) of at least one type from among the below-described (Check 1) through (Check 5) prior to the aforementioned processing.

(Check 1) A check of whether or not at least two of the FMD 1030 from among a plurality of FMD 1030 contained in the parity group definition request are accessible (inducing read and write based on the I/O request) when one of the components (indicates the controller, cache memory, back-end I/O network, etc.), except the FMD, located in the storage system 1000 was blocked by a failure or the like. If the access is impossible, the data recovery processing will fail. This check is aimed at preventing the I/O request from being stopped by a one-point blockage. At a RAID level accompanied by mirroring, such as RAID 1 and RAID 1+0, this check (Check 1) may be performed with respect to both FMD that are in the mirroring relationship.

(Check 2) A check of whether or not the numbers of FMC in all the FMD 1030 designated by the parity group definition request are different. This check is conducted to aid the parity group configuration definition.

(Check 3) A check of whether or not the model numbers in all the FMD 1030 designated by the parity group definition request are different. When the number of FMC is related to the model number of the FMD 1030, this check may be included into (Check 2). However, when the FMD 1020 all having the same model number cannot be designated, e.g., because they are out of stock, it is also possible to define the parity group configuration by ignoring the alarm caused by this check.

(Check 4) A check of whether or not the total providing capacities in all the FMD 1030 designated by the parity group definition request are different. This check is aimed at ensuring effective use of all the providing capacities. However, when the FMD all having the same capacity cannot be designated, e.g., because they are out of stock, it is also possible to define the parity group configuration by ignoring the alarm caused by this check.

(Check 5) A check of whether or not the block sizes [D] of a plurality of FMD 1030 designated by the parity group definition request are different. Because the block size [D] of the FMD becomes a data unit during staging to the cache memory 1020 or destaging, this check serves to reduce the variations of I/O performance inside the parity group.

Furthermore, as Check 6, the configuration control program 4030 may check as to whether or not different storage devices (for example, HDD and FMD 1030) have been designated from one parity group and may report to the management server 1200 in the case where the devices of different type have been designated.

(Step 14003) The configuration control program initializes a parity group (including the creation of mirror data or parity data).

(Step 14004) The configuration control program 4030 changes the blockage information the parity group corresponding to the PG configuration information 4060 from the blocked state to the normal state, indicates the possibility of use, and returns a completion message to the management server 1200.

Furthermore, when the number of FMC or total storage capacity can be uniquely specified by the model number of the FMD 1030, the model number list of the FMD for which the definition of parity group is possible may be created for the check of each type by an external device (for example, the computer of the company producing the storage system 1000) of the storage system 1000, and this list may be downloaded into the controller 1010 and used for the check.

<3.4. Internal LU Definition>

Figure 15:
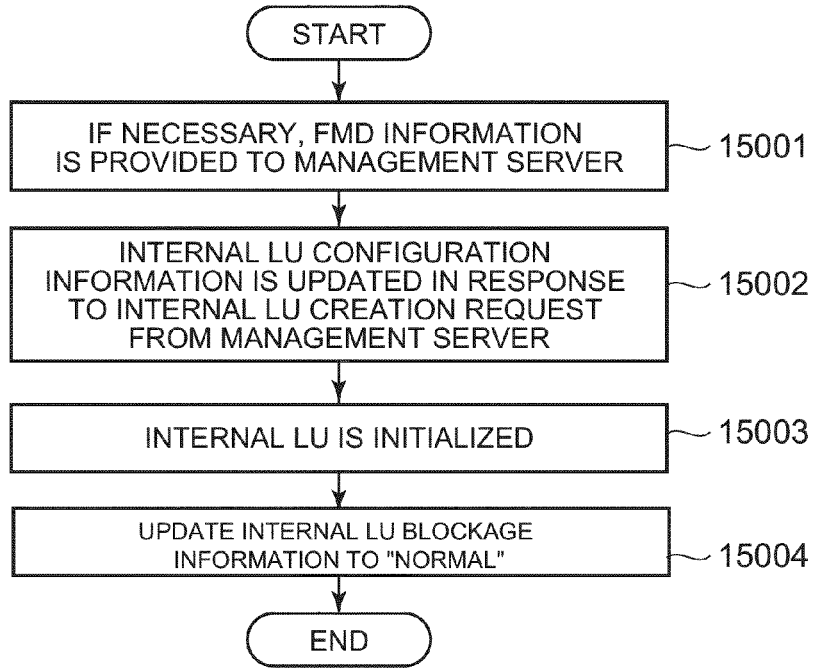
FIG. 15 is a flowchart illustrating the definition processing of an internal LU executed in the configuration control program.

FIG. 15 is a flowchart illustrating the definition processing of an internal LU executed by a configuration control program 4030. Each step of the processing will be described below.

(Step 15001) The configuration control program 4030 sends the entire PG configuration information 4060 or part thereof to the management server 1200 in response to the request from the management server, if necessary.

(Step 15002) Once the configuration control program 4030 receives an internal LU definition request containing information of some or all (Argument 1) through (Argument 5) described below from the management server 1200, it produces and/or updates the internal LU configuration information 4070 based on the information attached to the request.

(Argument 1) Identifier of a parity group.
(Argument 2) Start address [G] of the parity group.
(Argument 3) Storage capacity of the internal LU or end address [G] of the parity group.
(Argument 4) Block size [L] of the internal LU.
(Argument 5) Compare information of the internal LU.

With respect to (Argument 3), a check may be implemented to avoid one parity data being common for a plurality of internal LU by employing an end address that is an integer multiple of the striping size of the parity group. Furthermore, (Argument 2) and (Argument 3) are taken to be designated by the block size of parity group, but the values of the arguments may be also received by taking a striping size as a unit. Likewise, the arguments may be taken in other formats, provided that the start address [G] and end address [G] of the parity group are eventually found.

(Step 15003) The configuration control program 4030 performs the initialization processing of the internal LU, if necessary. For example, a management area of the internal LU may be created as a link of initialization processing.

(Step 15004) The configuration control program 4030 changes the blockage information of the internal LU corresponding to the internal LU status information 4070 from the blocked state to the normal state, thereby indicates that the internal LU can be used, and returns a completion message to the management server 1200.

<3.5. LU Path Definition>

Figure 16:
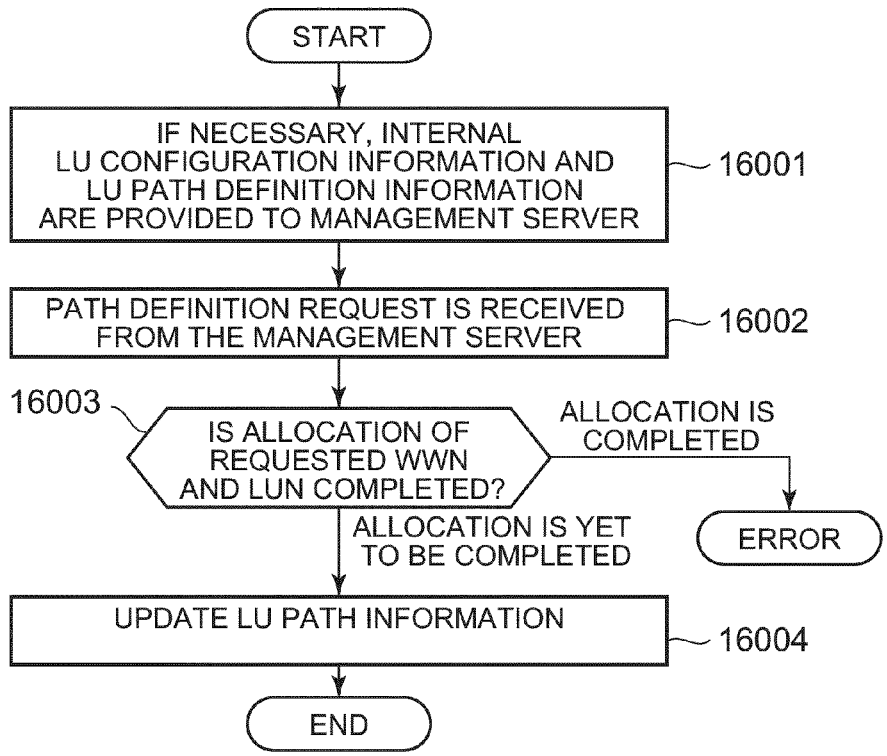
FIG. 16 is a flowchart illustrating the path definition processing of a LU executed in the configuration control program.

FIG. 16 is a flowchart illustrating the LU path definition processing executed by a configuration control program 4030. Each step of the processing will be described below.

(Step 16001) The configuration control program 4030 sends the entire internal LU configuration information 4070 and LU path information 4080 or part thereof to the management server 1200 in response to the request from the management server, if necessary.

(Step 16002) The configuration control program 4030 receives from the management server 1200 a path definition request containing an identifier of the internal LU, port information (may be information of other types, provided that it is identification information that can be eventually converted into the WWN or identifier of the I/O port 1013), and LUN.

(Step 16003) The configuration control program 4030 checks whether the allocation of the LUN and WWN designated by the request has been completed, and when the allocation has been completed, responds with error and ends. In the case the allocation has not yet been completed, Step 16004 is executed.

(Step 16004) The configuration control program 4030 creates and/or updates the LU path information 4080 based on the information attached to the request and returns a completion message to the management server 1200.

A plurality path definitions may be performed with respect to the internal LU for multiplexing the access path from the host 1100. Furthermore, in the case of release processing of the defined path, the path setting may be released by finding a corresponding entry of the LU path information by using the identifier of the internal LU or a combination of WWN and LUN from the management server 1200 and deleting the entry. Furthermore, instead of specifying the WWN and LUN in the LU path definition request, it is also possible to search for and allocate the WWN and LUN emptied by the configuration control program 4030.

<3.6. Blockage Detection>

The configuration control program 4030 detects a component blockage caused by failure, power shutdown, component removal, etc. The flow of the blockage detection processing will be described below.

(L1) The configuration control program 4030 acquires the status of each component. When a component is a controller or FMD, the status of component may be the log or status of the program operating on this component. The program 4030 may use for the processing a report from each component as an inquiry substitute.

(L2) The configuration control program 4030 judges whether blockage of each component is present by checking the acquired status and returns to (L1) where a blockage is absent.

(L3) When a blockage is judged to be present in (L2), the configuration control program 4030 transfers the identifier of the component that was judged to be blocked to the management server 1200 and displays it to the user.

The blockage detection of the FMD 1030 and subsequent dynamic sparing will be described below. A state sometimes occurs in which some of the FMD 1030 cannot be accessed due to the blockage of a component other than the FMD 1030, but the below-described processing (in particular, dynamic sparing) may be also conducted in this state.

<3.6.1. FMD 1030 Blockage Detection>

A flow of the FMD 1030 blockage detection processing executed by the configuration control program 4030 will be described below.

(M1) The FMD 1030 returns information of at least one of (G1) through (G8) or actively sends these information items in response to a request from the configuration control program.

(M2) The configuration control program 4030 check the received information and judges whether an FMD blockage is present. Examples of judgment methods are presented below.

(Judgment method 1) In the case of information on the processing error represented by an I/O request error, the judgment is made by the number of receptions (including one and more).

(Judgment method 2) In the case of information relating to the surplus capacity value described in section 3.1.3 (a value obtained by dividing the number of surplus blocks (G3) described in section 3.1.3 by the number of provided block (G2) is considered), the judgment is made by this information becoming less than the predetermined threshold value (this information is held inside the controller 1020 and may be set to the controller 1020 via the management server 1200).

(Judgment method 3) In the case of number of FMC (G6) described in section 3.1.3, the judgment is made by this number becoming equal to or less than a fixed ratio from the shipping time and the number of specifications.

As a variation of FMD implementation, when the judgment method was realized inside the FMD 1030 and was applicable, a report of a device failure similar to that of HDD may be sent to the controller 1010. In this case, the controller 1010 may judge the failure by (Judgment method 1).

(M3) The configuration control program 4030 changes the blockage information of the FMD that was judged to be blocked with the FMD configuration information 4050 to the blocked state and indicates that the FMD is unusable.

(M4) The configuration control program 4030 judges whether or not the parity group is in the state where a read/write request cannot be processed due to the blocked FMD 1030 by referring to the PG configuration information and FMD configuration information and, when the processing is impossible, changes the blockage information of the relevant parity group to the blocked state (that is, unusable). With the above-described judgment method, in the case of a redundantization system accompanied by mirroring such as RAID 1+0, it is judged whether or not both FMD forming a pair that duplexes the data are in a blocked state, and in the case of RAID 5, a judgment is made as to whether the number of FMD in a blocked sate in the parity group is two or more.

(M5) The configuration control program 4030 changes the blockage information of the internal LU where data were saved on the blocked parity group to the blocked state (that is, unusable) by referring to the internal LU configuration information.

(M6) The configuration control program 4030 sends identification information of the blocked FMD 1030 to the management server 1300, if necessary. Information relating to the reason for blockage (for example, when judgment method was used to judge whether the blockage has occurred) may be attached to this notification. Furthermore, when a parity group, internal LU, or LU blocked by the blockage of the FMD 1030 is present, the identification information thereof also may be sent to the management server 1300. The management server 1300 that received the notification displays this information as failure information to the user.

In the explanation below, the state of a parity group that includes the FMD in a blocked state and in which an I/O request is possible will be termed "degenerate state". With an I/O request to a parity group in the degenerate state, a response to the request is made by conducting data recovery processing. The data recovery processing indicates the recovery of data of the blocked FMD from the redundant data. In the case of mirroring, because data identical to those in the blocked FMD are present in another FMD, this processing uses data of the abovementioned another FMD. In the case of a parity, this processing conducts recovery by computing the data of the blocked FMD from the parity and data that remained unblocked.

<3.6.2. Dynamic Sparing of FMD>

Dynamic sparing processing performed with the configuration control program 4030 will be described below.

(N1) The configuration control program 4030 waits till FMD blockage is determined with a blockage detection processing.

(N2) The configuration control program 4030 finds a parity group associated with an FMD that was detected to be blocked in N1 (for example, a parity group including the FMD) by referring to the PG configuration information 4060.

(N3) The configuration control program 4030 judges whether or nor the data recovery processing can be executed with respect to the found parity group and when the execution is impossible, abandons the processing (for example, ends). When the execution is possible, the processing of N4 and subsequent steps is performed.

(N4) The configuration control program 4030 searches for an alternative FMD compatible with the parity group. The following conditions analogous to check items or information provided in the parity group definition can be considered as search conditions.

(Condition 1) Data capacity, model, number of FMC, or block size [D] of FMD.

(Condition 2) Selection of FMD 1030 preventing double blocking of the FMD 1030 by one-point blockage of a component other than the FMD (in order to avoid the parity group blockage as effectively as possible).

(Condition 3) Surplus capacity percentage of the FMD 1030 remaining in the parity group and surplus capacity percentage of the substitution FMD 1030. For example, by selecting the substitution FMD 1030 that has a higher surplus capacity percentage than the remaining FMD 1030, it is possible to avoid the parity group blockage caused due to shortage of surplus area after dynamic sparing. On the other hand, when only the logical unit for archive application is stored, it is not desirable, from the perspective of the cost, to use FMD having excessively large surplus area, as the substitution FMD. Therefore, FMD that has surplus capacity percentage within a range defined based on the surplus capacity percentage of the remaining FMD 1030 is used as the substitution FMD.

(Condition 4) FMD that does not belong to any of the parity groups.

(N5) The configuration control program 4030 recovers data to the alternative FMD by data recovery processing (will be referred to as recovery copy processing). The specific contents of the recovery copy processing is described hereinbelow by way of an example.

(N5-1) The configuration control program 4030 initially sets the information indicating the copying completion position (copy completion position information) to an initial address of an FMD.

(N5-2) The configuration control program 4030 recovers (by the processing method described in section 3.6.1) the data of the blocked FMD for a plurality of blocks from the copy completion position information and writes them into the alternative FMD.

(N5-3) The configuration control program 4030 advances the copy completion position information by the number of blocks that have been written.

(N5-4) The configuration control program 4030 repeats the processing of (N5-1) through (N5-3) till the copy completion position information advances to the final address of the FMD.

(N6) The configuration control program 4030 registers the alternative FMD anew in the parity group and removes the blocked FMD.

When an FMD is blocked due to shortage of surplus capacity, a read request relating to the data saved in the FMD is possible. Therefore, data may be read from the blocked FMD, without using parity data or mirror data, as an alternative of the data recovery processing of (N5-2).

With respect to an I/O request to the blocked FMD in the aforementioned recovered copy, because the data have been recovered to the alternative FMD with respect to a block [D] below the copy completion position information, the controller 1010 may return those data to the host 1100 (the case of read) or save the write data in the alternative FMD (the case of write). The controller 1010 can execute the following processing with respect to the block addresses following the copy completion information.

(O1) When a read request was received and the FMD was blocked due to shortage of surplus area, the data are staged from the blocked FMD to the cache memory as data recovery processing and then the data are returned to the host 1100.

(O2) When a read request was received in a state other than that of (O1), the data saved in the blocked FMD 1030 are recovered to the cache memory 1020 by the data recovery processing and these data are returned to the host 1100.

(O3) When a write request was received, the redundant data (parity data or mirror data) are updated and the write data of the present request can be recovered for subsequent read request or write request.

<3.7. Write Processing>

Figure 17:
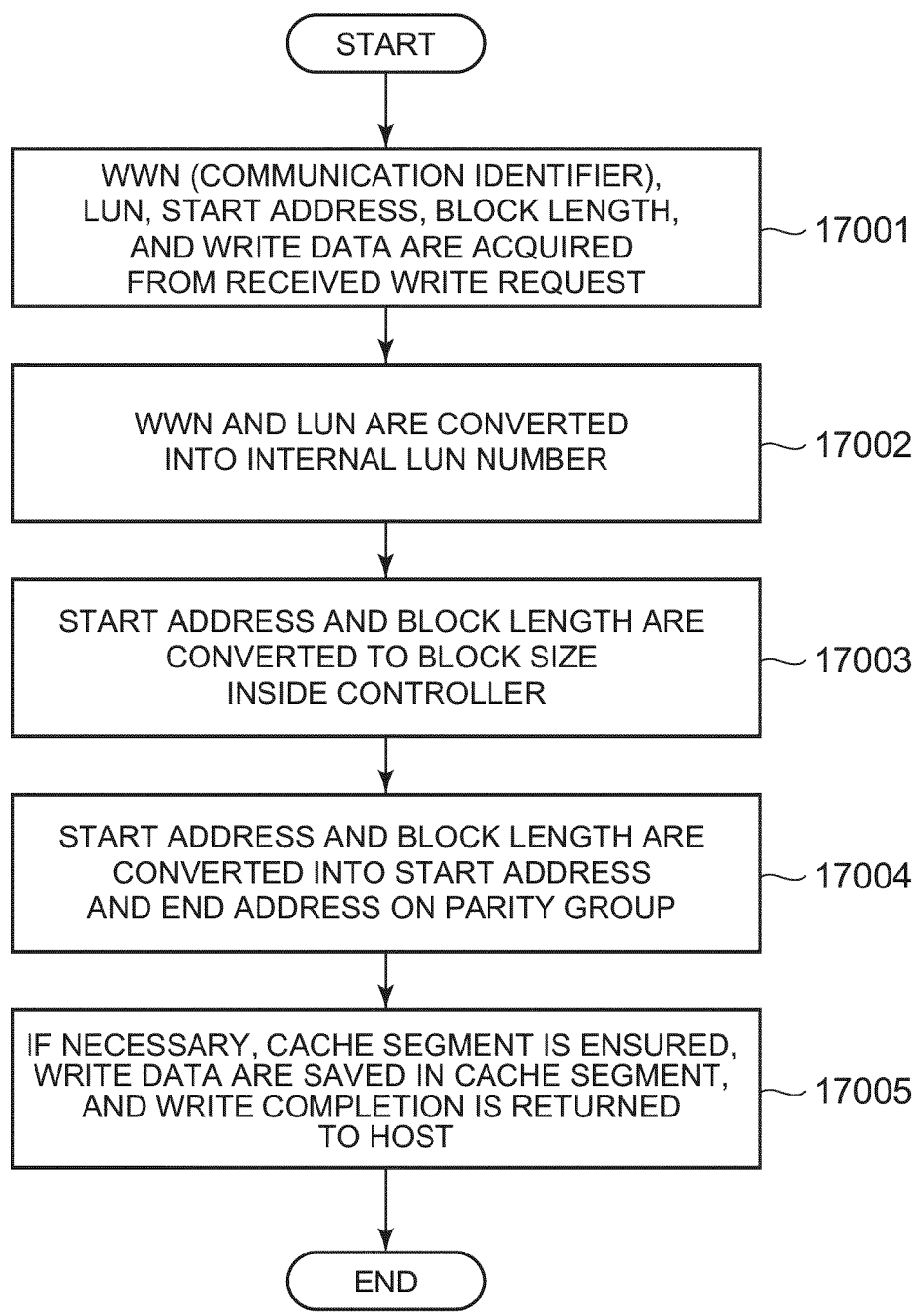
FIG. 17 is a flowchart of processing conducted in the case where the I/O processing program has received a write request.

FIG. 17 is a flowchart of the processing performed when the I/O processing program 4010 receives a write request. Furthermore, FIG. 10 illustrates schematically an example of data flow or changes on the FMD 8200, FMD 8210, and two cache memories (CM-A and CM-B) of a RAID 1+0 parity group shown in FIG. 8. Furthermore, FIG. 11 and FIG. 12 illustrate schematically the examples of data flow or changes on the FMD 9200, FMD 9230, and two cache memories (CM-A and CM-B) of a RAID 5 parity group shown in FIG. 9.

<3.7.1. Assumptions and Examples of Overview Diagram>

FIGS. 10 through 12 show the flow of data and variation of data between a cache memory and FMD relating to the case where a write request has arrived to a block '3' with respect to an internal LU that was provided to the host 1100 at a block size [L] of 512 B (Byte) and had an area allocated from the head of the parity group. Furthermore, boxes with number symbols therein that are on the cache memory and FMD indicate the block [G] allocated by the controller 1010 to the parity group and the address of the block [G]. In the present example, the FMD block size [D] is twice the block size [G].

In the area management of the cache memory 1020, in order to reduce the information associating a data area on the cache memory and data area on the FMD, the continuous address areas (cache segments) on cache are allocated with a plurality of continuous blocks [D] (in this example, four blocks [G] and two blocks [D]) of the FMD. For this purpose, for example, the controller 1010 manages the below-described attribution information (Q1) through (Q6) for each cache segment.

(Q1) An address on a cache segment.

(Q2) An identifier of a parity group and a block address [G] on a parity group.

(Q3) Staging information for each block [G] in the cache segment. When a black band is present below the block [G] on the cache in the overview diagram, it means that the data are staged.

(Q4) A dirty (update is completed, but is not reflected in the FMD) information for each block [G] in the cache segment. In the overview diagram, when a black band is present on a block [G] in the cache block, it means that the block is dirty.

(Q5) Old data information (6) Parity update required information. When a black band is present on a box with a symbol P without a number symbol in FIGS. 11 and 12, it means that parity update is required, and when only a box with a symbol P without a number symbol is present, it means that the update is not required.

In both overview diagrams, the explanation will be started from a state in which '0' and '1' of the block [G] have been staged for read.

<3.7.2. Write Request Processing Flow>

The contents of processing conducted when the I/O processing program 4010 receives a write request will be explained below by using the flowchart shown in FIG. 17 and examples from FIG. 10 to FIG. 12.

(Step 17001) The I/O processing program 4010 acquires the WWN, LUN, start block address [L], block length [L], and write data from the write request received by the controller 1010. The controller 1010 reports in advance the block size of the corresponding internal LU in the internal LU configuration information 4070 as the LUN block size [L], this being a repetition, and the block length and start block address of the write request are based on this block size [L]. In an actual write request, a Port ID is contained instead of the WWN. Therefore, the Port ID has to be converted into a WWN.

(Step 17002) The I/O processing program 4010 finds the internal LU number from the WWN, LUN, and LU path information. Furthermore, when means other that Fiber Channel is used as a network, Step 17001 and Step 17002 may be replaced with a method other than finding the internal LU number from the write request. For example, in the case of iSCSI, a combination of an IP address and a Port number, or an iSCSI target name replaces the WWN, and the internal LU number can be found by combining with the LUN.

(Step 17003) The I/O processing program 4010, using the internal LU configuration information 4070, converts the start block address [L] and block length [L] of the request into the identifier, start block address [G], and end block address [G] of the parity group. The conversion computation is conducted by the following formulas.

Start block address [G]=(block size [L]*information start block address [L]/block size [G])+(start block address [G] of internal LU configuration information).

End block address [G]=(block size [L]*information block length [L]/block size [G])+start block address [G].

(Step 17005) The I/O processing program 4010 saves the write data on the cache. Where the data of the necessary block [G] have already been staged on the cache at this time, the data on the cache are updated with the write data. However, even when the block data that have already been staged are present, in the present embodiment, the parity update required information is No (update is completed), and when dirty information of the save object block is set (that is, write data that served as a base in the parity update of the previous cycle) have to be used as the old data in the parity update of the present cycle. Therefore, a separate cache segment is ensured and write data are saved. In the case where no write data are present on the cache, if necessary, a cache segment is also ensured and write data are saved.

By saving the write data on both cache memories, the write data can be held even if one cache is blocked. Furthermore, together with saving, the I/O processing program 4010 set staging information, dirty information, and parity update required information, each flag is for the saved block, and returns a response relating to the write request to the host 1100. In (1) in FIG. 10 and FIG. 11, the write data of block [G] '3' are written into two caches and the staging information and dirty information are set.

The flow of the I/O processing program 4010 is described above.

<3.7.2 from Parity Creation to Destaging>

Figure 18:
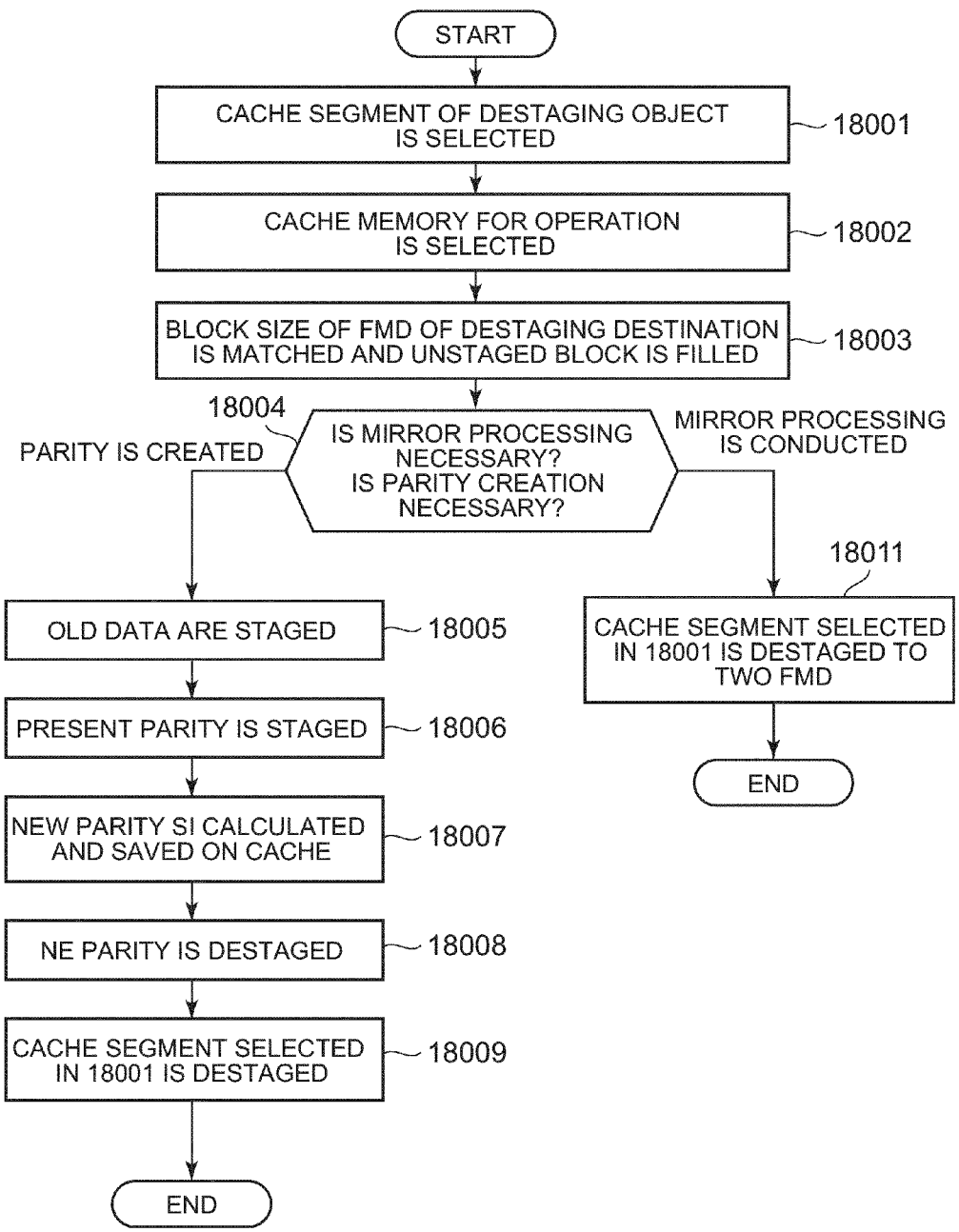
FIG. 18 shows a process of parity creation and destaging executed repeatedly by the cache control program.

The sequence of parity creation and destaging executed repeatedly by the cache control program 4020 is shown in FIG. 18.

(Step 18001) The cache control program 4020 selects a cache segment that is a parity creation or destaging target with a cache algorithm such as LRU (Least Recently Used). In FIGS. 10 through 12 (sometimes described hereinbelow as "overview diagrams"), blocks '2' and '3' were selected.

(Step 18002) The cache control program 4020 determines from which of two caches the write data saved therein will be used for parity creation or destaging by a computation formula based on the block address and parity group ID of the cache segment that is the destaging target. In the overview diagrams, the write data on the CM-A are assumed to be used.

(Step 18003) The cache control program 4020 matches the cache segment that is the target of destaging with the block size [D] of the FMD 1030 serving as a destaging destination and fills the block [G] that has not yet been staged in the segment. This is performed to enable the writing of data in block units of the cache memory.

More specifically, when a plurality of blocks [G] present in a cache segment are divided into each FMD block size [D] from the head of the segment (in other words, divided into destaging units). And for each division, if a dirty block [G] is held in and a block [G] in an unstaging state is present in the part of division, data corresponding to the block [G] in the unstaged state are copied from the FMD 1030. In the copying conducted at this stage, initially, a block [D] containing a dirty block [G] (in this example, block '2') and a block [G] in an unstaging state (in this example block '3') in a separate area on the cache is staged and then only the block [G] in the unstaging state is copied. In the overview diagrams (in this example, FIG. 10(1)), block '3' is in an unstaging state.

(Step 18004) The cache control program 4020 performs Step 18005 when parity creation is necessary or Step 18011 when mirroring is necessary with respect to the cache segment that is the destaging target.

(Step 18005) The cache control program 4020 stages the old data saved in the destaging destination FMD 1030 related to the target cache segment for parity generation in a cache segment separate from the cache segment that is the destaging target. This staging may use an area identical to that of the cache segment that was staged by FMD block sizing performed in Step 18003 and may involve staging of the data necessary for the two caches in Step 18003 in advance (in FIG. 11(2) of the overview diagram, the data necessary for the two caches are staged together). Furthermore, if data used for previous parity updating are present on the cache, the staging can be omitted.

(Step 18006) The cache control program 4020 stages a block [D] stored parity corresponding to the cache segment that is the destaging target from the FMD 1020 to the cache segment (in FIG. 11(2) of the overview diagram, blocks 'P2' and 'P3' are staged to CM-B). When a parity that was previously calculated is present on the cache, the staging can be omitted.

(Step 18007) The cache control program 4020 computes a new parity by using the write data on the cache segment that is the destaging target, old data that were staged in Step 18005, and a present parity that was staged in Step 18006, and saves the new parity with setting and saving dirty information to a cache segment separate from the present parity. The program 4020 also unsets the parity update required information of the cache segment that is the destaging target and discards the old data staged in Step 18005 and Step 18006 and the cache segment of the parity. In FIG. 11(3) of the overview diagram, the parity 'P2' of block '2' is dirty.

(Step 18008) The cache control program 4020 destages the cache segment of the new parity computed in Step 18007 and unsets the dirty information. In FIG. 12(4) of the overview diagram, the parity 'P2' and 'P3' are destaged.

(Step 18009) The cache control program 4020 destages the cache segment that is the destaging target and unsets the dirty information. When the destaging is completed, write data present on one cache are discarded and destaging is completed. The order of the present step and Step 18008 is not important.

(Step 18011) The cache control program discards data that were staged into another cache segment to fill the block that has not yet been staged in Step 18003. The cache control program 4020 destages the write data of the cache segment that is the target of destaging to two FMD 1030 that are mirror related. This program waits till both destaging operations are completed and then discards write data of one cache. FIG. 10(3) of the overview diagram shows that blocks '2' and '3' from CM-A were destaged.

The above-described processing is the parity creation processing.

The processing contents of destaging that has been used in the above-described processing will be described below.

(R1) The cache control program 4020 converts the block address [G] of the parity group for the cache segment into an FMD identifier and FMD block address [D] by striping computation and block size conversion.

(R2) The cache control program 4020 sends a write request to the FMD found in (R1) with the block address [D] found in (R1).

With respect to a read operation, the cache control program 4020 similarly converts the block address [G] of the parity group into an FMD identifier and FMD block address [D] and sends a read request to the FMD 1030.

Furthermore, in order to increase reliability, the cache control program 4020 may add a redundant code such as LRC or CRC to write data during destaging to the FMD 1030 and check the code during staging. Moreover, the cache control program 4020 may compare the data saved in the FMD and data on the cache after destaging and check that the data are saved securely. In both cases, when the check detects an abnormality, the cache control program 4020 can conduct the FMD blockage detection processing or data recovery processing.

Furthermore, in order to increase reliability with respect to staging corresponding to the internal LU for which the data compare information of the internal LU configuration information 4070 became Yes, the cache control program 4020 copies the original data from the FMD 1030 to the cache memory 1020 in the case of RAID 1 and also reads and compares data from the other FMD of the mirroring pair. Likewise, in the case of RAID 5, the cache control program 4020 copies the original data from the FMD 1030 to the cache memory 1020 and compares data recovered from another FMD by using parity data and other data and data read from the present FMD. In the case of HDD, the access pattern accompanied by head movement or rotation wait sometimes increases in the recovery processing, and the performance degradation corresponding to or exceeding the increase in the number of I/O request performed in the recovery processing also has to be taken into account, but in the case of FMD, such performance degradation does not require such attention.

<3.8. Read Processing>

Figure 19:
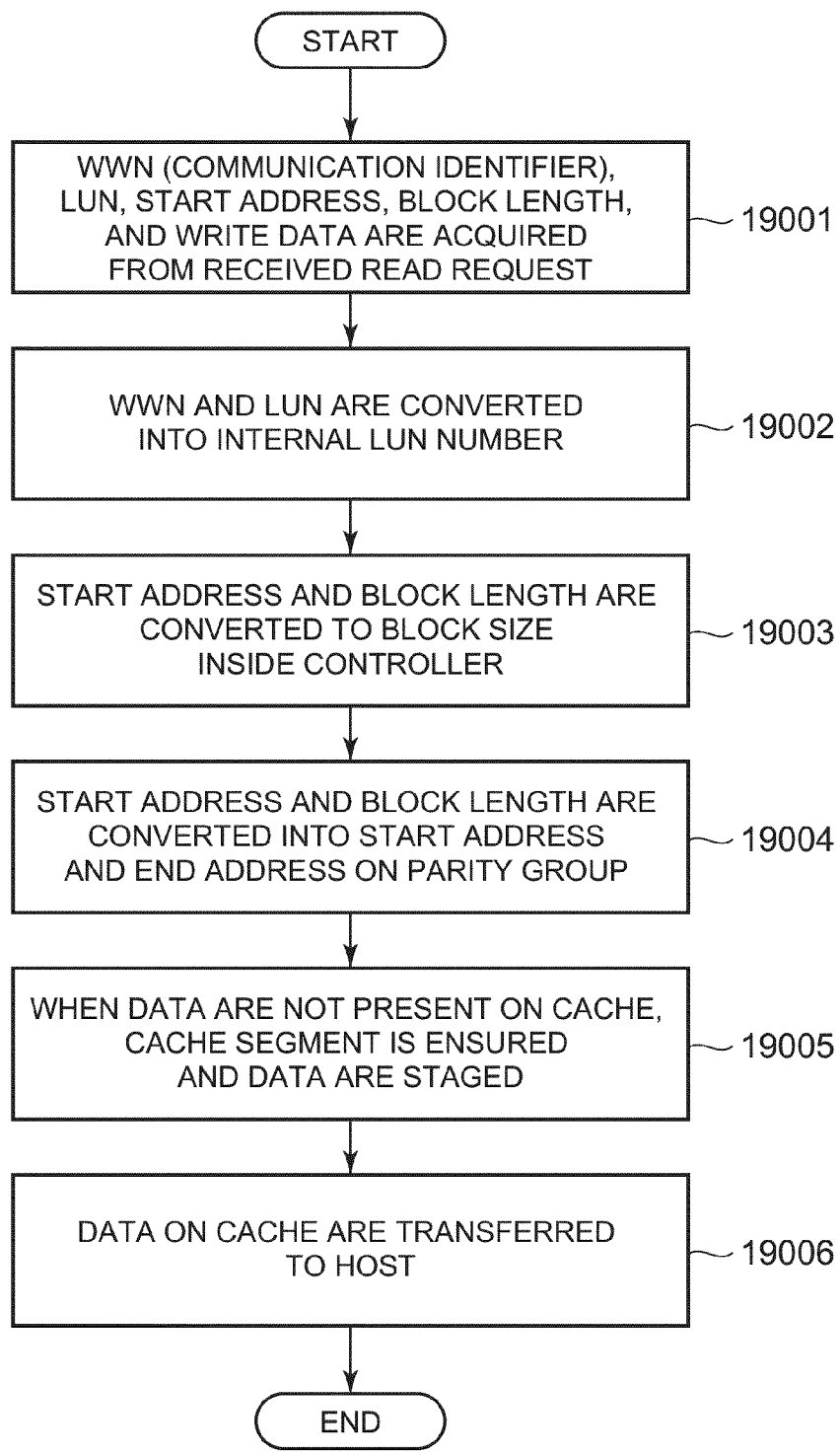
FIG. 19 shows an example of processing flow performed when the I/O processing program has received a read request.

FIG. 19 shows an example of processing flow performed in the case where the I/O processing program 4010 received a read request. Each step of the processing will be described below.

(Step 19001) The I/O processing program 4010 acquires the WWN, LUN, start block address, block length, and write data from a read request received by the controller 1010.

(Step 19002) The I/O processing program 4010 converts the WWN and LUN into the internal LUN based on the LU path information. Step 19001 and Step 19002 may be substituted by the same method as used in the write processing.

(Step 19003) The I/O processing program 4010 converts the start address and block length of a read request (start block address and block length based on the block size that was notified in advance to the host 1100) to a value based on the block length managed inside the controller 1010 by using the internal LU configuration information 4070.

(Step 19004) The I/O processing program 4010 further converts the internal LUN and the converted start block address and block length to a parity group ID, and a start block address and an end block address on the parity group by using the internal LU configuration information 4070. In the computation conducted for the conversion, a value obtained by adding the start block address to the start address of the internal LU configuration information 4070 is used as the start block address on the parity group, and a value obtained by adding the block length to the start block address on the parity group is used as the end block address on the parity group.

(Step 19005) The I/O processing program 4010 checks whether data required by the read request are present in the cache, ensures a cache segment when the required data are not present, and copies the data into the cache by staging processing.

(Step 19006) The I/O processing program 4010 transfers the data on the cache to the host 1100.

The flowchart of the I/O processing program 4010 is described above. The WWN, LUN, start block address, and block length may be checked in any step of the present procedure.

The operations of the present embodiment are sometimes implemented in a mode where the block size of FMD is larger than the block size of LU. This is because the entry amount of the FMD address conversion information 2012 of an FMD is related to a value obtained by dividing the storage capacity of the FMD by the block size, the entry amount will supposedly increase in the future, the search time for finding data required by the I/O request will therefore increase, and the block size of FMD will be as large as 8192 byte. On the other hand, in the usual host, the block size is presently based on 512 B. This, however, does not negate other relationships. If the block size of LU is equal to or larger than the block size of FMD, the efficiency of staging and destaging on the cache will apparently be good. Therefore, it is also possible that this configuration will be actively employed.

Furthermore, the storage system 1000 is not required to be configured of one device. For example, the FMD 1030 and controller 1010 can be present as separate devices connected by a backend I/O network. Furthermore, an access control program that limits the hosts that can access the LU can be added to the controller 1010, or a local replication program for producing a LU replica inside the same storage system 1000 or a remote mirroring program for conducting mirroring into different storage systems may be executed. More specifically, for example, when remote mirroring is performed, a storage system using the FMD 1030 in the copy source and copy destination can be employed. The implementation of remote mirroring can be also considered in which the storage system 1000 using the FMD 1030 is employed for the storage system of the copy source, and a storage using a HDD is employed for the storage system of the copy destination. This is because the performance characteristics and bit costs of the FMD 1030 and HDD are different and also because failure resistance can be increased due to the fact that the environments where data loss or corruption can easily occur (for example, including at least one of temperature, humidity, X rays, electric field, and magnetic field) are different for the two storages since a flash memory contained in the FMD holds data by operating electric charges, whereas data in the HDD are held by magnetism.

The explanation will be continued hereinbelow.

<4. Substitute Device of FMD 1030>

<4.1. SFMD 1030 (2)>

Figure 21:
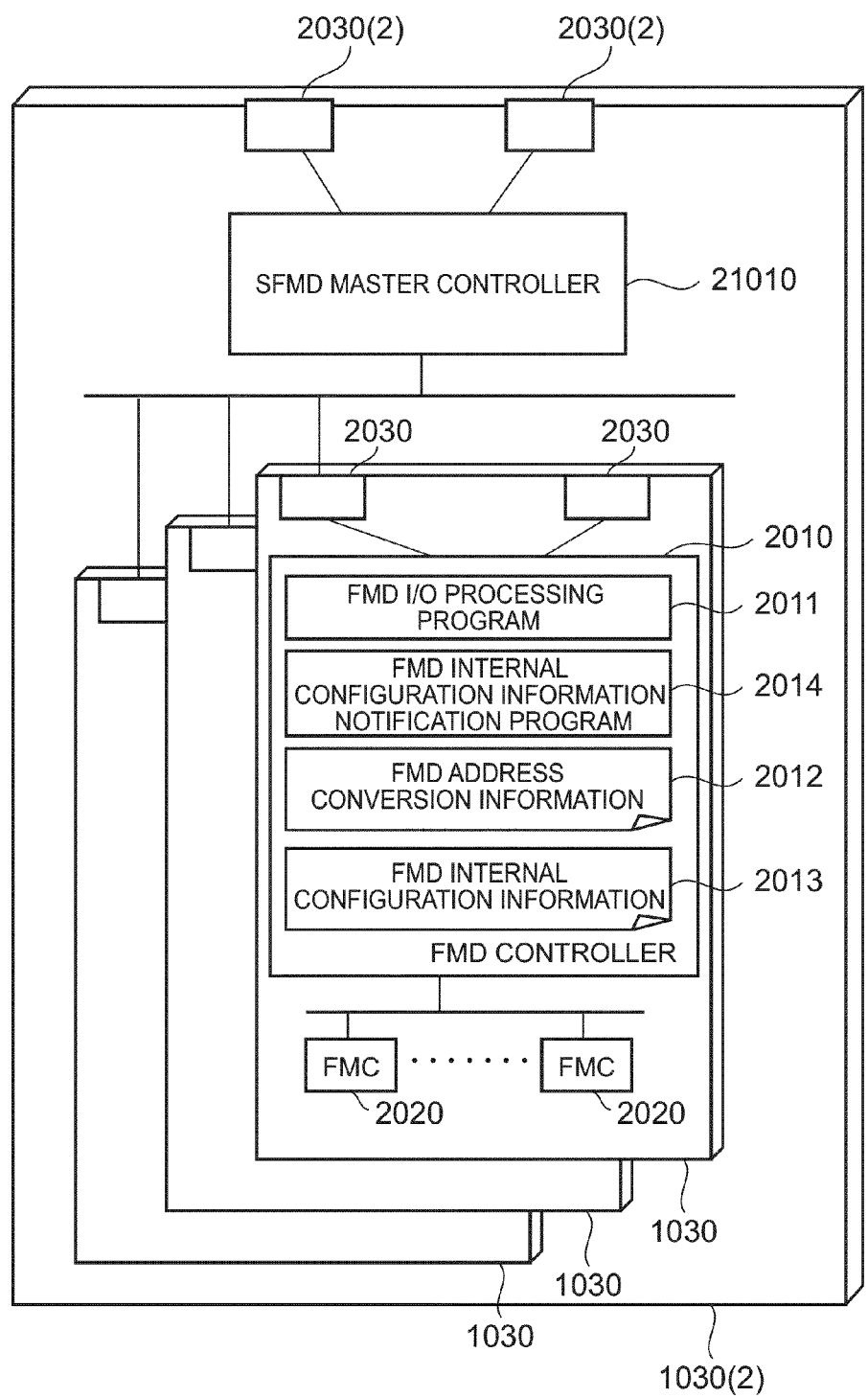
FIG. 21 shows an example of SFMD that is one of the variations of the FMD.

Several variations can be considered for the FMD 1030. An example thereof is shown in FIG. 21.

The SFMD 1030(2) is a substitute device for FMD 1030. SFMD 1030(2) comprises a SFMD master controller 21010, a plurality of I/O ports 2030(2), and a plurality of FMD 1030. Each FMD 1030 is connected to the SFMD master controller 21010 via the I/O port 2030. The I/O port 2030 may be substituted with the internal bus, and a configuration in which one I/O port 2030 is connected, as shown in the figure) or a configuration in which a plurality of I/O ports are connected is possible. In FMD 1030 contained in one SFMD 1030(2) the following items (T1 to T3) are preferably identical.

(T1) Storage capacity [D].

(T2) Block size [D].

(T3) Performance of FMD controller 2010.

The SFMD master controller 21010 performs striping processing to provide a plurality of FMD 1030 together to one storage area. Thus, when the controller 1010 accesses the SFMD 1030(2), not only the address space [D] of the FMD 1030, but also a new address space [SD] is used. The SFMD master controller 21010 that has received an I/O request conducts striping processing, thereby obtaining the FMD 1030 where the data have been saved and the start address [D] and block length [D] thereof from the start address [SD] and block length [SD] contained in the I/O request, and sends an I/O request. When the block length [SD] of the I/O request to the SFMD 1030(2) is large, the above-described conversion and sending of the I/O request to the FMD 1030 are conducted during the data reception or data transmission. They are in the same manner as in the case of FMD 1030.

The block size [SD] of the SFMD 1030(2) is preferably equal to the block size [D] of the FMD 1030. Furthermore, the number of blocks [SD] (or storage capacity [SD]) of the SFMD 1030(2) may be equal to the total of the number of blocks [D] (or storage capacity [D]) of the FMD 1030 contained therein, but when part of blocks [D] of the FMD 1030 are used for the purpose of control, the number of blocks [SD] may be obtained by subtracting the corresponding number of blocks from the total number.

The SFMD master controller 21010 can send the below-described information (U1) through (U4) to the controller 1010.

(U1) Number of blocks [SD]
(U2) Block size [SD].
(U3) Number of surplus blocks [SD].
(U4) Number of FMC 2020 and/or number of FMD 1030.

The SFMD master controller 21010 may send the entire information provided by the FMD internal configuration information notification program 2013 or part thereof to the controller 1010 in addition to the above-described information.

By contrast with the FMD 1030, in the SFMD 1030(2), a write request fails at the point in time in which the number of surplus blocks in a certain FMD 1030 becomes zero, even if the number of surplus blocks in other FMD 1030 is more than zero. For this reason, reporting a minimum value (or a number obtained by multiplying the minimum value by the number of FMD 1030) of the number of surplus blocks in each FMD 1030 can be considered for the value of the number of free blocks [SD] of (U3).

The SFMD 1030(2) has the following drawback and advantage when compared with the FMD 1030.

(Drawback) FMC utilization efficiency is poor. Depending on the access pattern, write requests can be collected in a specific FMD 1030. Therefore, the time till the component being blocked is short.

(Advantage) The number of bottleneck locations is small. The surplus area management or address conversion performed by the FMD controller 2010 is the processing with a rather large workload because a search of FMD address conversion information 2012 is necessary. Therefore, even if the number of FMC contained in the FMD 1030 is increased, the performance is sometimes not increased due to bottlenecks in the FMD controller 21010. By employing a method by which the block size [D] is increased so that decreasing the size of the FMD address conversion information 2012 that is searched during address conversion of the FMD 1030, this can be avoided and improving performance. However, if the block size is too large, performance is degraded because in an environment with multiple random access, staging or destaging is executed to the data that are not directly related to the access. In the case of SFMD 1030(2), because address conversion is processed in a distributed fashion in a plurality of FMD controllers 2010, the bottleneck is prevented and it is not necessary to increase the block size even when a large number of high-capacity FMC are installed.

In order to overcome the above-described drawback, the processing of at least one of the below-described types performed in the controller 1010 can be also executed in the SFMD master controller 21010.

(Processing 1) Dynamic sparing. Some of FMD 1030 contained in the SFMD 1030(2) are used for spare, and dynamic sparing is conducted when the number of surplus blocks of the operating FMD 1030 becomes small. The FMC utilization efficiency decreases to allocate the redundant areas, but the time to component blockage caused by the access concentration in a specific FMD 1030 is increased.

(Processing 2) Redundant data such as mirroring or parity are added.

With respect to the presence or absence of the above-described treatment, sending the information by the SFMD master controller 21010 in response to the request from the controller 1010 can be considered. Furthermore, if the presence or absence of the processing is made clear by the model number of the SFMD 1030(2), the above-described information acquisition may be replaced with acquisition of this information by the controller 1010.

<4.2. SFMD and FMD Mixed Storage System>

The SFMD 1030(2) and FMD 1030 can send a read request or write request by the same method from the controller 1010. For this purpose, the storage system 1000 can implement a plurality of SFMD 1030(2), such a configuration also makes it possible to execute the processing that was heretofore explained. Furthermore, the storage system 1000 can also implement both the SFMD 1030(2) and FMD 1030. Such a configuration can originate for the same reason as associated with the difference in the number of FMC in the FMD 1030. In this case, because of the difference in I/O characteristics caused by the internal structures and because the time (endurance) to the blockage differs between the SFMD 1030(2) and FMD 1030, a configuration can be employed in which the SFMD 1030(2) and FMD 1030 are not mixed in a parity group. In order to realize such configuration, the controller 1010 acquires information relating to the internal structure of both devices and provides this information to the user at the time of parity group configuration definition or uses the information for check processing. Furthermore, user can use the storage system efficiently with considering storage hierarchy by displaying whether the LU is configured of SFMD 1030(2) or FMD 1030. However, both devices may be mixed in a parity group with consideration for device shortage and other reasons.

Furthermore, because the SFMD 1030(2) can increase reliability by adding the dynamic sparing and/or redundant data instead of increasing the number of internal components, it can be considered to acquire the internal structure (including presence and/or absence of dynamic sparing or redundant data) with the controller 1010 in the same manner as described above, and further to configure a parity group only of the devices with dynamic sparing or to configure a parity group only of the devices with redundant data in the SFMD 1030(2).

<5. Substitute Device of FMD 1030, Part 2>
<5.1. Plural Storage Areas-Providing FMD>

Figure 22:
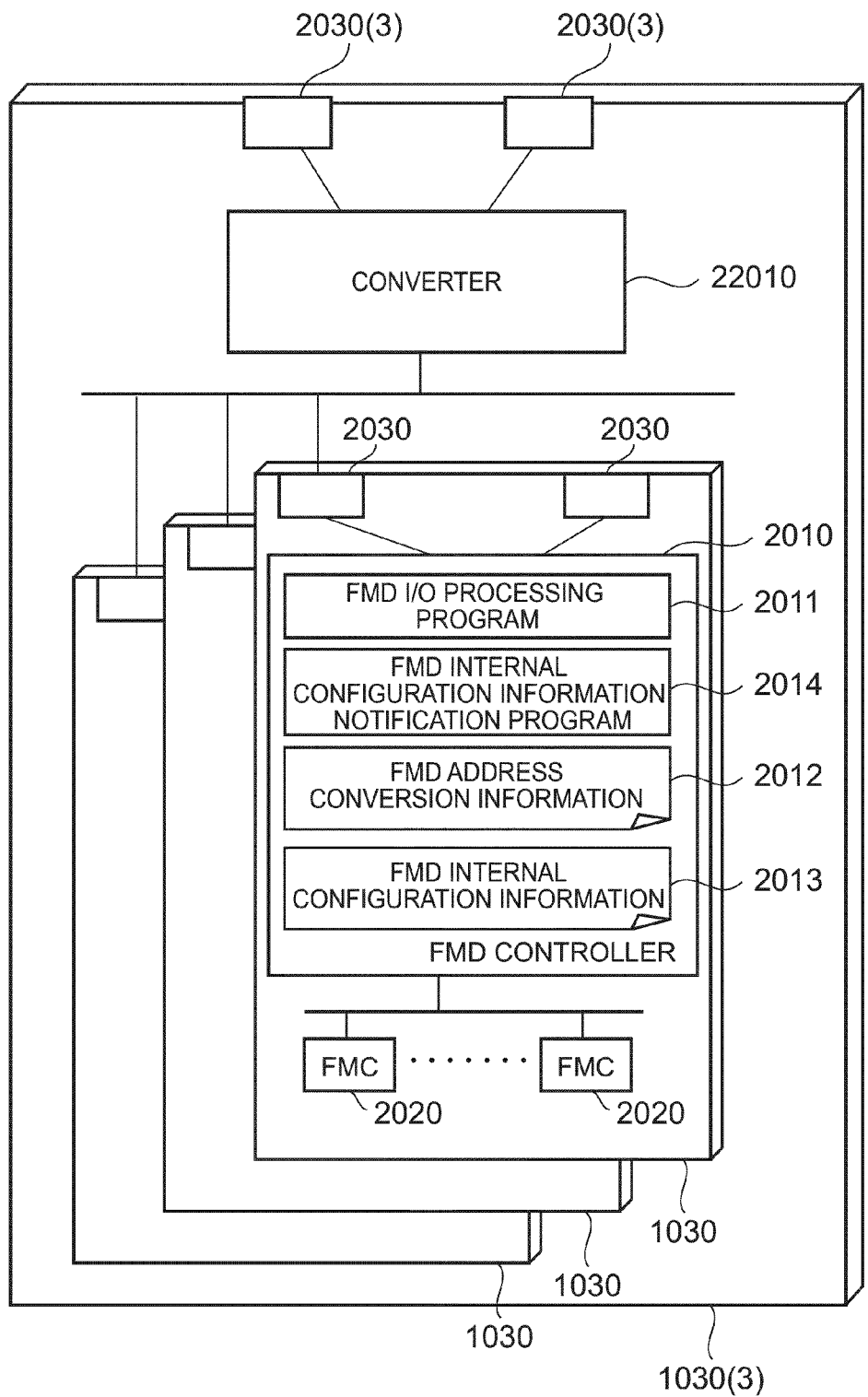
FIG. 22 shows an example of a plural storage areas-providing FMD that is one of the variations of the FMD.

The plural storage areas-providing FMD 1030(3) shown in FIG. 22 provides a plurality of internal FMD 1030 to the controller 1010. As an example, a method for providing each FMD 1030 as a LU belonging to a WWN held by the I/O port 203(3) can be considered. For example, a converter 22010 allocates the access request from the controller 1010 to a designated FMD 1030 or performs the conversion processing in the case where the port 2030 of the FMD 1030 is a transfer medium other than the port 2030(2). On the other hand, the controller 1010 recognizes a plurality of FMD 1030 contained in the plural storage areas-providing FMD 1030(3) and manages failure occurrence in the units of the FMD 1030. A maintenance operator can perform maintenance and replacement in the units of plural storage areas-providing 1030(3). Note that the plural storage areas-providing FMD 1030(3) may have a port to connect it to the controller 1010 for each FMD 1030 without having the converter 22010 therebetween.

<5.2. Parity Group Configuration Using Plural Storage Areas-Providing FMD 1030(3)>

In case of configuring a parity group by using a plural storage areas-providing FMD 1030(3), it is necessary to prevent the controller 1010 from configuring a parity group by selecting a plurality of FMD 1030 from a certain plural storage areas-providing FMD 1030(3). This is because a plural storage areas-providing FMD 1030(3) is a unit of one of the unit of physical failure, a unit of power source shut-down, and a unit of pulling out a device. So that, in case of a device failure occurs in a state where a plurality of FMD 1030 have been used in the same plural storage areas-providing FMD 1030(3), then the data recovery processing of a parity group becomes impossible.

In order to assist the above-described parity group configuration, the controller 1010 can use the below-described two methods for defining the parity group configuration.

(Method 1) During definition of a parity group configuration, the controller 1010 displays a correspondence relationship of plural storage areas-providing FMD 1030(3) and FMD 1030 contained therein with a GUI (Graphical User Interface, GUI is for example) and receives a designation of a plurality of FMD 1030 from the user. The controller 1010 that received this designation checks whether some of a plurality of designated FMD 1030 belong to the same plural storage areas-providing FMD 1030 (3).

Figure 23:
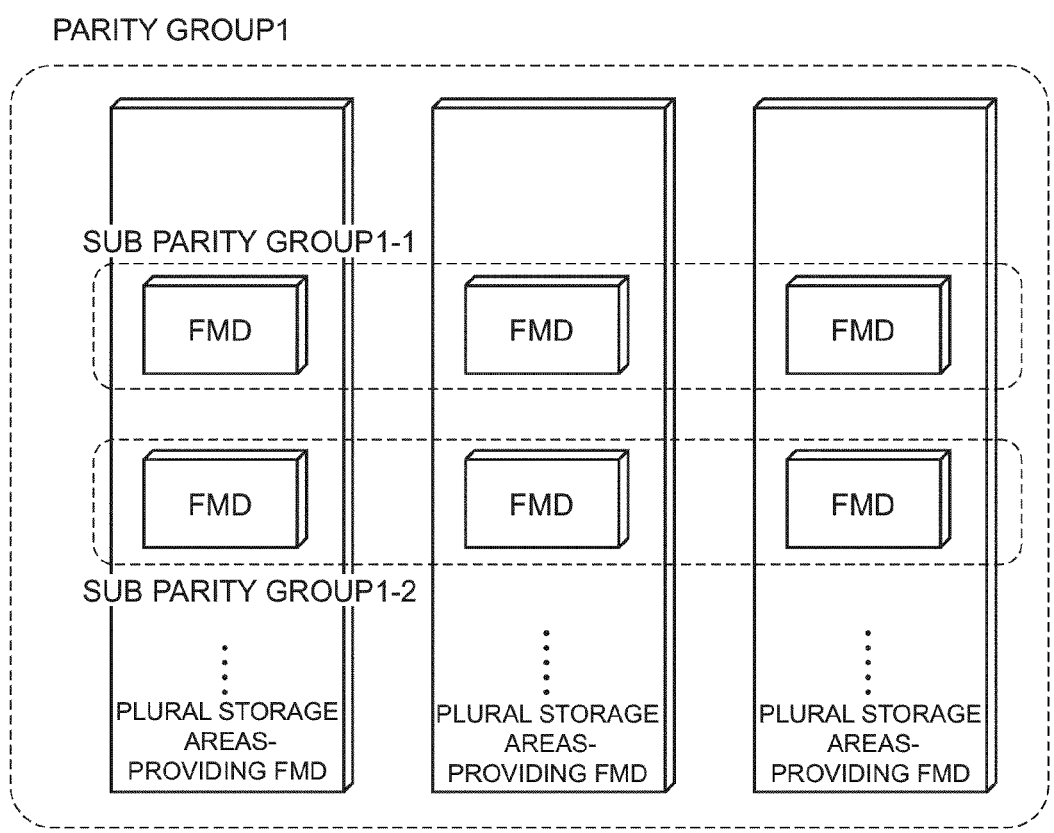
FIG. 23 shows an example of a sub-parity group configured of FMD of the plural storage areas-providing FMD shown in FIG. 22.

(Method 2) When a parity group configuration is defined, the controller 1010 displays a list of plural storage areas-providing FMD 1030(3) with a GUI (GUI is for example) and receives a designation of a plurality of plural storage areas-providing FMD 1030 (3) from the user. The controller 1010 that received this designation checks whether number of the FMD 1030 installed and storage capacity about the multi-LU-FMD 1030 (3) is same among the a plurality of the designated multi-LU-FMD 1030 (3). Then, as shown by way of an example in FIG. 23, the controller 1010 defines a sub-parity group configuration using plural FMD 1030, each belongs to each multi-LU-FMD 1030(3) and further uses a plurality of sub-parity groups located in the multi-LU-FMDs 1030(3) by taking areas joined by concatenating or the like as a parity group, and provides the parity groups to the user. The term "concatenating", for example, when related to concatenating LU2 to LU1, means that the head of the address space of LU2 is joined to the end of the address space of LU1. Furthermore, joining sub-parity groups can be achieved by striping.

<5.2. Dynamic Sparing and Blockage Detection>

When plural storage areas-providing FMD 1030(3) are used, the write requests can be also concentrated in a specific FMD 1030 similarly to the case of SFMD 1030(2). For this reason, the controller 1010 knows a surplus capacity value of each FMD in each plural storage areas-providing FMD 1030 (3) and, when the number of surplus blocks decreases for any FMD 1030, performs dynamic sparing of this FMD 1030 to an FMD 1030 contained in another plural storage areas-providing FMD 1030(3). Alternatively, a next method can be considered. An FMD 1030 for sparing is prepared at the time each plural storage areas-providing FMD 1030(3) is started to be used, and when the number of surplus blocks of a certain FMD 1030 decreases, dynamic sparing is performed from this FMD 1030 to an FMD 1030 for sparing that is contained in the same plural storage areas-providing FMD 1030(3) as this FMD 1030. In yet another possible method, when an FMD 1030 for sparing is absent in the plural storage areas-providing FMD 1030(3) for which the number of surplus blocks has decreased, the controller 1010 uses an FMD of another plural storage areas-providing FMD 1030(3) as its own FMD 1030 for sparing. Furthermore, the controller 1010 (for example, a configuration information program 4030) can make an FMD 1030 for sparing of copy destination to be an element of a parity group (or sub-parity group) to which an FMD 1030 of copy source belonged and can remove this FMD 1030 of copy source from the parity group (or sub-parity group). More specifically, for example, an ID of the FMD 1030 for sparing of copy destination can be added to a column corresponding to the parity group (or sub-parity group) in a PG configuration information 4060 and the ID of the FMD 1030 of copy source can be deleted from the column.

The above-described processing is also suitable for storage systems containing plural storage areas-providing FMD 1030 (3). For example, when the user defines a parity group configuration, the number of the contained FMC, the providing capacity, the surplus capacity value, or the number of FMD 1030 is acquired from each plural storage areas-providing FMD 1030 and parity groups are configured of the same number or capacity of identical devices.

Furthermore, when a storage system contains plural storage areas-providing FMD 1030(3), blockage detection can be performed in FMD 1030 units. Therefore, in this embodiment considering sub-parity group, the recovery processing an I/O processing is possible or not required, in case of the recovery processing as a parity group like a previous embodiment. If an internal LU is configured only of sub-parity groups for which such I/O request can be processed, the controller 1010 may continue the I/O request, without blocking the internal LU, even when the data recovery processing was judged to be impossible for the parity group like a previous embodiment.

<6. Detail of the Host>

A host LU required for explaining the management server 1200 is explained.

As described above, the host 1100 can use the storage area of the flash memory by transmitting an access request to the logical unit provided by the storage system. Therefore, the OS4101 executed by the host 1100 manages the host LU.

The host LU is a logical presence defined by the OS4101 of the host 1100 so that the OS4101 corresponds to the logical unit. The OS4101 stores at least the following information as the information corresponding to the host LU.

Identifier of the host LU. This identifier is the one allocated by the OS4101, and an instruction from a host manager is involved at the time of allocation.

Port ID and LUN of the logical unit corresponding to the host LU.

Providing capacity of the logical unit corresponding to the host LU.

The host LU is provided to the application 4103 or the file system 4102. The application 4103 or the file system 4102 transmits an access request to the logical unit by directly or indirectly designating the identifier of the host LU.

Further, the application 4103, such as a database program, Web server program and mail server, sets a plurality of definition information items (including a place to store application data), and provides tables, HTML files, and mail data that vary depending on the definition information. In order to explain such situation, an execution instance is introduced as a logical component for performing processing based on the definition information of the application. Note that when the application 4103 that has no definition information is applied to the present invention, the description of the execution instance may be replaced with that of the application 4103.

<7. Detail of the Management Server>

Next, the management server 1200 is explained.

<7.1. Detail of the Information Possessed by the Management Server>

FIG. 25 is a diagram showing an example of the management-side FMD information about FMD 12050.

The management-side FMD information about FMD 12050 stores the following information relating to the FMD 1030 attached to each storage system.

(MA1) Identifier of the FMD 1030

(MA2) Blockage information of the FMD 1030

(MA3) Model number of the FMD 1030
(MA4) Providing capacity of the FMD 1030, the block size [D], and the number of flash memory packages
(MA5) Surplus capacity value of the FMD 1030

Note that the meanings of (MA1) through (MA5) are the same as the meaning of the FMD information 4050 described in FIG. 5. However, the data structure of the management-side FMD information about FMD 12050 is not necessarily the same as that of the FMD information 4050. Similarly, even when the management-side FMD information about FMD 12050 and the FMD information 4050 have the information indicating the same meaning, it is not necessary to store it in the same data expressive form.

FIG. 26 is a diagram showing an example of the management-side PG configuration information 12060.

The management-side PG configuration information 12060 stores the following information relating to the parity group defined by each storage system.
(MB1) Identifier of the parity group
(MB2) Blockage information of the parity group
(MB3) RAID level of the parity group
(MB4) The number of FMD belonging to the parity group and identifier of the FMD
(MB5) Surplus capacity percentage of the parity group Note that the meanings of (MB1) through (MB5) are the same as the meaning of the PG configuration information 4060 described in FIG. 6. However, the data structure of the management-side PG configuration information 12060 is not necessarily the same as that of the PG configuration information 4060. Similarly, even when the management-side PG configuration information 12060 and the PG configuration information 4060 have the information indicating the same meaning, it is not necessary to store it in the same data expressive form.

FIG. 27 is a diagram showing an example of the management-side internal LU configuration information 12070.

The management-side internal LU configuration information 12070 stores the following information relating to the internal LU defined by each storage system.
(MC1) Identifier of the internal LU
(MC2) Blockage information of the internal LU
(MC3) Identifier of the parity group in which the internal LU is defined
(MC4) The block size of the internal LU
(MC5) The compare information on the internal LU
(MC6) Providing capacity of the internal LU. This capacity is considered to be a value that is calculated by the controller 1010 based on the start address and the end address of the internal LU configuration information 4070, and received from the controller 1010. However, if the start address and the end address of the internal LU configuration information 4070 can be received by the management server 1200, the capacity may be calculated by the management server 1200.
(MC7) Surplus capacity percentage of the internal LU Note that the meanings of (MC1) through (MC5) are the same as the meaning of the internal LU configuration information 4070 described in FIG. 7. However, the data structure of the management-side internal LU configuration information 12070 is not necessarily the same as that of the internal LU configuration information 4070. Similarly, even when the management-side internal LU configuration information 12070 and the internal LU configuration information 4070 have the information indicating the same meaning, it is not necessary to store it in the same data expressive form.

FIG. 28 is a diagram showing an example of the management-side LU path information 12080.

The management-side LU path information 12080 stores the following information relating to the logical unit defined by each storage system.
(MD1) Identifier of the internal LU provided to the host 1100
(MD2) WWN (or the identifier of the I/O port 1013). This information indicates the port 1013 from which the internal LU is provided to the host 1100. As described hereinabove, the WWN may be replaced with an identifier of another type such as a port number. The WWN may also be the content different from the information relating to the LU path information 4080 (for example, the storage system is managed by the WWN, while the management server is managed by the port number).
(MD3) LUN Note that the meanings of (MD1) through (MD3) are the same as the meaning of the LU path information 4080 described in FIG. 13. However, the data structure of the management-side LU path information 12080 is not necessarily the same as that of the LU path information 4080. Similarly, even when the management-side LU path information 12080 and the LU path information 4080 have the information indicating the same meaning, it is not necessary to store it in the same data expressive form.

FIG. 29 is a diagram showing an example of the management-side candidate FMD information about substitution 12090.

The management-side candidate FMD information about substitution 12090 is information that manages the information relating to the substitution candidate FMD for each storage system, and has the following information.
(ME1) The number of FMD 1030 that are likely to be the substitution FMD (often abbreviated as "substitution candidate FMD")
(ME2) Average value or minimum value of the surplus capacity percentage of the substitution candidate FMD
(ME3) Identifier of the substitution candidate FMD 1030

Note that the substitution candidate FMD 1030 that is attached to the storage system but does not belong to the parity group is specified. However, another idea is considered in which the controller defines a group of substitution candidate FMD 1030 (to be referred to as "substitution candidate FMD group" hereinafter) in response to a set request specifying FMD 1030 from the manager. In this case, the identifier of the FMD 1030 belonging to the substitution candidate FMD group may be acquired from the storage system.

FIG. 38 is a diagram showing an example of the surplus capacity policy information 12100.

The surplus capacity policy information 12100 is the information stored with respect to the information on a policy relating to the surplus capacity value (to be referred to as "surplus capacity policy" or "policy"), and has the following information.
(MF1) Identifier of the policy
(MF2) Threshold for evaluating the surplus capacity percentage. Note that anything other than the threshold may be adopted as long as it is for evaluating the surplus capacity percentage.
(MF3) Name (or identifier) for identifying an action to be executed, when the name is applied to the evaluation
(MF4) Action instruction for realizing an action to be executed, when the action instruction is applied to the evaluation. Note that the action instruction may be a program or a script.

FIG. 39 is a diagram showing an example of the logical unit operation information 12110.

The logical unit operation information 12110 stores information relating to the host LU defined by the host 1100.

(MG1) Identifier of the host 1100 defining the host LU
(MG2) Identifier of the host LU
(MG3) Port identifier and LUN of the logical unit corresponding to the host LU
(MG4) State of the host LU
(MG5) Identifier of a policy applied to the host LU
(MG6) Identifier of an execution instance of an application that uses the host LU <7.2. Processing of the Management Server>

The system management program 12010 of the management server is described next.

<7.2.1. Receiving Management Information from the Host>

The system management program 12010 receives the information on the host 1100 by performing the following processes.

(Step 1) The system management program 12010 receives host management information from the host 1100.
(Step 2) The system management program 12010 generates or updates the logical unit operation information 12110 based on the host management information.

Note that the host management information transmitted by the host 1100 is created based on the definition information of the application 4103 of the host 1100 and the host LU. Therefore, the host management information is considered to be some or all of the definition information of the application 4103 and the host LU information, or information including the difference with the previously transmitted information. However, the host management information may not necessarily have the same data structure or data expressive form as the above information. Furthermore, host set information may be expressed or transmitted in any form as long as it includes the relationship between the execution instance of the application 4103 and the host LU, as well as the relationship between the host LU and the logical unit.

Note that the above processes may be implemented once an instruction is issued by the manager to the management server, or be based on partial information that is input from the manager to the management server without going through the host 1100, or be executed repeatedly.

<7.2.2 Receiving Management Information from the Storage System>

The system management program 12010 receives the information on the storage system 1000 by performing the following processes.

(Step 1) The system management program 12010 receives management information of the storage system from the storage system 1000.
(Step 2) The system management program 12010 creates or updates the following information based on the storage system management information.
  Management-side FMD information about FMD 12050
  Management-side PG configuration information 12060
  Management-side internal LU configuration information 12070
  Management-side LU path information 12080
  Management-side candidate FMD information about substitution 12090

Note that the storage system management information transmitted by the storage system 1000 is created based on the following information possessed by the storage system 1000.
  FMD information 4050
  PG configuration information 4060
  Internal LU configuration information 4070
  LU path information 4080

The storage system management information is considered to include some or all of the above information items or the difference with the previously transmitted information. However, the storage system management information may not necessarily have the same data structure or data expressive form as the above information. Furthermore, the storage system management information may be expressed or transmitted in any form as long as it has a surplus capacity value of at least one physical or logical component and the identifier of the component that corresponds to this value, and has information representing a relationship between any or two or more of the FMD 1030, parity group, internal LU, and logical unit, or a relationship among all of them. Specifically, the surplus capacity value and the above relationship may be transmitted in separate communications. Moreover, because in some cases the above relationship is structured by the input from the management server, it may not be included in the storage system management information.

In addition, the information representing the above relationship may not be included in the storage system management information obtained the second time and thereafter. In one embodiment, the storage system management information may include only the identifier of the FMD 1030 and the surplus capacity value of the FMD.

Similarly, in the processing for receiving the management information from the storage system, the surplus capacity value (or surplus capacity percentage) of the information possessed by the management server 1200 may be updated based on the surplus capacity value of at least one logical or physical component included in the storage system management information. For example, it is considered that the surplus capacity value included in the storage system management information may be directly stored in the surplus capacity value (or surplus capacity percentage) of the information possessed by the management server 1200, or may be stored after performing some sort of conversion thereon.

Note that the processing may be executed once an instruction is issued from the manger to the management server 1200, or the information on the relationship may be based on some information that is input from the manager to the management server without going through the host 1100. The processing may be executed repeated.

<7.2.3. Setting Surplus Capacity Operation Policy>

The system management program 12010 creates or updates the surplus capacity policy information 12100 or logical unit operation information 12110 by performing the following processes.

(Step 1) The system management program 12010 receives the following information from the manager via the input/output device.
  Threshold to which the policy is applied
  Evaluation criterion for surplus capacity percentage. Specifically, threshold.
  Action name
  Action instruction (Step 2) The system management program 12010 creates or updates the surplus capacity policy information 12100 based on information received from the manager. The detail of it is described hereinafter.
  When the received information is a newly added policy, the system management program 12010 generates a new policy identifier and stores the above information in the surplus capacity policy information 12100.
  When the received information is an updated policy, the system management program 12010 updates change target information of the surplus capacity policy information 12100.

(Step 3) The system management program 12010 receives, from the manager, information specifying a policy and information specifying an execution instance of the host LU to which the policy is applied or of a use application. Examples of the information for specifying a policy include a policy identifier. Furthermore, examples of the information for specifying an execution instance of the host LU to which the policy is applied or of a use application include the identifier of the host LU and the identifier of the execution instance of the use application.

(Step 4) The system management program 12010 updates the logical unit operation information 12110 based on the information received in Step 3.

The system management program 12010 may change the host LU to which the input policy is applied, by executing Step 3 and Step 4 independently from Step 1 and Step 2.

<7.2.4 Processing for Calculating Surplus Capacity Value of Each Component>

The system management program 12010 calculates and updates the following information.

(Calculation 1) Surplus capacity percentage of the management-side PG configuration information 12060 with respect to the parity group: With reference to the identifier of participating FMD of the management-side PG configuration information 12060, the surplus capacity percentage of one or more FMD belonging to a calculation target parity group stored in the management-side FMD information about FMD 12050 is acquired (actually the surplus capacity and the providing capacity are acquired, and then the surplus capacity percentage is calculated). Based on the acquired surplus capacity percentage, the minimum surplus capacity percentage value is stored as the surplus capacity percentage of the calculation target parity group of the management-side PG configuration information 12060. This calculation processing may be carried out at least when a change in the providing capacity or surplus capacity value of the management-side FMD information (for example, there is a case where the storage system management information is received, the FMD is converted, or where a massage indicating a change in the surplus capacity value is received from the storage system) or a change in the identifier of the participating FMD of the management-side PG configuration information (for example, there is a case where dynamic sparing is executed or when a new parity group is defined or updated) is detected.

(Calculation 2) Surplus capacity percentage of the management-side internal LU configuration information 12070 with respect to the internal LU: With reference to the identifier of the parity group of the management-side internal LU configuration information 12070, the surplus capacity percentage of the parity group in which a calculation target internal LU of the management-side PG configuration information 12060 is defined is acquired from the management-side PG configuration information 12060. The acquired value is stored in the management-side internal LU configuration information 12070 as the surplus capacity percentage of the calculation target internal LU. When the internal LU is defined by using a plurality of parity groups, the minimum value may be taken as the surplus capacity percentage of the calculation target internal LU, out of the surplus capacity percentages corresponding to these parity groups. This calculation processing may be carried out at least when a change in the surplus capacity percentage of the parity group corresponding to the calculation target internal LU is detected or when a correspondence relationship between the internal LU and the parity group (for example, the data of the internal LU is moved from a transparent parity group to another parity group).

(Calculation 3) Average value or minimum value of the surplus capacity percentage of the substitution candidate FMD of the management-side candidate FMD information about substitution 12090: The surplus capacity percentage stored in the management-side FMD information 12050 is acquired for the substitution candidate FMD (actually the surplus capacity and the providing capacity are acquired, and then the surplus capacity information is calculated). The average value or minimum value of the acquired surplus capacity percentage is stored in the management-side candidate FMD information about substitution 12090.

<7.3. Management Information Display and Display Processing>

Next, information display performed by the management server 1200 and processing for calculating the displayed content are described. The display is performed based on the following information possessed by the management server 1200.

Management-side FMD information about FMD 12050
Management-side PG configuration information 12060
Management-side internal LU configuration information 12070
Management-side LU path information 12080
Management-side candidate FMD information about substitution 12090
Surplus capacity policy information 12100
Logical unit operation information 12110

Note that in the following description, the above information managed by the management server 1200 is often generically called "system management information." All of the above information items are not always included in this system management information. For example, in the present invention, operation without a policy can be performed, and in some cases the policy is set without taking the host LU or application into consideration. Therefore, in such an embodiment, all of the information items are not required.

<7.3.1. Example of Screen Display of the Management Server>

Figure 30:
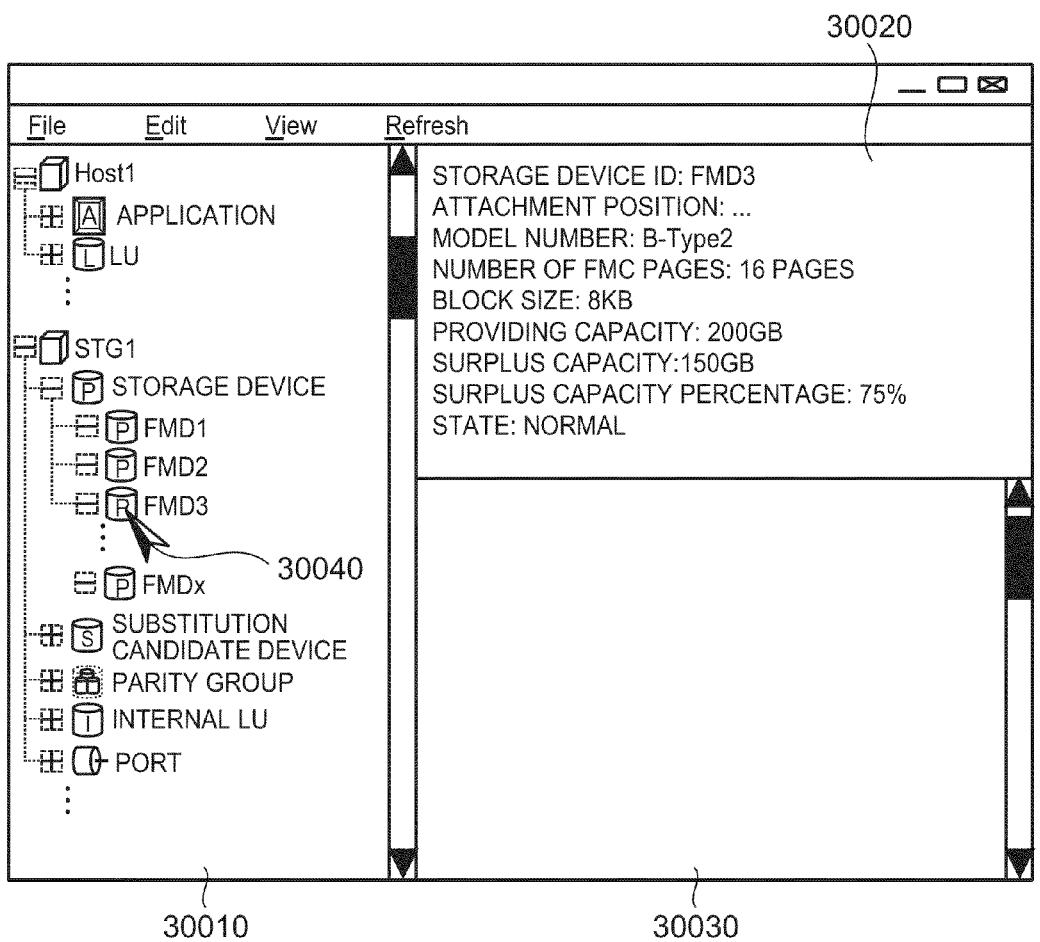
FIG. 30 is a first display example of the management server.

FIG. 30 is an example of a screen that is displayed by the management server 1200 using the input/output device for inputting the information on the storage system 1000 or the host 1100.

Display of the screen has a first pain 30010, a second pain 30020 and a third pain 30030, displays the following information in each pain, and supports input performed by the input/output device.

(First Pain) Display objects that indicate the storage system 1000 managed by the management server 1200, and the physical component (e.g., FMD) of the storage system 1000 or the logical component (e.g., the parity group, internal LU, logical unit) generated logically when setting is performed on the storage system 1000 are displayed. The display objects shown in FIG. 30 represent icons and/or character strings, but they may be in the form of other image or sound. The first pain also displays display objects that indicate the host 1100 managed by the server 1200, and a physical or logical component of the host 1100 (e.g., the execution instance of the application). Further, the first pain displays an upper level relationship or a lower level relationship between the display objects (corresponds to the dotted lines between the icons in FIG. 30). The first pain displays display objects indicating the entire components corresponding to the storage system 1000 and the host 1100 (hereinafter, when highlighting such display objects, they are called "display object list," and when the display object list is not particularly distinguished from the abovementioned display objects, they are simply called "display objects."). The display objects that do not involve identifiers for uniquely specifying the components such as "storage device," "substitution candidate device," "parity group," "internal LU," and "port" in FIG. 30 are the display object list.

(Second Pain) Management information on the component (regardless of the physical or logical component) of the storage system 1000 or the host 1100 corresponding to a display object designated by the input/output device using the first pain is displayed. When the display object list is designated in the first pain, summary management information on the component (regardless of the logical or physical component) corresponding to the display object list is displayed in the second pain.

(Third Pain) When the display object list is designated by the input/output device using the first pain, management information on one or more components (regardless of the logical or physical component) corresponding to the display object list are displayed.

The description, "a display object A is above (or in the upper level relationship with) a display object B," means that the display object A is closer to the root than the display object B in a tree view in the first pain. The description, "the display object A is below (or in the lower level relationship with) the display object B," means that the display object A is closer to the leaves than the display object B in the tree display in the first pain.

When the input/output device has a pointing device (e.g., a mouse, a touchpad, a touch screen, a pen tablet), a display object can be designated by double-clicking it, and the management server 1200 expands and displays the display objects corresponding to the lower level relationship of the designated display object. The examples shown in FIG. 30 or FIGS. 31 through 37 described hereinafter illustrates a GUI, but a console output using a command line interface (CLI) may be employed.

<7.3.2. Display Relating to FMD>

Next, FIG. 30 is used to describe the information to be displayed when the FMD 1030 is designated by the management server as the storage device.

In the example shown in FIG. 30, the display object of STG1 is double-clicked with the pointing device, and thereby the display object list corresponding to "storage device," "substitution candidate device," "parity group," "internal LU," and "port" is screen-displayed as the component (regardless of the logical or physical component) belonging to the storage system identified by STG1 (in other words, display objects that are in the lower level relationship with the display object of the STG1 are displayed). Further, in the example shown in FIG. 30, the display object list corresponding to "storage device" is double-clicked with the pointing device, and thereby display objects corresponding to one or more FMD installed in the storage system 1000 identified by STG1 (in other words, display objects having the character strings of FMD1 through FMD3) are screen-displayed.

Through the screen display, the manager clicks the display object of a predetermined FMD1030 by using a pointing device cursor 30040 (the display object having the identifier of the FMD3 in FIG. 30), and thereby the management server 1200 receives a management information display request designating the predetermined FMD 1030.

The management server 1200 that has received the management information display request displays at least one of the followings as the management information relating to the predetermined FMD 1030 in the second pain.

The identifier of the predetermined FMD 1030 is displayed as an identifier specifying the storage device. This display is carried out based on the FMD identifier of the management-side FMD information about FMD 12050.

Information relating to a place for attaching the storage device is displayed. This display is carried out by calculating the position based on the FMD identifier of the management-side FMD information about FMD 12050.

The model number of the predetermined FMD 1030 is displayed as the model number of the storage device. This display is carried out based on the model number of the management-side FMD information about FMD 12050.

The number of FMC and the block size [D] of the predetermined FMD 1030 are displayed as a part of the configuration of the storage device. This display is carried out based on the number of FMC and the block size of the management-side FMD information about FMD 12050.

The providing capacity of the predetermined FMD 1030 is displayed as the providing capacity of the storage device. This display is carried out based on the providing capacity of the management-side FMD information about FMD 12050.

The surplus capacity percentage of the predetermined FMD 1030 is displayed as the surplus capacity percentage of the storage device. This display is carried out based on the surplus capacity value and/or the providing capacity of the management-side FMD information about FMD 12050.

The condition of the predetermined FMD 1030 is displayed as the condition of the storage device. This display is carried out based on the blockage information and surplus capacity percentage of the management-side FMD information about FMD 12050.

Note that any of the following values can be displayed as the condition of the FMD 1030, but other values may be displayed.

(State 1) Normal (I/O processing is acceptable)
(State 2) Blocked (unavailable)
(State 3) Shortage in surplus area (to be often abbreviated as "surplus shortage" in the diagrams)

Further, for each of the plurality of FMD 1030, the management server 1200 may display the management information relating to the predetermined FMD 1030 to the third pain. This display can be performed at the point of time when the manager clicks the display object list having the character string of the storage device by using the pointing device cursor 30040 through the screen display, and thereby the management server 1200 receives the management information display request designating the predetermined FMD 1030.

<7.3.3 Display Relating to Parity Group>

Information to be displayed by the management server 1200 when a predetermined parity group is designated is explained with reference to FIG. 31.

Figure 31:
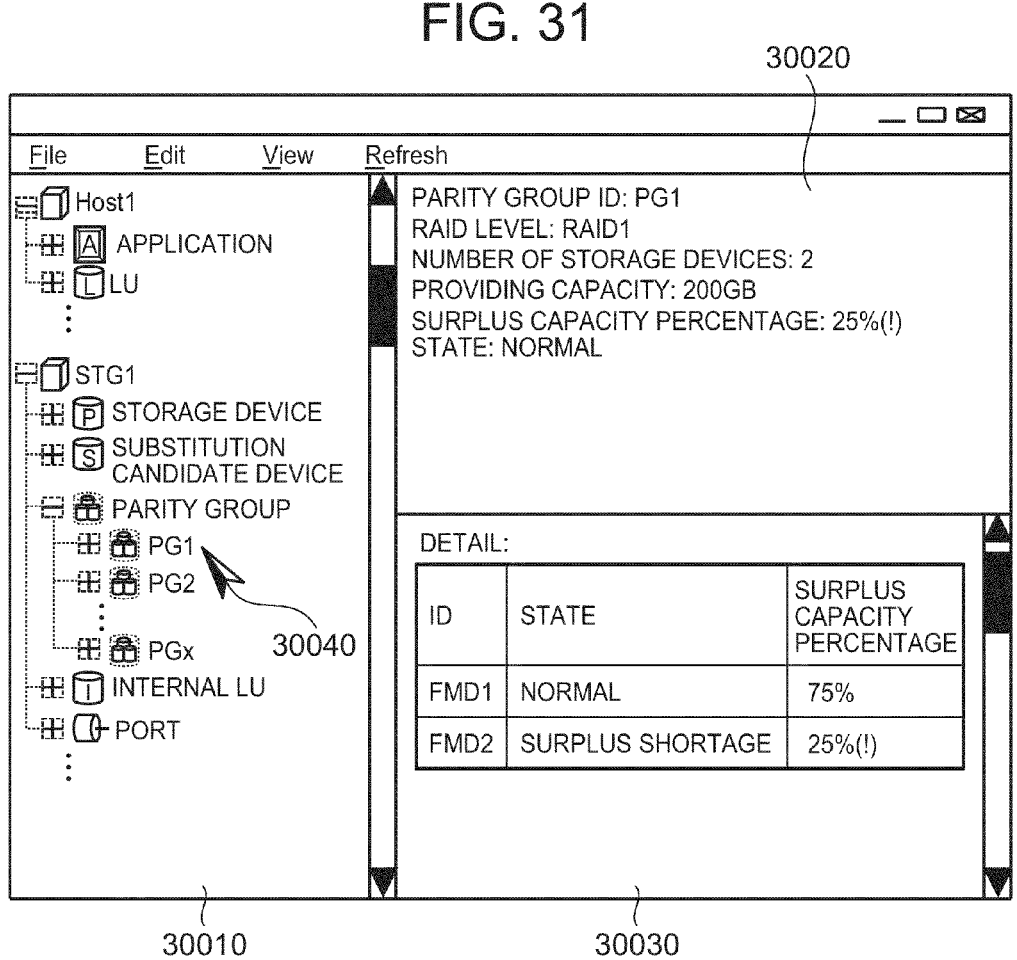
FIG. 31 is a second display example of the management server.

In the example shown in FIG. 31, the display object of STG1 is double-clicked with the pointing device, and thereby the display object list corresponding to "storage device," "substitution candidate device," "parity group," "internal LU," and "port" is screen-displayed as the component (regardless of the logical or physical component) belonging to the storage system identified by STG1. Further, in the example shown in FIG. 31, the display object list corresponding to "parity group" is double-clicked with the pointing device, and thereby display objects corresponding to one or more parity groups defined by the storage system 1000 identified by STG1 (in other words, display objects of PG1, PG2 and PGx) are screen-displayed.

Through the screen display, the manager clicks the display object of a predetermined parity group by using the pointing device cursor 30040 (the display object having the identifier of the PG1 in FIG. 31), and thereby the management server 1200 receives a management information display request designating the predetermined parity group.

The management server 1200 that has received the management information display request displays at least one of the followings as the management information relating to the predetermined parity group in the second pain.

The identifier of the predetermined parity group is displayed as an identifier specifying the parity group. This display is carried out based on the parity group identifier of the management-side PG configuration information 12060.

RAID level of the predetermined parity group is displayed as the RAID level of the parity group. This display is carried out based on the RAID level of the management-side PG configuration information 12060.

The number of FMD 1030 belonging to the predetermined parity group is displayed as the number of storage devices of the parity group. This display is carried out based on the number of FMD of the management-side PG configuration information 12060.

The capacity that is realized after performing RAID processing on the predetermined parity group is displayed as the providing capacity of the parity group. This display is carried out based on the participating FMD identifier and RAID level of the management-side PG configuration information 12060 and the providing capacity of the management-side FMD information about FMD 12050.

The surplus capacity percentage of the predetermined parity group is displayed as the surplus capacity percentage of the parity group. This display is carried out based on the surplus capacity percentage of the management-side PG configuration information 12060.

The condition of the predetermined parity group is displayed as the condition of the parity group. This display is carried out based on the blockage information and surplus capacity percentage of the management-side PG configuration information 12060.

Note that any of the following values can be displayed as the condition of the parity group, but other values may be displayed.
(State 1) Normal (I/O processing is acceptable)
(State 2) Degenerated (see the definition thereof in 3.6.1. Further, it is also a state in which loss of data occurs when one of the normal FMD 1030 belonging to the parity group is blocked (especially in the case of RAID 5))
(State 3) Blocked (unavailable)
(Step 4) Shortage in surplus area (to be often abbreviated as "surplus shortage" in the diagrams)
(State 5) Degenerated and shortage in surplus area (at least one of the FMD 1030 belonging to the degenerated parity group is in a surplus area shortage state)

Note that the value to be displayed as the surplus capacity percentage in the screen display of FIG. 31 is considered to be at least one of the followings.

The smallest value out of the surplus capacity percentages of one or more FMD 1030 belonging to the parity group. When monitoring is performed in order to avoid the degenerated state of the parity group due to shortage in surplus area, this smallest value is preferred.

The smallest value and the second smallest value out of the surplus capacity percentages of one or more FMD 1030 belonging to the parity group. When monitoring is performed in order to avoid the blocked state of the parity group due to shortage in surplus area, these smallest values are preferred.

The average value and variance value of the surplus capacity percentages of one or more FMD 1030 belonging to the parity group.

In addition, the management server 1200 that has received the management information display request may display a list of management information relating to the one or more FMD 1030 belonging to the predetermined party group in the third pain. Note that the management information is considered to be the value described in FIG. 30 but may be other values.

Figure 32:
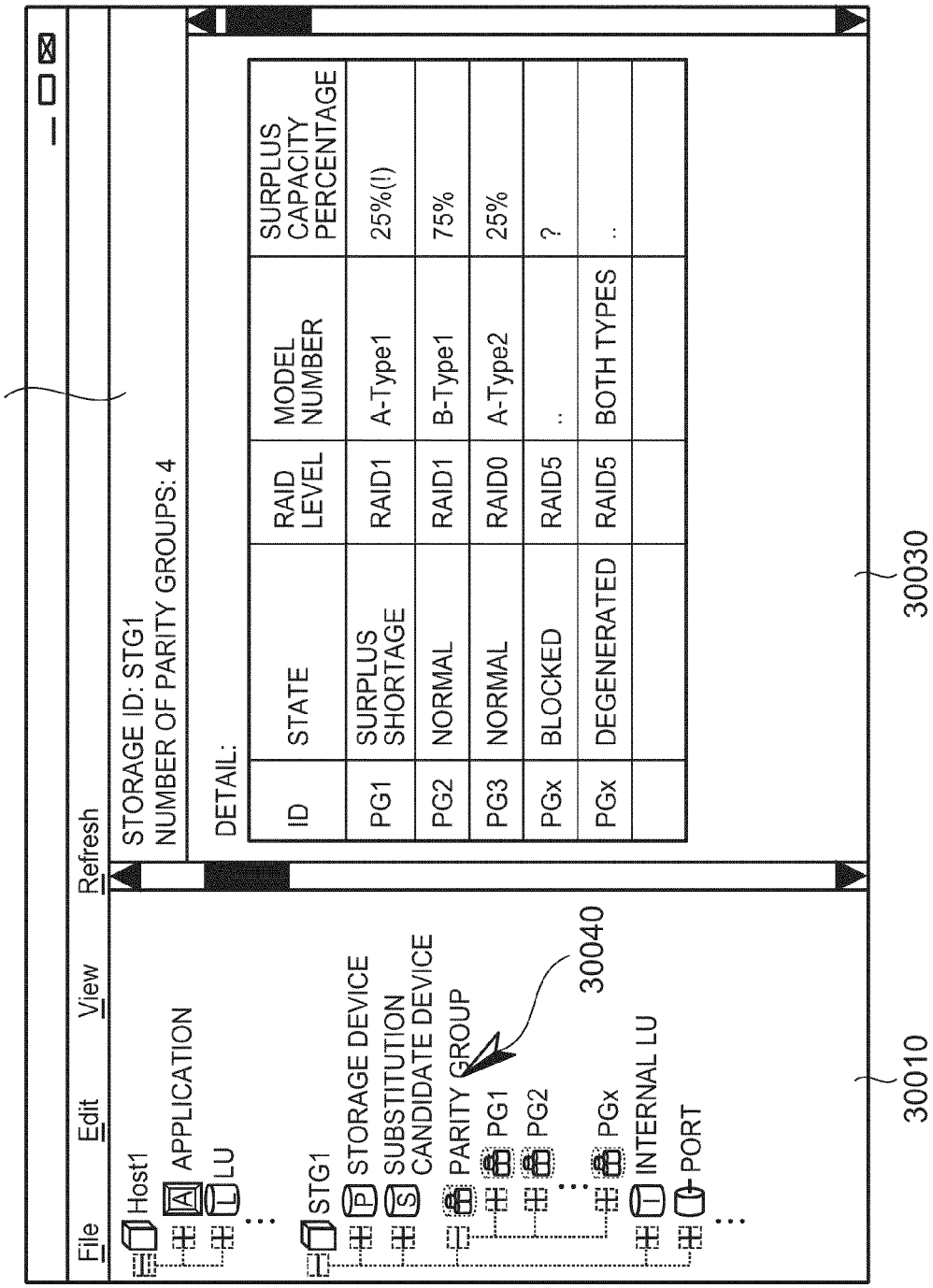
FIG. 32 is a third display example of the management server.

As shown in FIG. 32, the management server 1200 may display, in the third pain, the management information relating to the predetermined parity group for each of the plurality of parity groups. This display is performed at the point of time when the manager clicks the display object list having the character string of "parity group" by using the pointing device cursor 30040 through the screen display, and thereby the management server 1200 receives the management information display request designating the parity group. As the information displayed in the second pain, aggregation information other than the following may be displayed.

Identifier of the storage system corresponding to the display object list of the storage system, at the top of the display object list of the clicked "parity group."

The number of parity groups defined by the storage system corresponding to the display object list of the storage system, at the top of the display object list of the clicked "parity group."

The minimum value or average value of the surplus capacity percentages of the parity group defined by the storage system corresponding to the display object list of the storage system, at the top of the display object list of the clicked "parity group."

Moreover, the management server 1200 that has received the management information display request may display a list of management information relating to the one or more parity groups defined by the storage system 1000 in the third pain. The management information is considered to be the values described in FIG. 31 and the information relating to the FMD 1030 belonging to each parity group, but other value may be employed.

<7.3.4. Display Relating to the Internal LU>

Information to be screen-displayed when a predetermined internal LU is designated by the management server 1200 is described with reference to FIG. 33.

Figure 33:
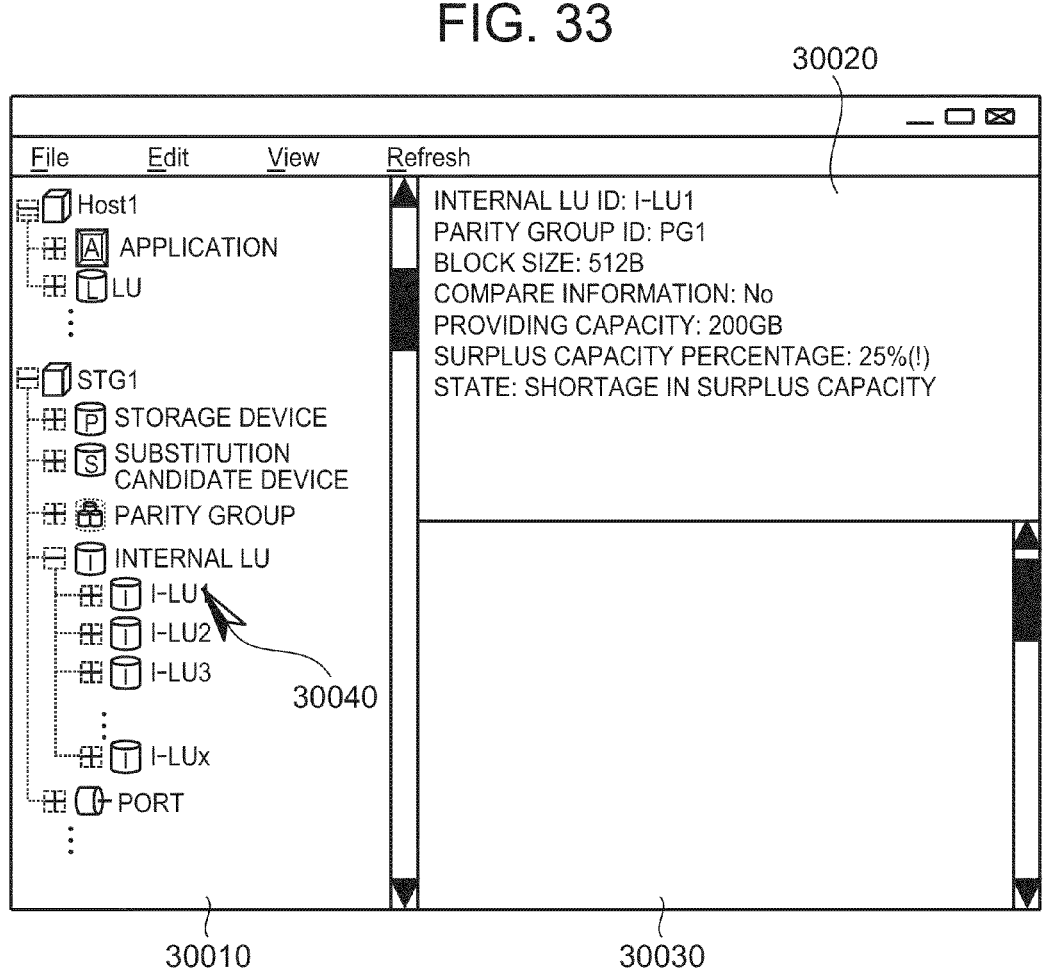
FIG. 33 is a fourth display example of the management server.

In the example shown in FIG. 33, the display object of STG1 is double-clicked with the pointing device, and thereby the display object list corresponding to "storage device," "substitution candidate device," "parity group," "internal LU," and "port" is screen-displayed as the component (regardless of the logical or physical component) belonging to the storage system identified by STG1. Further, in the example shown in FIG. 33, the display object list corresponding to "parity group" is double-clicked with the pointing device, and thereby display objects corresponding to one or more internal LUs defined by the storage system 1000 identified by STG1 (in other words, display objects of I-LU1 through I-LU3 and I-LUx) are screen-displayed.

Through the screen display, the manager clicks the display object of a predetermined internal LU by using the pointing device cursor 30040 (the internal LU having the identifier of the I-LU1 in FIG. 33), and thereby the management server 1200 receives a management information display request designating the predetermined internal LU.

The management server 1200 that has received the management information display request displays at least one of the followings as the management information relating to the predetermined internal LU in the second pain.

> Identifier of the predetermined internal LU is displayed as the identifier for specifying the internal LU. This display is carried out based on the identifier of the internal LU of the management-side internal LU configuration information 12070.
>
> Identifier of the parity group in which the predetermined internal LU is defined is displayed as the identifier of the parity group in which the internal LU is defined. This display is carried out based on the parity group identifier of the management-side internal LU configuration information 12070.
>
> Block size of the predetermined internal LU is displayed as the block size of the internal LU. This display is carried out based on the block size of the management-side internal LU configuration information 12070.
>
> Providing capacity of the predetermined internal LU is displayed as the providing capacity of the internal LU. This display is carried out based on the providing capacity of the management-side internal LU configuration information 12070.
>
> Surplus capacity percentage of the parity group in which the predetermined internal LU is defined is displayed as the surplus capacity percentage of the internal LU. This display is carried out based on the surplus capacity percentage of the management-side internal LU configuration information 12070.
>
> The state of the predetermined internal LU is displayed as the state of the internal LU. This display is carried out based on the blockage information and surplus capacity percentage of the management-side internal LU configuration information 12070.

Any of the following values can be displayed as the state of the internal LU, but other values may be displayed.
(State 1) Normal (I/O processing is acceptable)
(State 2) Degenerated (see the definition thereof in 3.6.1. Further, it is also a state in which loss of data occurs when one of the normal FMD 1030 belonging to the parity group having the predetermined internal LU defined therein is blocked (especially in the case of RAID 5))
(State 3) Blocked (unavailable)
(Step 4) Shortage in surplus area (to be often abbreviated as "surplus shortage" in the diagrams)
(State 5) Degenerated and shortage in surplus area (at least one of the FMD 1030 belonging to the degenerated parity group having the predetermined internal LU defined therein is in a surplus area shortage state)

The value displayed as the surplus capacity percentage in the screen display of FIG. 33 may be the values described in the display relating to the parity group illustrated in FIGS. 31 and 32.

Moreover, the management server 1200 that has received the management information display request may display a list of management information relating to the one or more parity groups having the predetermined internal LU defined therein in the third pain. The management information is considered to be the values described in FIGS. 31 and 32, but other value may be employed.

Furthermore, for each of the plurality of internal LUs, the management server 1200 may display a list of management information relating to the predetermined internal LU in the third pain. This display is performed at the point of time when the manager clicks the display object list having the character string of "internal LU" by using the pointing device cursor 30040 through the screen display, and thereby the management server 1200 receives the management information display request designating the parity group. As the information displayed in the second pain, aggregation information other than the following may be displayed.

> Identifier of the storage system corresponding to the display object list of the storage system, at the top of the display object list of the clicked "internal LU."
>
> The number of internal LUs defined by the storage system corresponding to the display object list of the storage system, at the top of the display object list of the clicked "internal LU."
>
> minimum value or average value of the surplus capacity percentages of the internal LU defined by the storage system corresponding to the display object list of the storage system, at the top of the display object list of the clicked "parity group."

<7.3.5. Display Relating to the Logical Unit>

Information to be screen-displayed when a predetermined LU is designated by the management server 1200 is described with reference to FIG. 34.

Figure 34:
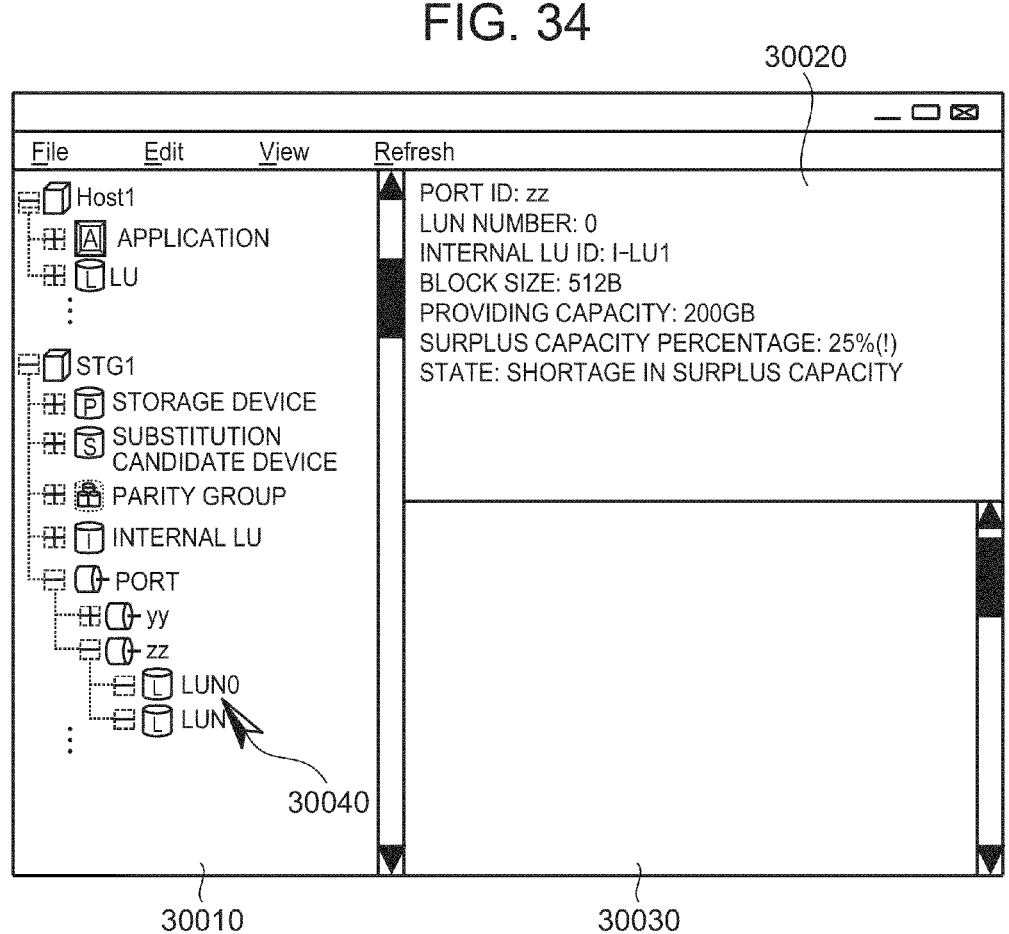
FIG. 34 is a fifth display example of the management server.

In the example shown in FIG. 34, the display object of STG1 is double-clicked with the pointing device, and thereby the display object list corresponding to "storage device," "substitution candidate device," "parity group," "internal LU," and "port" is screen-displayed as the component (regardless of the logical or physical component) belonging to the storage system identified by STG1. Further, in the example shown in FIG. 34, the display object list corresponding to "port" is double-clicked with the pointing device, and thereby display objects corresponding to one or more ports possessed by the storage system 1000 identified by STG1 (in other words, display objects having the character strings of yy and zz) are screen-displayed. Further, the display object list of "port" of zz is double-clicked with the pointing device, and thereby display objects corresponding to one or more logical units defined by the port with the identifier of zz (in other words, display objects having the character strings of LUN0 and LUN1) are screen-displayed.

Through the screen display, the manager clicks the display object of a predetermined LU by using the pointing device cursor 30040 (the display object having the identifier of LUN0 in FIG. 33), and thereby the management server 1200 receives a management information display request designating the predetermined logical unit.

The management server 1200 that has received the management information display request displays at least one of the followings as the management information relating to the predetermined logical unit in the second pain.

> Identifier for specifying a port in which the predetermined logical unit is defined is displayed as the identifier for specifying a port in which the logical unit is defined. When this identifier is a fiber channel, WWN or port ID can be employed, and when the identifier is Ethernet, a MAC address or IP address can be employed. But other identifiers may be adopted as well. This display is carried out based on the port identifier of the management-side LU path information 12080.
>
> Identifier of the predetermined logical unit is displayed as the identifier for specifying the logical unit. The LUN of SCSI is considered to be this identifier, but other identifiers may be employed. This display is carried out based on the LUN of the management-side LU path information 12080.
>
> Identifier of the internal LU to which the predetermined logical unit corresponds is displayed as the identifier of an internal LU to which the logical unit corresponds.

This display is carried out based on the internal LU identifier of the management-side LU path information 12080.

Block size of the predetermined logical unit is displayed as the block size of the logical unit. This display is carried out based on the identifier of the internal LU of the management-side LU path information 12080 and the block size of the management-side internal LU configuration information 12070.

Providing capacity of the internal LU to which predetermined logical unit corresponds is displayed as the providing capacity of the logical unit. This display is carried out based on the identifier of the internal LU of the management-side LU path information 12080 and the providing capacity of the management-side internal LU configuration information 12070.

Surplus capacity percentage of the internal LU to which the predetermined logical unit corresponds is displayed as the surplus capacity percentage of the logical unit. This display is carried out based on the identifier of the internal LU of the management-side LU path information 12080 and the surplus capacity percentage of the management-side internal LU configuration information 12070.

The state of the predetermined logical unit is displayed as the state of the logical unit. This display is carried out based on the identifier of the internal LU of the management-side LU path information 12080 and the blockage information and surplus capacity percentage of the management-side internal LU configuration information 12070.

Any of the following values can be displayed as the state of the logical unit, but other values may be displayed.
(State 1) Normal (I/O processing is acceptable)
(State 2) Degenerated (see the definition thereof in 3.6.1. Further, it is also a state in which loss of data occurs when one of the normal FMD 1030 belonging to the parity group corresponding to the predetermined logical unit is blocked (especially in the case of RAID 5))
(State 3) Blocked (unavailable)
(Step 4) Shortage in surplus area (to be often abbreviated as "surplus shortage" in the diagrams)
(State 5) Degenerated and shortage in surplus area (at least one of the FMD 1030 belonging to the degenerated parity group corresponding to the predetermined logical unit is in a surplus area shortage state)

The value displayed as the surplus capacity percentage in the screen display of FIG. 34 may be the values described in the display relating to the parity group illustrated in FIGS. 31 and 32.

Moreover, the management server 1200 that has received the management information display request may display a list of management information relating to the one or more parity groups corresponding to the predetermined logical unit in the third pain. The management information is considered to be the values described in FIGS. 31 and 32, but other value may be employed.

Furthermore, for each of the plurality of logical units, the management server 1200 may display the management information relating to the predetermined logical unit in the third pain. This display is performed at the point of time when the manager clicks the display object list having the character string of "port" by using the pointing device cursor 30040 through the screen display, and thereby the management server 1200 receives the management information display request designating the predetermined port. As the information displayed in the second pain, aggregation information other than the following may be displayed.

Identifier of the storage system corresponding to the display object list of the storage system, at the top of the display object list of the clicked "port."
The number of one or more logical units defined with respect to the port corresponding to the display object list of the clicked "port."
The minimum value or average value of the surplus capacity percentages of the one or more logical units defined with respect to the port corresponding to the display object list of the clicked "port."

The management server 1200 that has received the management information display request may display a list of management information relating to the one or more parity groups defined by the storage system 1000 in the third pain. The management information is considered to be the values described in FIG. 31 and the information relating to the FMD 1030 belonging to each parity group, but may be other values.

<7.3.6 Display Relating to the Substitution Candidate FMD>

Information to be displayed when a substitution candidate device is designated by the management server is described with reference to FIG. 35.

Figure 35:
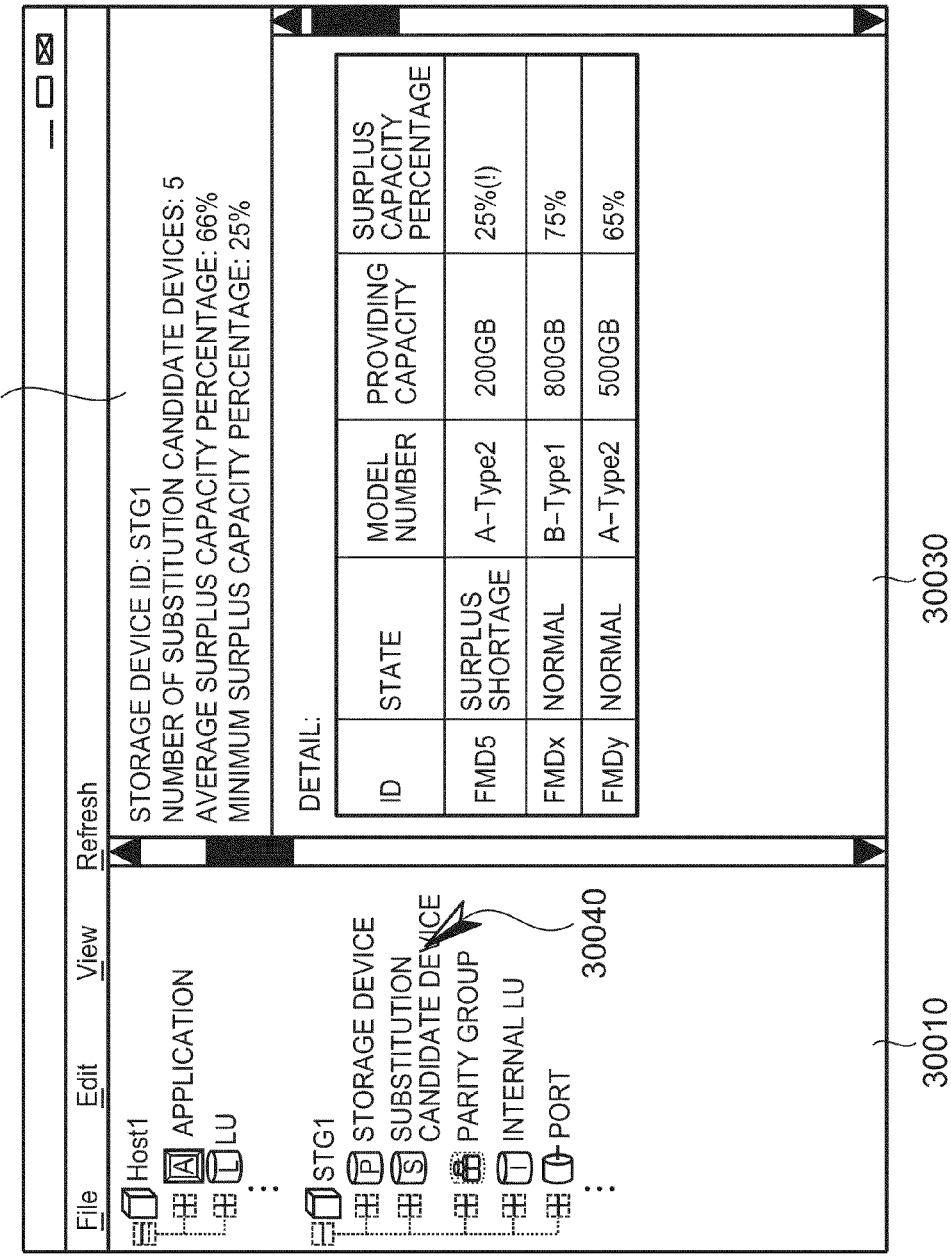
FIG. 35 is a sixth display example of the management server.

In the example shown in FIG. 35, the display object of STG1 is double-clicked with the pointing device, and thereby the display object list corresponding to "storage device," "substitution candidate device," "parity group," "internal LU," and "port" is screen-displayed as the component (regardless of the logical or physical component) belonging to the storage system identified by STG1.

Through the screen display, the manager clicks the display object list of the substitution candidate device by using the pointing device cursor 30040, and thereby the management server 1200 receives a management information display request designating the substitution candidate device.

The management server 1200 that has received the management information display request displays at least one of the followings as the management information relating to the substitution candidate device in the second pain.

Identifier of the storage system corresponding to the display object list of the storage system, at the top of the display object list of the clicked "substitution candidate device." This display is carried out based on the identifier of the storage system of the management-side candidate FMD information about substitution 12090.
The number of substitution candidate FMD 1030 possessed by the storage system corresponding to the display object list of the storage system, at the top of the display object list of the clicked "substitution candidate device." This display is carried out based on the number of FMD of the management-side candidate FMD information about substitution 12090.
The average surplus capacity percentage or minimum surplus capacity percentage of the substitution candidate device possessed by the storage system corresponding to the display object list of the storage system, at the top of the display object list of the clicked "substitution candidate device." This display is carried out based on the surplus capacity percentage of the management-side candidate FMD information about substitution 12090.

For each of the plurality of substitution candidates FMD 1030, the management server 1200 may display at least one of the following management information items relating to the substitution candidate FMD 1030, to the third pain. As the information to be displayed, at least one of the information items displayed by designating the FMD 1030 in the second pain can be included, but other information may be displayed.

<7.3.7. Display Relating to the Application>

Information to be displayed when a predetermined host and a logical unit recognized by the predetermined host (hereinafter, the logical unit recognized by the host is called "host LU) are designated by the management server 1200 is described with reference to FIG. 36.

Figure 36:
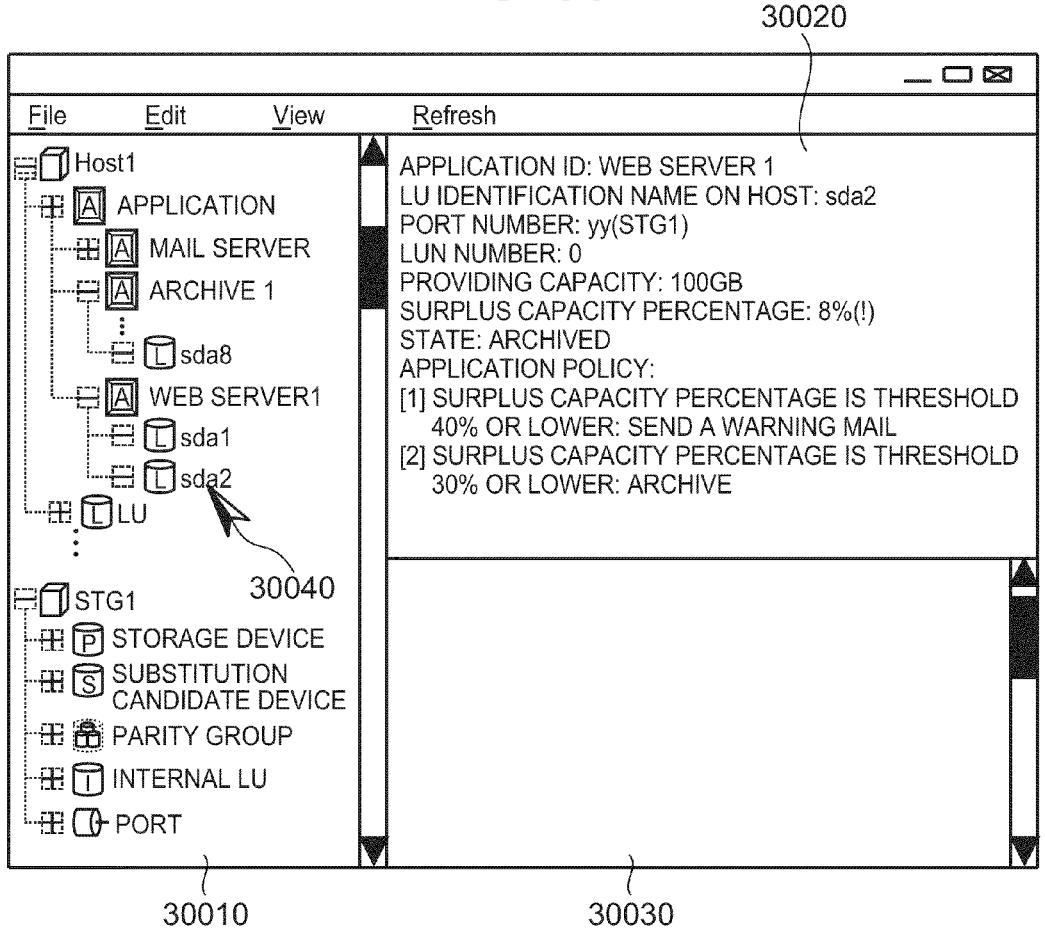
FIG. 36 is a seventh display example of the management server.
Figure 37:
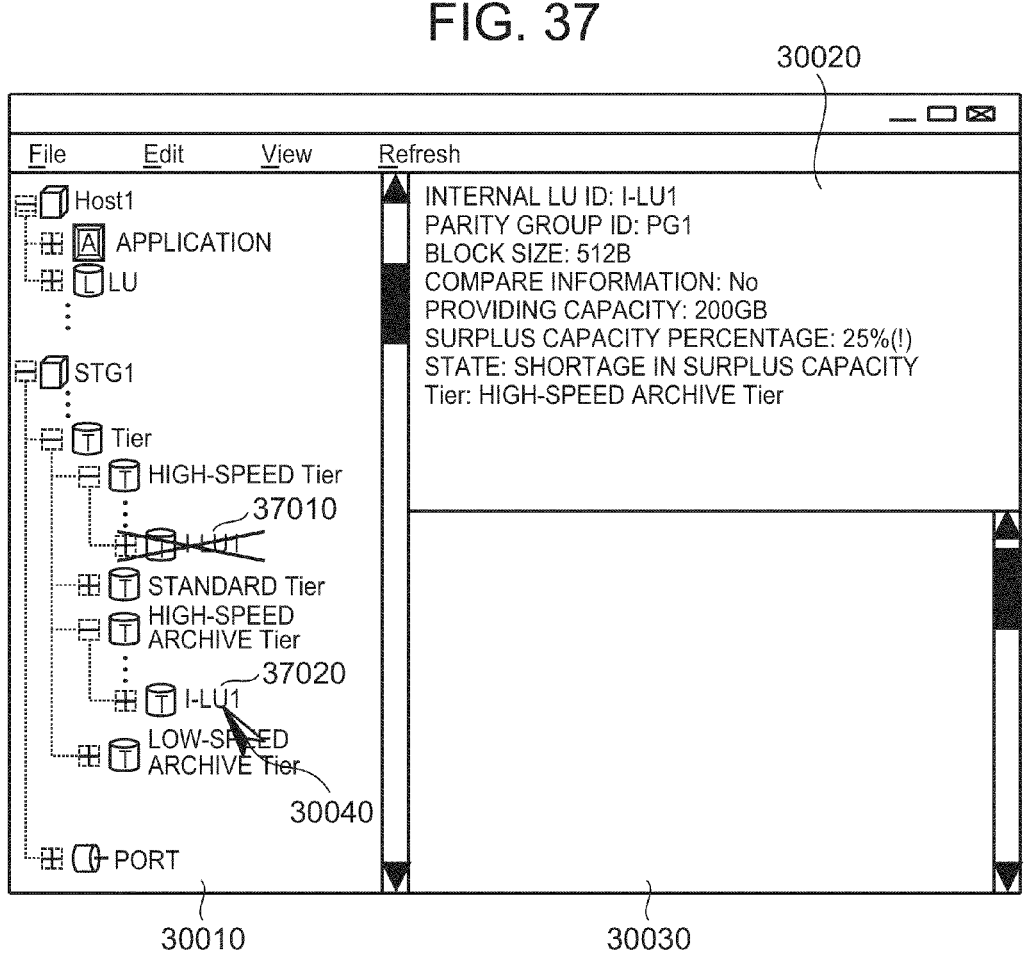
FIG. 37 is an eighth display example of the management server.

In the example shown in FIG. 36, a display object of Host1 is double-clicked with the pointing device, and thereby the display object list corresponding to "application" and "LU" is screen-displayed as the component (regardless of the logical or physical component) belonging to the host 1100 identified by Host1 is screen-displayed. Further, in the example shown in FIG. 36, the display object list of "application" is double-clicked with the pointing device, and thereby the display object list (i.e., the display objects of "mail server," "archive 1," and "web server 1") corresponding to the execution instances of one or more applications set by the host 1100 identified by the Host1 is screen-displayed. Further, in the example shown in FIG. 36, the display object list of "Web server 1" is double-clicked with the pointing device, and thereby the display objects of one or more host LUs in which the application execution instances identified by the Web server 1 are used for data storage or reference (i.e., display objects of "sda1" and "sda2") are screen-displayed.

Then, through the screen display, the manager clicks the display object of a predetermined host LU by using the pointing device cursor 30040 (the display object of "sda2" in FIG. 36), and thereby the management server 1200 receives a management information display request designating the predetermined host LU.

The management server 1200 that has received the management information display request displays at least one of the followings as the management information relating to the predetermined host LU in the second pain.

- As a host LU identifier, the identifier to which the host 1100 of a predetermined host LU is allotted is displayed
- Identifier of the execution instance of the application, which corresponds to the display object list of the application corresponding to the top of the display objects of the predetermined host LU, is displayed as the information for identifying the application type or the execution instance of the application. When a plurality of application execution instances share the predetermined host LU, the identifiers of the plurality of application execution instances may be displayed. This display is carried out based on the identifier of the execution instance of the use application of the logical unit operation information 12110.
- Identifier and LUN number of a port in which the logical unit corresponding to the predetermined host LU is defined are displayed as the identifier and LUN number of a port in which the host LU is provided as the logical unit. This display is carried out based on the LUN of the logical unit operation information 12110.
- Capacity detected by the host 1100 as the predetermined host LU, or providing capacity of the internal LU corresponding to the logical unit associated with the predetermined host LU is displayed as the providing capacity of the host LU. This display is carried out based on the port identifier and LUN of the use application of the logical unit operation information 12110, the internal LU identifier of the management-side LU path information, and the providing capacity of the management-side internal LU configuration information.
- Surplus capacity percentage of the internal LU corresponding to the logical unit associated with the predetermined host LU is displayed as the surplus capacity percentage of the host LU. This display is carried out based on the identifier and LUN of the port of the use application of the logical unit operation information 12110, the internal LU identifier of the management-side LU path information, and the surplus capacity percentage of the management-side internal LU configuration information.
- Identifier of the operation policy applied to the predetermined host LU, and information including a threshold of the surplus capacity percentage of the operation policy and an action taken when the value falls below the threshold are displayed as the information of the operation policy provided to the host LU. This display is carried out based on the application policy identifier of the logical unit operation information 12110 and the surplus capacity policy information 12100.
- The state of the predetermined host LU is displayed as the state of the host LU. As the state of the host LU, the following state is considered to be displayed. This display is carried out based on the state of the logical unit operation information 12110.
- The state of a corresponding logical unit or internal LU
- A state relating to usage setting of the predetermined host LU of the application execution instance. Considered is a state, such as "archiving," for indicating that the archive data is being stored in the logical unit, a state, such as "archive completed," for indicating that the archive data is completely stored in the logical unit, or a state, such as "archive operating," for indicating that the predetermined host LU recognized by the application is being applied.
- A state considering the status of a failure caused in the host 1100 or the I/O network 1300 (e.g., communication disconnection)

As described hereinafter, the state of the host LU may be displayed as any character string in accordance with the application by the designation made by the manager. In this case, the state of the internal LU corresponding to the logical unit associated with the host LU may be displayed as new information to be displayed. The information to be referred to is the same as that described in FIG. 34.

In place of the surplus capacity percentage for screen display described in FIGS. 30 through 36, other surplus capacity values may be displayed. Although current surplus capacity percentages are displayed in the diagrams, they may be displayed in a graph including the past surplus capacity values, so that the manager can estimate a future surplus capacity value by referring to the past values.

Moreover, the above has described the method for designating a logical or physical component designated by the management information display request using the first pain, but the present invention is not limited to this method. Other display/designation methods may be used as long as the following designation can be performed with the management information display request.

- Designating a specific logical or physical component (e.g., when designating a certain parity group)
- Designating a certain type of logical or physical component that relates to a predetermined storage system (or a predetermined component) (e.g., the entire parity groups defined by the storage system STG1 are designated)

Note that the designated/displayed contents may be filtered based on the conditions previously set as these designation conditions. In addition, information other than the above-described information may be displayed, or part of the above-described information may be omitted.

<7.4. Processing Based on the Policy>

The system management program 12010 carries out the following processing on the internal LU whose surplus capacity percentage has changed, in response to the change in the surplus capacity percentage of the internal LU.

(Step 1) The system management program 12010 specifies, based on the management-side LU path information 12080, a logical unit corresponding to the internal LU whose surplus capacity percentage has changed.

(Step 2) The system management program 12010 specifies, based on the logical unit operation information 12110, a host LU corresponding to the logical unit specified in Step 1.

(Step 3) The system management program 12010 refers to the application policy identifier of the host LU specified in Step 2. When the application policy identifier is not stored as a result of the reference, the processing is ended. When the application policy identifier is stored as a result of the reference, an application policy is specified.

(Step 4) The system management program 12010 performs the following processing on all of the application policies specified in Step 3.

(Step 4A) The system management program 12010 refers to the surplus capacity policy information 12100 to determine the changed surplus capacity percentage of the internal LU based on an evaluation criterion registered in the threshold.

(Step 4B) When it is determined in Step 4A that the evaluation criterion is met, the system management program 12010 carries out the processing based on the contents stored in the action instruction.

<7.5. Contents of the Action Instruction>
<7.5.1 Host LU State Instruction>

As described above, the manager can designate the contents of the action instruction, whereby operation management is realized in accordance with many applications. Furthermore, an instruction to change the state of the host LU can be described in the action instruction (this instruction is referred to as "host LU state instruction" in the following description). In order to realize the operation management in accordance with many applications, a flexible state corresponding to the applications is preferably displayed as the state of the host LU to be displayed. Examples of the host LU state instruction are as follows.

>HOSLUSTAT "any character string"

The system management program 12010 referring to the contents of the application instruction detects the host LU state instruction and thereby updates the state of the logical unit operation information to "any character string."

<7.5.2. Examples of the Action Instruction>

Examples of the contents of the action instruction are described hereinafter.

Example 1

An electronic mail or SNMP strap indicating that the host LU falls below the threshold is transmitted.

Example 2

A command or program for using the host LU for the archive application is executed with respect to the execution instance of the application that uses the host LU below the threshold.

Example 3

A command or program for moving the application data stored in the host LU to another host LU is executed with respect to the execution instance of the application that uses the host LU below the threshold, and/or with respect to the program of the host 1100. In conjunction with this, a command or program for preventing at least to the host LU is executed with respect to the execution instance. Then, a command or program for causing the execution instance of the archive program to use the host LU for archive data storage is executed.

<7.5.3 Data Migration Processing Relating to the Threshold>

The internal LU corresponding to the FMD 1030 has a particularly higher random read performance, compared to HDD. The write performance thereof is not much different from that of the HDD, depending on FMD and RAID level. Therefore, the internal LU corresponding to the FMD 1030 is sometimes for high-speed application. On the other hand, although there is a limit to the number of writings in the present invention, the present invention has new parity groups and internal LUs that are excellent in the random read performance and used for high-speed archive application. Management of high-speed Tier, which is a collection of the high-speed application internal LUs, and management of a high-speed archive Tier, which is a collection of the high-speed archive application internal LUs, are described, the management being performed using data migration performed by the storage system 1000.

First, the configuration control program 4030 of the controller 1010 executes either one or both of the following data migration.

(Data Migration Processing, Case 1)

(Step 1) The configuration control program 4030 receives, from the management server, a data migration instruction designating the identifier of an internal LU to be moved, and an identifier of the internal LU serving as a destination.

(Step 2) The configuration control program 4030 reads, from the FMD 1030 of the movement source parity group corresponding currently to the internal LU to be moved, write data stored as the internal LU to be moved.

(Step 3) The configuration control program 4030 writes the data read in Step 2 into the FMD 1030 belonging to the movement destination parity group corresponding to the movement destination internal LU. Note that the address range for the write destination of the FMD 1030 is the address range corresponding to the movement destination internal LU.

(Step 4) The identifier of the internal LU to be moved, which is stored in the internal LU configuration information 4070, is replaced with the identifier of the movement destination internal LU.

(Data Migration Processing, Case 2)

(Step 1) The configuration control program 4030 receives, from the management server, a data migration instruction designating the identifier of an internal LU to be moved, and an identifier of the movement destination parity group in which is present a providing capacity or more of unallocated area of the movement target internal LU.

(Step 2) The configuration control program 4030 reads, from the FMD 1030 of the movement source parity group corresponding currently to the internal LU to be moved, write data stored as the internal LU to be moved.

(Step 3) The configuration control program 4030 writes the data read in Step 2 into the FMD 1030 belonging to the movement destination parity group. Note that the address range for the write destination of the FMD 1030 is an unallocated address range.

(Step 4) The identifier of the parity group of the internal LU to be moved, which is stored in the internal LU configuration information 4070, is changed to the identifier of the movement destination parity group. The start address and the end address of the internal LU to be moved, which are stored in the internal LU configuration information 4070, are changed to the beginning and the ending of the address range on the parity group in which the write destination address range of the FMD 1030 is converted to the address range of the parity group.

The system management program 12010 uses the data migration performed in the storage system 1000 to manage the two Tiers by performing the following processing.

(Step 0) The system management program 12010 manages an internal LU having a surplus capacity percentage exceeding a predetermined threshold, as an internal LU belonging to the high-speed Tier.

(Step 1) The system management program 12010 detects the presence of a parity group falling below the predetermined threshold, and specifies the identifier of the parity group. The system management program 12010 then specifies one or more internal LUs defined in the parity group as the movement source internal LU.

(Step 2) The system management program 12010 changes the position of the movement source internal LU from the high-speed Tier to the high-speed archive Tier, and displays the position Tier of the movement source internal LU along with the high-speed archive Tier, according to need.

(Step 3) The system management program 12010 specifies an internal LU having all of the following conditions, as the movement destination internal LU.

- Being defined in a parity group different from the parity group falling below the predetermined threshold.
- Having the same capacity as the movement source internal LU.
- Not being used by the host 1100.

When screen display is performed at this moment, the movement destination internal LU is displayed as being positioned in the high-speed Tier.

(Step 4) The system management program 12010 transmits a data migration request designating the identifier of the movement source internal LU and the identifier of the movement destination internal LU to the controller 1010. The controller 1010 migrates the data of the internal LU in response to the request.

(Step 5) Once the completion of the data migration is detected, the system management program 12010 displays on the screen that the position of the movement destination internal LU is changed to Tier for the high-speed archive application. The fact that the movement source internal LU belongs to the high-speed Tier is also displayed. FIG. 38 shows an example of this screen display, wherein the display of the first pain is changed such that the movement destination internal LU that belongs to the high-speed Tier that can be applied to the write request before data migration newly belongs to the Tier for the high-speed archive application. With this display, the manager can know that the position of the movement destination internal LU has been changed to the one for the high-speed archive application, and effectively use the FMD 1030 that is likely to run out of the surplus area.

The above has described the case based on Case 1 of the data migration processing, but when Case 2 of the data migration processing is used, the movement destination parity group may be designated or displayed in place of the movement destination internal LU. Moreover, for the parity group for the high-speed archive application, the system management program 12010 may automatically transmit to the storage system 1000 a request for defining the internal LU having a predetermined providing capacity, and display the fact that the defined internal LU belongs to the high-speed archive Tier. Note that the followings can be considered as examples of operating the internal LU or parity group belonging to the high-speed archive Tier as shown in FIG. 38.

The system management program 12010 receives from the manager an allocation request for allocating the internal LU or parity group belonging to the high-speed archive Tier to the archive program or the archive server. The system management program 12010 changes the settings of the archive server or the archive program and allocates the internal LU or parity group belonging to the high-speed archive Tier to the archive program.

The system management program 12010 receives from the manager a data migration request designating a certain internal LU as a movement target, and the internal LU or parity group belonging to the high-speed archive Tier as the movement destination. The system management program 12010 receives the data migration request and transmits a data migration request that designates the internal LU of the storage system as the movement target, and the internal LU or parity group belonging to the high-speed archive Tier as the movement destination. Examples of "certain internal LU" described above include an internal LU which is defined in a HDD or a parity group to which the FMD 1030 belongs and has low update frequency (or has the archive data stored therein).

Note that this display and the processing based on the policy may use other surplus capacity values instead of the surplus capacity percentages.

An embodiment of the present invention was described above, but it merely illustrates the present invention, and it is to be understood that the scope of the present invention is not limited to this embodiment. The present invention can be carried out in a variety of other modes. For example, the controller 1010 can employ another configuration. For example, instead of the above-described configuration, the controller may comprise a plurality of first control units (for example, control circuit boards) for controlling the communication with a higher-level device, a plurality of second control units (for example, control circuit boards) for controlling the communication with the FMD 1030, a cache memory capable of storing data exchanged between the higher-level device and FMD 1030, a control memory capable of storing data for controlling the storage system 1000, and a connection unit (for example, a switch such as a cross-bus switch) for connecting the first control units, second control units, cache memory, and control memory. In this case, one of the first control units and second control units or a combination thereof can perform processing as the above-described controller 1010. The control memory may be absent; in this case, an area for storing information for storage by the control memory may be provided in a cache memory.

Further, In case of FMD controller 2010 has a maximum number of concurrent access to the plural FMP, all three types of FMD may be report the number instead of the number of FMP implemented in the FMD (especially, the number is used for the performance consideration).

In addition, in the above explanation, because the FMD controller 2010 performs wear leveling, the controller 1010 acquires the surplus capacity value from the FMD controller 2010 and transmits the surplus capacity value of the FMD 1030 calculated based on this value to the management server 1200. If the controller 1010 carries out the wear leveling processing, the surplus capacity value may be calculated based on the information on the surplus area managed by the controller 1010. Also, in the above explanation, although the management server 1200 realizes the calculation of the surplus capacity value of the physical or logical component other than FMD, the controller 1010 may calculate the surplus capacity value. Moreover, the providing capacity is screen-displayed according to the above explanation, but information relating to the providing capacity such as the number of providing blocks may be display instead. For the display or processing performed based on the surplus capacity value for the internal LU, the surplus capacity value may be replaced with the surplus capacity value for the logical unit, the surplus capacity value for the parity group, and the surplus capacity value for the host LU, to perform the display or processing.

As described above, an aspect of the present invention is disclosed as an information system, which has: a computer; a storage system, which includes a flash memory device, a cache memory, and a storage controller with storage configuration information, and which provides a logical unit to the computer by using the flash memory device; and a management system managing the storage system and the computer, wherein the storage controller stores, in the storage configuration information, a first surplus capacity value that is based on a capacity of a surplus area of the flash memory device, generates storage management information based on the storage configuration information, and transmits the storage management information to the management system, and wherein the management system receives the storage management information, and displays a management surplus capacity value that relates to the storage system, based on the storage management information.

Another aspect of the present invention discloses that the storage controller may store, in the storage configuration information, information representing a definition of a parity group using the flash memory device, and information representing a correspondence relationship between the logical unit and the parity group, that the storage controller may dispersively or redundantly write, based on the definition of the parity group, write data of a write request designating the logical unit, to the flash memory device that belongs to the parity group corresponding to the designated logical unit, and that if displaying the management surplus capacity value, a second surplus capacity value of the parity group or a value converted into the second surplus capacity value for conversion may be displayed.

Another aspect of the present invention discloses that the storage management information may include the first surplus capacity value of the flash memory device, and that the management system may calculate the second surplus capacity value of the parity group on the basis of the first surplus capacity value for the flash memory device.

Another aspect of the present invention discloses that the storage controller may calculate the second surplus capacity value of the parity group on the basis of the first surplus capacity value of the flash memory device, and that the storage management information may include the second surplus capacity value.

Another aspect of the present invention discloses that the storage controller may store, in the storage configuration information, information representing a definition of a parity group using the flash memory device, information representing a correspondence relationship between the parity group and an internal logical unit defined using the parity group, and information representing a correspondence relationship between the internal logical unit and the logical unit, that the storage controller may transmit identification information of the internal logical unit corresponding to the designated logical unit in response to a device inquiry request designating the logical unit, may dispersively or redundantly write, to the flash memory device belonging to the parity group corresponding to the designated logical unit, write data of a write request designating the designated logical unit on the basis of the definition of the parity group and the definition of the internal logical unit, and that if displaying the management surplus capacity value, a third surplus capacity value of the internal logical unit or a value converted into the third surplus capacity value for conversion may be displayed.

Another aspect of the present invention discloses that the storage management information may have the first surplus capacity value of the flash memory device, and that the management system may calculate the third surplus capacity value of the internal logical unit on the basis of the first surplus capacity value of the flash memory device.

Another aspect of the present invention discloses that the storage controller may calculate the third surplus capacity value of the internal logical unit on the basis of the first surplus capacity value of the flash memory device, and that the storage management information may include the third surplus capacity value.

Another aspect of the present invention discloses that if displaying the management surplus capacity value, a fourth surplus capacity value of the logical unit or a value converted into the fourth surplus capacity value for conversion is displayed, that the storage management information may include the first surplus capacity value of the flash memory device, and that the management system may calculate the fourth surplus capacity value of the logical unit based on the first surplus capacity value of the flash memory device.

Another aspect of the present invention discloses that when displaying the management surplus capacity value, a fourth surplus capacity value of the logical unit or a value converted into the fourth surplus capacity value for conversion is displayed, that the management system may calculate the fourth surplus capacity value of the logical unit based on the first surplus capacity value of the flash memory device, and that the storage management information may include the fourth surplus capacity value.

Another aspect of the present invention discloses that the management system may store a policy for evaluating the management surplus capacity value, and that the management system may, based on the storage management information and the policy, display or manage a low update frequency application of the logical unit in which the surplus area of the flash memory corresponding to the logical unit is determined to be insufficient.

Another aspect of the present invention discloses that the computer may execute an archive program, and that the management system may transmit to the computer an allocation request for allocating the logical unit to the archive program, the logical unit being determined as the low update frequency application.

Another aspect of the present invention discloses that the management system may transmit to the storage system a data migration request for setting the logical unit as a movement destination, the logical unit being determined as the low update frequency application.

Another aspect of the present invention discloses a management system that manages a computer and a storage system that provides a logical unit to the computer using the flash memory device, the management system including: a port for receiving, from the storage system, a first surplus capacity value relating to a capacity of a surplus area of the flash memory device; a memory for storing storage configuration information and management-side storage configuration information storing the first surplus capacity value; a processor for monitoring the storage system using the port; and an input/output device for displaying a state of the storage system using the management-side storage configuration information, wherein the processor generates a management surplus capacity value relating to the storage system on the basis of the management-side storage management information, and the input/output device displays the management surplus capacity value.

Another aspect of the present invention discloses that the management-side storage configuration information may store a second surplus capacity value of a parity group defined by the storage system, and that the management surplus capacity value may be the second surplus capacity value of the parity group.

Another aspect of the present invention discloses a management method of a management system that manages a computer and a storage system that provides a logical unit to the computer using the flash memory device, the method including: a step in which the management system receives from the storage system a first surplus capacity value relating to a capacity of a surplus area of the flash memory device; a step in which the management system stores storage configuration information and management-side storage configuration information storing the first surplus capacity value; a step in which the management system generates a management surplus capacity value relating to the storage system on the basis of the management-side storage management information; and a step in which the management system displays the management surplus capacity value by using an input/output device of the management system.

However, the present invention discloses aspects other than the above aspects.

The invention claimed is:

1. A method for managing an information system comprising a storage system, a computer, and a management system, wherein the storage system comprises:
   a storage controller; and
   a first memory device and a second memory device, each including a memory controller and a memory chip,
   wherein the memory chip stores data into a plurality of memory units in the memory chip, and receives a data reading operation, a data writing operation, and a data deletion operation, and the data writing operation or the data deletion operation effecting a higher probability of failure of the memory units comparing to the data reading operation,
   wherein the memory controller:
   (a) manages, as a providing memory unit, a first unfailed memory unit which stores data to be transferred to the storage controller;
   (b) manages, as a surplus memory unit, a second unfailed memory unit which is an unfailed memory unit other than the first unfailed memory unit;
   (c) stores update data transferred from the storage controller to a part of the second unfailed memory unit; and
   (d) manages, as the providing memory unit, the part of the second unfailed memory unit,
   the method comprising:
   (1) defining a plurality of logical components based on the memory device with storing relations between the first and second memory devices and first and second logical components;
   (2) managing the first logical component from the logical components, associated with the first memory device, wherein the surplus memory unit of the first memory device satisfies a condition;
   (3) managing the second logical component from the logical components, associated with the second memory device, wherein the surplus memory unit of the second memory device does not satisfy the condition, the second logical component having a lower degree of suitability for high frequency update than the first logical component.

2. The method according to claim 1, wherein the surplus memory unit of the second memory device satisfied the condition in the past, and the second logical component was managed as suitable for high frequency update as the first logical component.

3. The method according to claim 2, the method further comprising:
   (4) when the second logical component has a lower degree of suitability for high frequency update than the first logical component, migrating data of the second logical component from the second memory unit.

4. The method according to claim 3, wherein a destination of the migration target data is the first memory unit.

5. The method according to claim 2, the method further comprising:
   (5) managing a first tier including the first logical component; and
   (6) managing a second tier as having a lower degree of suitability for high frequency update than the first tier, the second tier including the second logical component.

6. The method according to claim 5, further comprising:
   (7) displaying information indicating that the second logical component is newly managed as the second tier from the first tier, when the second memory device of which the surplus memory unit does not satisfies the condition.

7. The method according to claim 1,
   wherein the storage controller provides a first type of logical component to the computer for receiving an access request to the first type of logical component, and the first type of logical component is mapped to a second type of logical component not provided directly to the computer, and
   wherein a type of the first logical component and second logical component is the second type.

8. The method according to claim 7, wherein the second type is a parity group.

9. The method according to claim 1, wherein the condition at least considers the relations between the memory devices and the logical components, a RAID level, and a threshold which is common to the first memory unit and the second memory unit.

10. The method according to claim 1, wherein the memory chip is a flash memory chip.

11. A storage system for accessing from a computer, comprising:
    a storage controller; and
    a first memory device and a second memory device, each including a memory controller and a memory chip,
    wherein the memory chip is configured to store data into a plurality of memory units in the memory chip, and receive a data reading operation, a data writing operation, and a data deletion operation, and the data writing operation or the data deletion operation effecting a higher probability of failure of the memory units comparing to the data reading operation,
    wherein the memory controller is configured to:
    (a) manage, as a providing memory unit, a first unfailed memory unit which stores data to be transferred to the storage controller;
    (b) manage, as a surplus memory unit, a second unfailed memory unit as surplus memory unit which is an unfailed memory unit other than the first unfailed memory unit;

(c) store update data transferred from the storage controller to a part of the second unfailed memory unit; and (d) manage, as the providing memory unit, the part of the second unfailed memory unit, wherein the storage controller is configured to define a first logical component based on the first memory device, the surplus memory unit of the first memory device satisfying a condition, and wherein the storage controller is configured to define a second logical component based on the second memory device, the surplus memory unit of the second memory device not satisfying the condition, the second logical component being managed as having a lower degree of suitability for high frequency update than the first logical component.

12. The storage system according to claim 11, wherein the surplus memory unit of the second memory device satisfied the condition in the past, and the second logical component was managed as suitable for high frequency update as the first logical component.

13. The storage system according to claim 12, wherein, when the second logical component has a lower degree of suitability for high frequency update than the first logical component, data of the second logical component is migrated from the second memory unit.

14. The storage system according to claim 13, wherein a destination of the migration target data is the first memory unit.

15. The storage system according to claim 12, wherein the first logical component is included in a first tier in the storage system, and wherein the second logical component is included in a second tier in the storage system, the second tier having a lower degree of suitability for high frequency update than the first tier.

16. The storage system according to claim 11, wherein the storage controller is configured to provide a first type of logical component to a computer for receiving an access request to the first type of logical component, and the first type of logical component is mapped to a second type of logical component not provided directly to the computer, and wherein a type of the first logical component and second logical component is the second type.

17. The storage system according to claim 16, wherein the second type is a parity group.

18. The storage system according to claim 11 wherein the condition at least considers the relations between the memory devices and the logical components, a RAID level, and a threshold which is common to the first memory unit and the second memory unit.

19. The storage system according to claim 11, wherein the memory chip is a flash memory chip.

* * * * *